(12) United States Patent
Ishihara et al.

(10) Patent No.: US 8,731,520 B2
(45) Date of Patent: May 20, 2014

(54) COMMUNICATION TERMINAL AND METHOD FOR CONTROLLING THE DISCLOSURE OF CONTACT INFORMATION

(75) Inventors: Satoko Ishihara, Kanagawa (JP); Kazuhito Yoshida, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 251 days.

(21) Appl. No.: 13/259,552

(22) PCT Filed: Mar. 26, 2010

(86) PCT No.: PCT/JP2010/055449
§ 371 (c)(1),
(2), (4) Date: Sep. 23, 2011

(87) PCT Pub. No.: WO2010/110451
PCT Pub. Date: Sep. 30, 2010

(65) Prior Publication Data
US 2012/0028605 A1 Feb. 2, 2012

(30) Foreign Application Priority Data

Mar. 26, 2009 (JP) ................. 2009-077340
Mar. 26, 2009 (JP) ................. 2009-077795

(51) Int. Cl.
*H04M 1/66* (2006.01)
(52) U.S. Cl.
USPC .............. 455/410; 726/26; 379/201.11
(58) Field of Classification Search
None
See application file for complete search history.

(56) References Cited

U.S. PATENT DOCUMENTS 8,417,266 B2 * 4/2013 Kim et al. ............ 455/457
(Continued)

FOREIGN PATENT DOCUMENTS

JP 2003-37592 A 2/2003
(Continued)

OTHER PUBLICATIONS

International Search Report for PCT/JP2010/055449, mailed May 18, 2010.

(Continued)

*Primary Examiner* — German J Viana Di Prisco
(74) *Attorney, Agent, or Firm* — Hoffmann & Baron, LLP

(57) ABSTRACT

Provided is a communication terminal capable of suppressing the phenomenon of personal information being transmitted contrary to the will of the person. A communication terminal (1) comprises communication sections (20, 200), a first storage section (131) for storing first information relating to a first communication terminal, an information creating section (121) for creating information which is transmitted to a second communication terminal different from the first communication terminal by the communication section (20), a reply requesting section (122) which allows the communication section (200) to transmit information for requesting a reply of whether or not the transmission of the created information is permitted to the first communication terminal when the information created by the information creating section (121) includes part or all of the first information, and a first communication permitting section (123) which allows the communication section (20) to transmit the created information to the second communication terminal when the communication section (200) has received a permission reply to permit the transmission of the created information from the first communication terminal.

15 Claims, 44 Drawing Sheets

(56) References Cited

U.S. PATENT DOCUMENTS

| | | | |
|---|---|---|---|
| 2006/0281407 A1* | 12/2006 | Deeds | 455/41.2 |
| 2007/0081649 A1* | 4/2007 | Baudino et al. | 379/201.11 |
| 2007/0129959 A1* | 6/2007 | Bransky et al. | 705/1 |
| 2007/0149179 A1* | 6/2007 | Kashiwabara | 455/415 |
| 2008/0115191 A1 | 5/2008 | Kim et al. | |
| 2008/0233929 A1* | 9/2008 | Akama et al. | 455/414.2 |
| 2010/0216438 A1* | 8/2010 | Ruttler et al. | 455/414.1 |

FOREIGN PATENT DOCUMENTS

| | | |
|---|---|---|
| JP | 2005-51423 A | 2/2005 |
| JP | 2006-040016 | 2/2006 |
| JP | 2007-180791 A | 7/2007 |
| JP | 2007-202064 A | 8/2007 |
| JP | 2008-502172 A | 1/2008 |
| JP | 2009-033531 A | 2/2009 |
| KR | 10-2008-0043646 | 5/2008 |
| WO | 2008090779 A1 | 7/2008 |

OTHER PUBLICATIONS

Notice of Reasons for Rejection issued to JP Application No. 2011-506156, mailed Jul. 2, 2013, 4 pages.

Office Action issued to KR Application No. 10-2011-7023408, mailed Jun. 21, 2013, 7 pages.

* cited by examiner

FIG. 8

From:USER Y
subject:SUSPENSION OF
　　　　DATA TRANSMISSION
---Message---
Since a reply has not come from you (user X), transmission of the mail address to the user Z is suspended.
If you permit transmission of the mail address to the user Z, please reply as such.

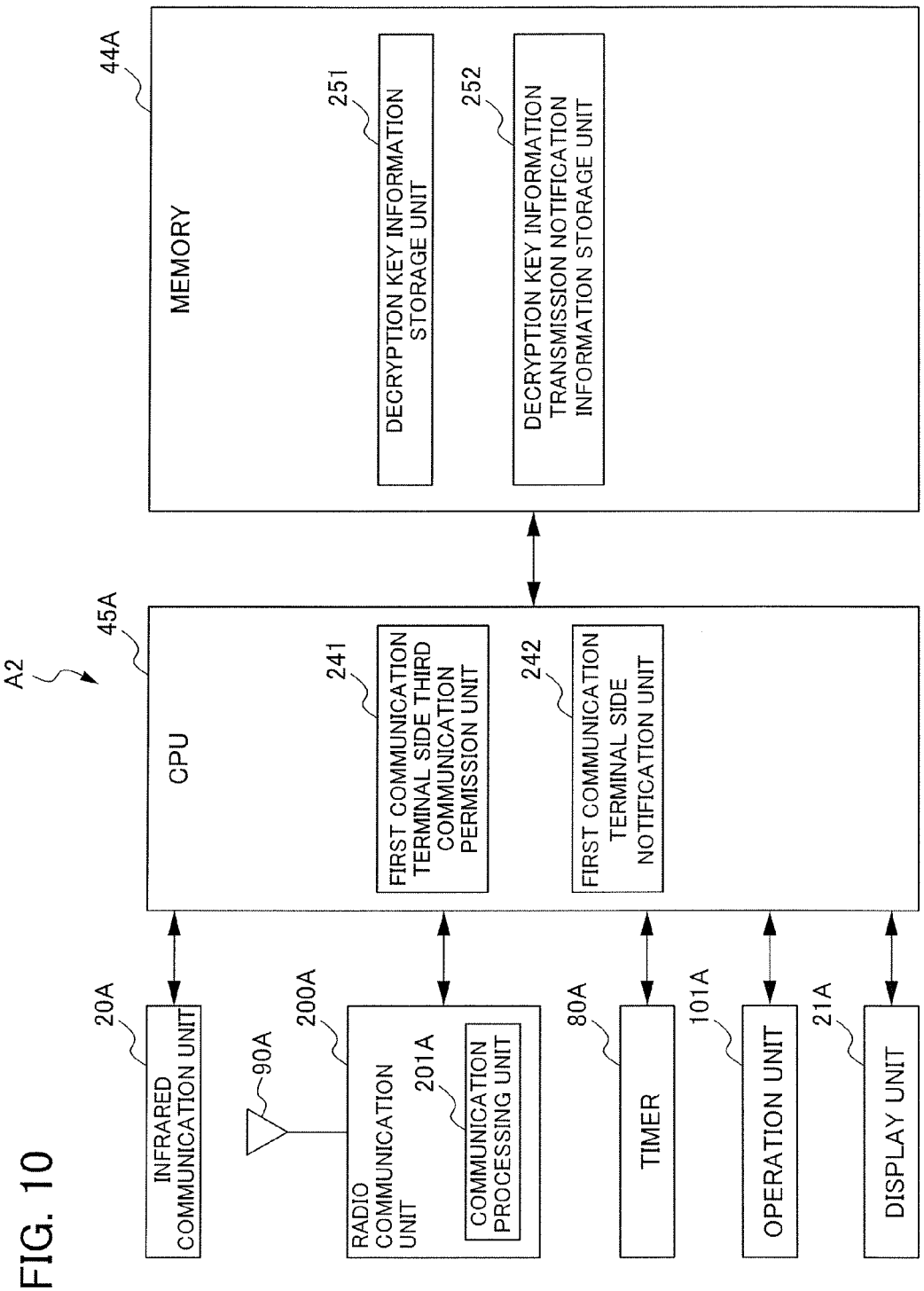

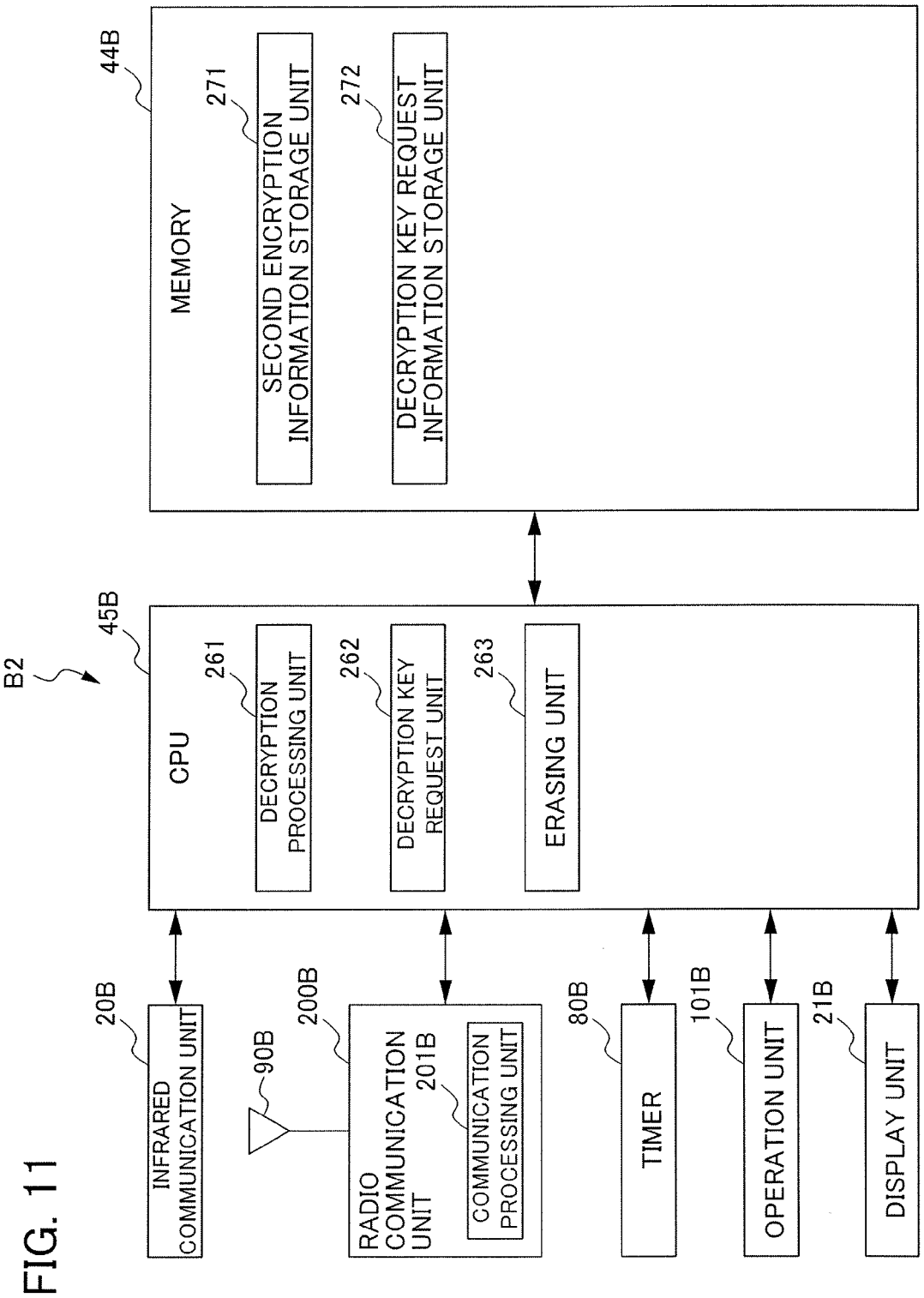

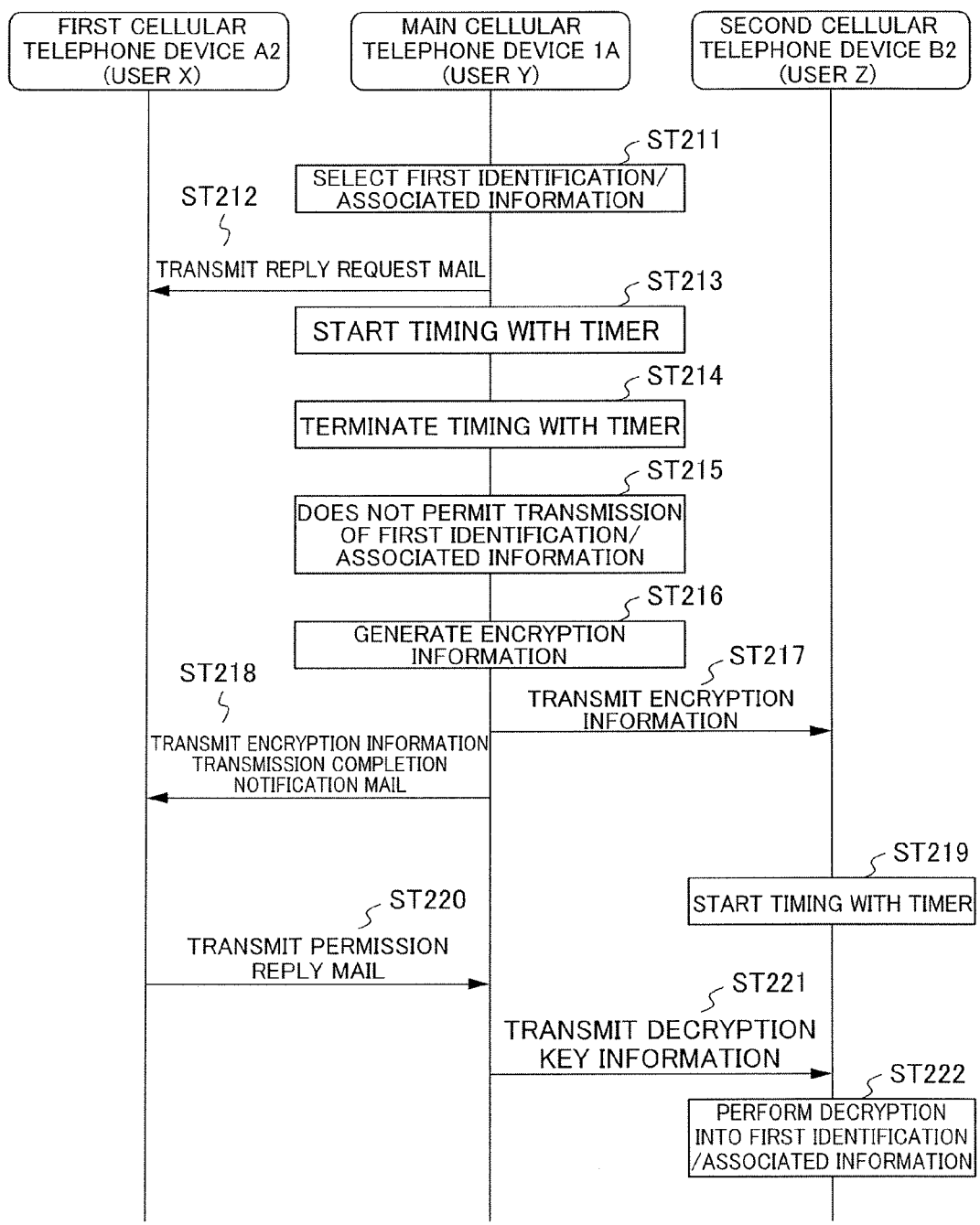

FIG. 13

From:USER Y
subject:LOCK DATA TRANSMISSION
        HAS BEEN COMPLETED
----Message----
Although there has been no reply
from you (the user X), transmission
of the encrypted information
to the user Z has
been completed.
If you permit a decryption key for
the encryption information to be
transmitted to the user Z, please
reply as such.
Please note that, if the encryption
information is not decrypted within
12 hours since the user Z received
the encryption information, the
encryption information will be erased.

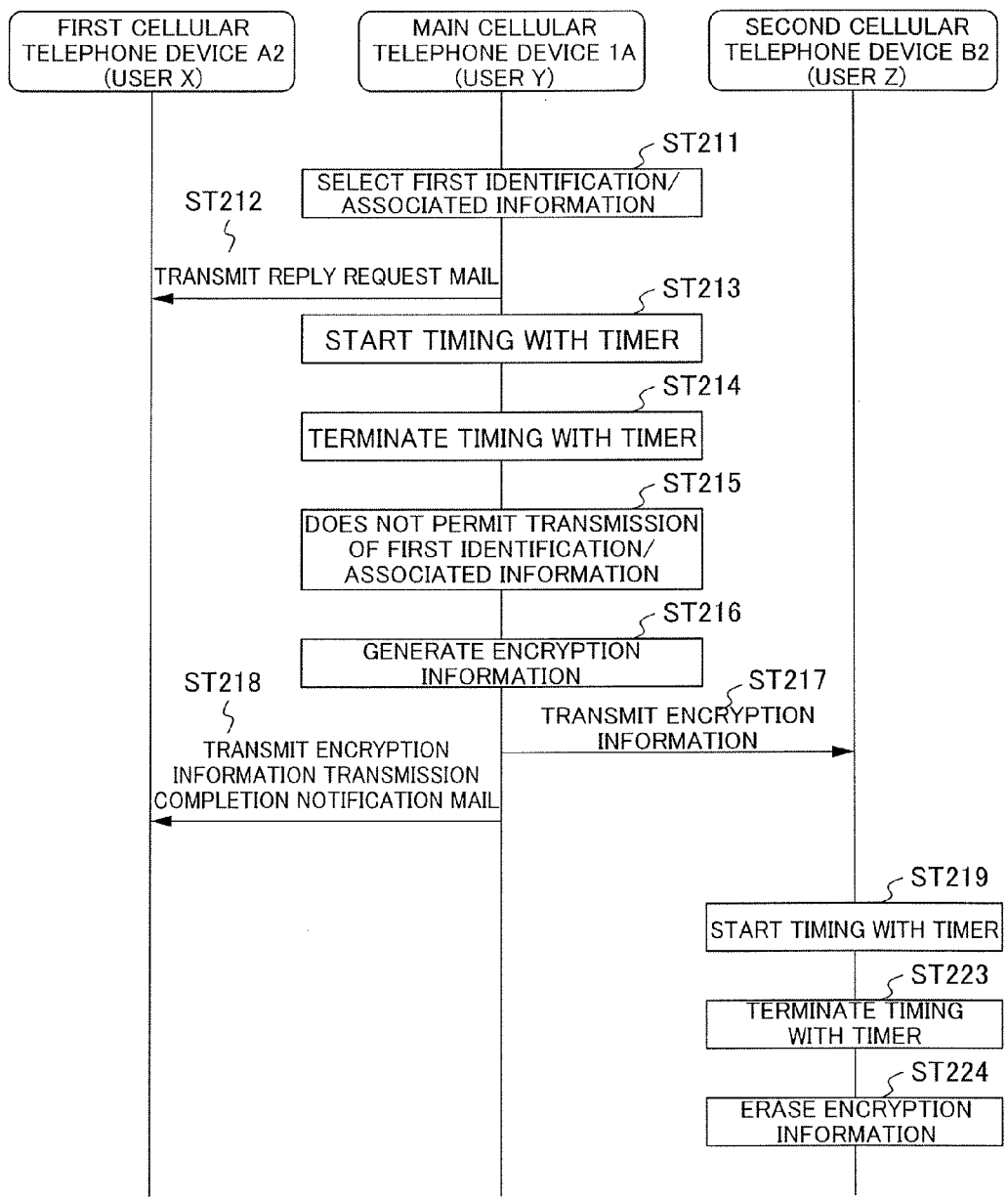

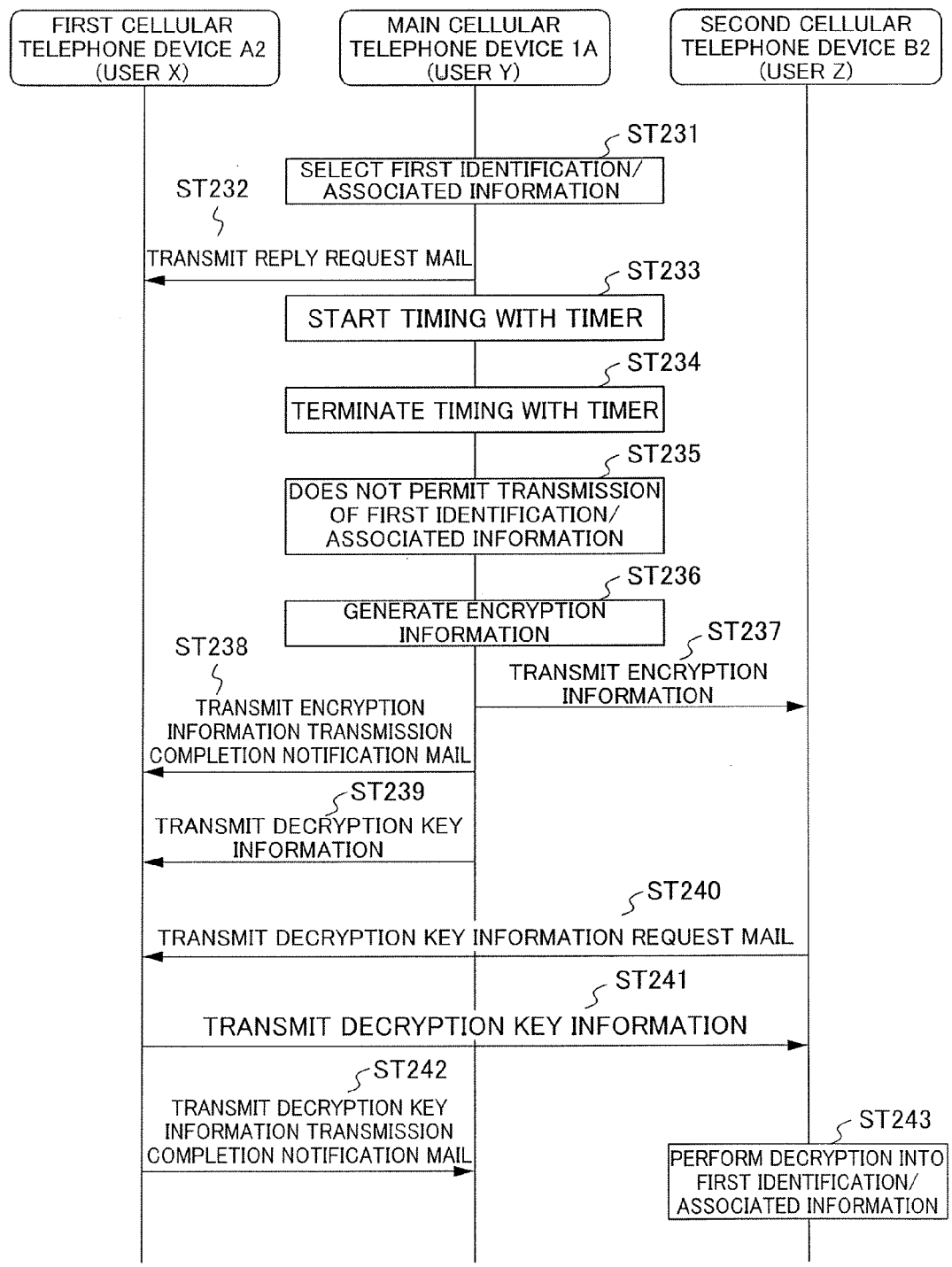

FIG. 16

From:USER Y
subject:ENCRYPTION INFORMATION
TRANSMISSION HAS BEEN
COMPLETED
---Message---
Although there has been no reply
from you (the user X), transmission
of the encrypted information to the
user Z has been
completed.
In addition, a decryption key for the
encrypted information has been
transmitted to you (the user X).
When there is a request for the
decryption key from the user Z, if you
do not object, please transmit the
decryption key to the user Z.

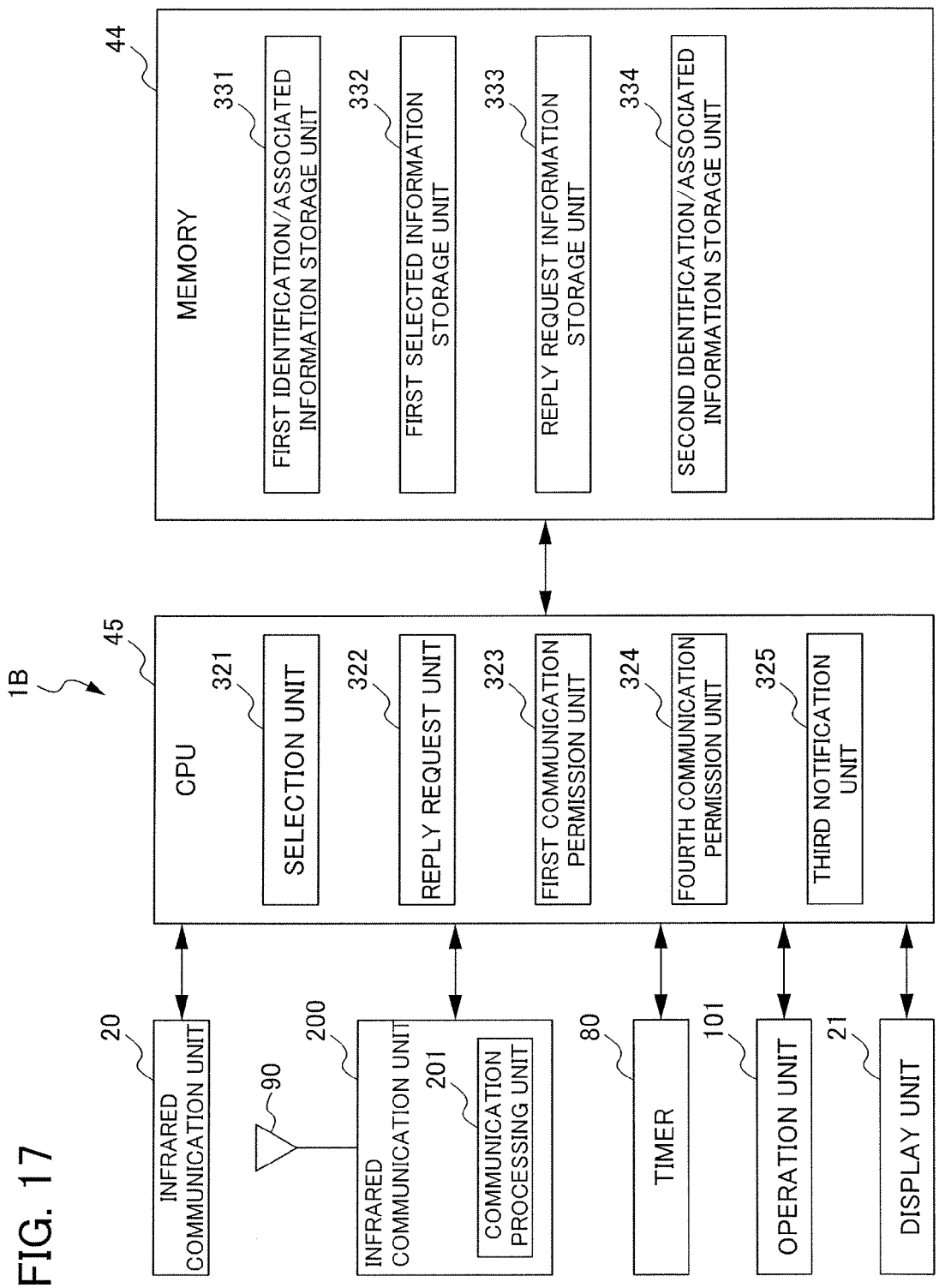

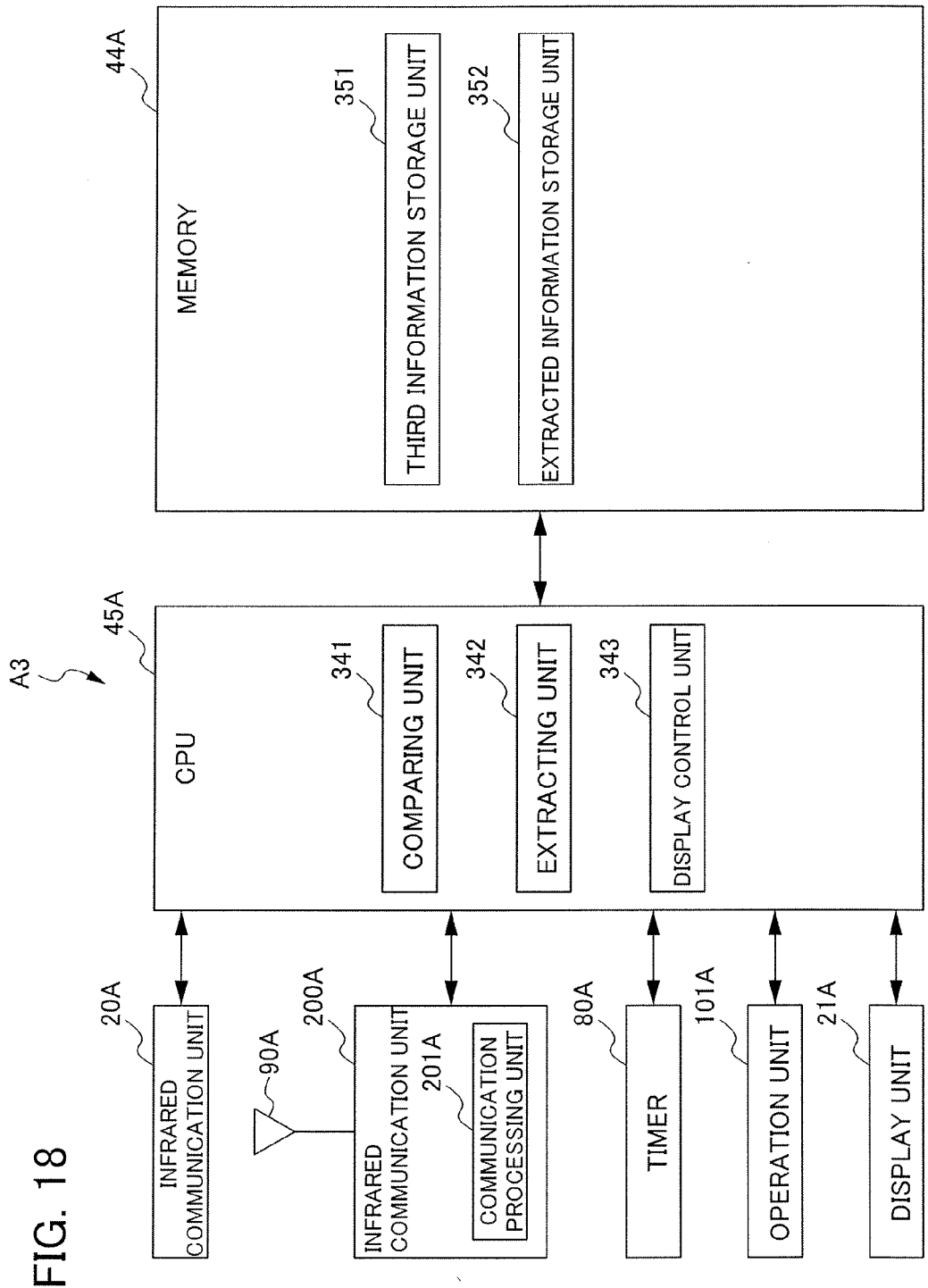

FIG. 20

From:USER Y
subject:DATA TRANSMISSION
         HAS BEEN COMPLETED
---Message---
Although there has been no reply
from you (the user X), transmission
of your (the user X's) mail address
to the user Z has been completed.
In return, you are provided with
profile information of the user Z.

FIG. 31

From:SERVER W
subject:ENCRYPTION INFORMATION
    TRANSMISSION HAS BEEN
    COMPLETED
---Message---
The user Y has transmitted the encryption information encrypted from your (the user X's) mail address to the user Z.
If you permit decryption of the encryption information, please transmit decryption key information to the server W
If you do not permit decryption, please transmit non-permission information to the server W.

FIG. 33

From:SERVER W
subject:ENCRYPTION INFORMATION
    DECRYPTION REQUEST
---Message---
A request for decrypting the
encryption information of your
(the user X's) mail address has
arrived from the user Z.
If you permit decryption of the
encryption information, please
transmit decryption key information
to the server W.
If you do not permit decryption,
please transmit non-permission
information to the server W.

FIG. 34

From:SERVER W
subject:DECRYPTION KEY
　　　　REGISTRATION
---Message---
The decryption key of the encryption information has been registered with the server W.
The decryption key can be obtained from the server W.

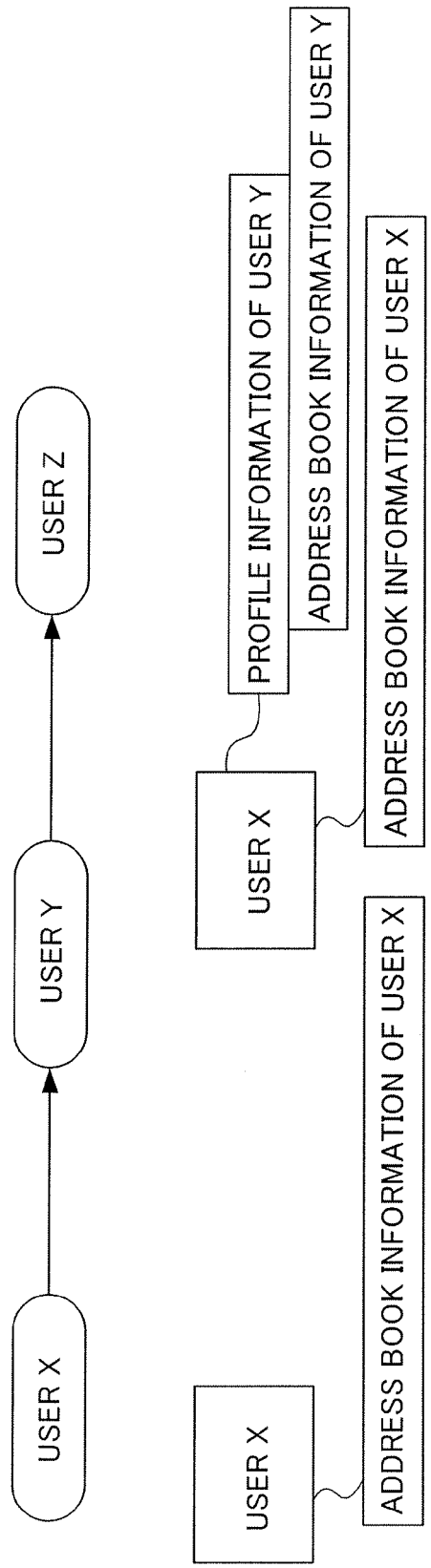

COMMUNICATION TERMINAL AND METHOD FOR CONTROLLING THE DISCLOSURE OF CONTACT INFORMATION

CROSS-REFERENCE TO RELATED APPLICATIONS

This application is the National Stage of International Application No. PCT/JP2010/055449, filed Mar. 26, 2010, which claims the benefit of Japanese Application No. 2009-077340, filed Mar. 26, 2009, and Japanese Application No. 2009-077795, filed Mar. 26, 2009, the entire contents of all of which are incorporated by reference herein.

FIELD OF THE INVENTION

The present invention relates to a communication terminal such as a cellular telephone device. In addition, the present invention relates to a communication system including a plurality of communication terminals such as cellular telephone devices.

BACKGROUND OF THE INVENTION

Conventionally, a cellular telephone device as a communication terminal can communicate with other communication terminals by way of infrared communication, Bluetooth (registered trademark) and the like as a communication method that is different from a communication method utilizing a predetermined communication network. For example, a communication terminal can directly transmit information to another communication terminal by way of infrared communication or Bluetooth without using any communication network. In a case of utilizing infrared communication, infrared communication units disposed in the plurality of communication terminals are arranged adjacently to one another, and as a result, information can be easily transmitted or received; therefore, personal information such as profiles of the user and friends are easily transmitted or received.

Here, for example, a radio communication device has been proposed that transmits scrambled data when personal information is transmitted through communication utilizing Bluetooth (for example, see Patent Document 1).
Patent Publication 1: Japanese Unexamined Patent Application, No. 2003-37592

SUMMARY OF THE INVENTION

Problems to be Solved by the Invention

However, in the invention of Patent Document 1, although private information can be prevented from being leaked to an outside third party, if the personal information is different from that of a sender, it is not possible to suppress transmission of the personal information in a state of having no approval from the person to whom the personal information belongs (or against the person's intention), or to suppress continuation of a state in which the destination of the personal information is unknown.

An object of the present invention is to provide a communication terminal that can suppress transmission of personal information against the intention of the person to whom the personal information belongs.

Another object of the present invention is to provide a communication terminal that can suppress continuation of a state in which the destination of personal information is unknown to the person to whom the personal information belongs.

Yet another object of the present invention is to provide a communication system including such a communication terminal.

Means for Solving the Problems

The present invention relates to a communication terminal, including: at least a storage unit, a control unit and a communication unit, in which the storage unit stores first information; the control unit creates information to be transmitted to a second communication terminal different from a first communication terminal; in a case in which the created information includes at least a part of the first information, the control unit transmits a request for transmission permission of the created information to the first communication terminal via the communication unit; and in a case in which a response to the request for transmission permission of the created information is obtained, the control unit transmits the created information to the second communication terminal via the communication unit.

Moreover, it is preferable for the first information to include: first identification information corresponding to the first communication terminal; and first associated information associated with the first identification information.

In addition, it is preferable for the communication unit to include a first communication unit that performs communication by way of a first communication method for communicating with communication terminals without a communication network, and a second communication unit that performs communication by way of a second communication method for communicating with the communication terminals via the communication network, in which the control unit performs control such that the second communication unit is used preferentially to the first communication unit for communication with the first communication terminal.

Furthermore, the present invention relates to a communication terminal, including at least: a storage unit; a control unit; and a communication unit, in which the storage unit stores first information including first identification information corresponding to a first communication terminal, and first associated information associated with the first identification information; the communication unit includes a first communication unit that performs communication by way of a first communication method for communicating with communication terminals without a communication network, and a second communication unit that performs communication by way of a second communication method for communicating with the communication terminals via the communication network; in a case in which the first information is selected to be transmitted by way of the first communication method to a second communication terminal different from the first communication terminal, the control unit transmits a request for transmission permission to the first communication terminal by way of the second communication method different from the first communication method; and in a case in which a response to the request for transmission permission is obtained by way of the first communication method, the control unit transmits the first information to the second communication terminal by way of the second communication method.

Moreover, it is preferable for, in a case in which a period of time since the communication unit transmitted information for requesting a reply exceeds a predetermined period of time, the control unit not to permit transmission of a part or all of the first information to the second communication terminal.

In addition, the present invention relates to a communication terminal, including at least: a storage unit; a control unit; and a communication unit, in which the storage unit stores first information including first identification information and first associated information associated with the first identification information; in a case in which the first information is selected as information to be transmitted to a second communication terminal, the control unit transmits a request for transmission permission to a first communication terminal via the communication unit; the control unit measures a period of time until obtaining a response to the request for transmission permission; in a case in which the period of time until obtaining the response exceeds the predetermined period of time, the control unit determines that the transmission permission has not been obtained; in a case in which the transmission permission has been obtained before the period of time until obtaining the response exceeds the predetermined period of time, the control unit transmits the first information via the communication unit; and after determining that the transmission permission has not been obtained, the control unit transmits first encryption information encrypted from the first information to the second communication terminal via the communication unit.

Furthermore, the present invention relates to a communication system including: a first communication terminal; a main communication terminal that can transmit first identification information and first associated information associated with the first communication terminal to a communication terminal different from the first communication terminal; and a second communication terminal that can receive the first identification information and the first associated information transmitted from the main communication terminal, in which the main communication terminal includes at least a storage unit, a control unit and a communication unit; the storage unit stores first information including the first identification information corresponding to the first communication terminal, and the first associated information associated with the first identification information; in a case in which the first information is selected as information to be transmitted to the second communication terminal, the control unit transmits a request for transmission permission of the first information to the first communication terminal via the communication unit; and in a case in which a response to the request for transmission permission is obtained, the control unit transmits the first information to the second communication terminal via the communication unit.

Moreover, the present invention relates to a communication system including: a first communication terminal; a main communication terminal that can transmit first identification information and first associated information associated with the first communication terminal to a communication terminal different from the first communication terminal; and a second communication terminal that can receive the first identification information and the first associated information transmitted from the main communication terminal, in which the main communication terminal includes at least a storage unit, a control unit and a communication unit; the storage unit stores first information including the first identification information and the first associated information associated with the first identification information; the communication unit includes a first communication unit that performs communication by way of a first communication method for communicating with communication terminals without a communication network, and a second communication unit that performs communication by way of a second communication method for communicating with the communication terminals via the communication network; in a case in which the first information is selected to be transmitted to the second communication terminal by way of the first communication method, the control unit transmits a request for transmission permission of the first information to the first communication terminal via the communication unit; and in a case in which a response to the request for transmission permission is obtained by way of the second communication method, the control unit transmits the first information to the second communication terminal by way of the first communication method.

In addition, the present invention relates to a communication system including: a first communication terminal that can transmit predetermined decryption key information; a main communication terminal that can transmit first identification information and first associated information associated with the first communication terminal, or encryption information encrypted from the first associated information, to a second communication terminal different from the first communication terminal; and the second communication terminal that can receive the first identification information and the first associated information or the encryption information transmitted from the main communication terminal, in which the main communication terminal includes at least a storage unit, a control unit and a communication unit; the storage unit stores first information including the first identification information and the first associated information associated with the first identification information; in a case in which the first information is selected as information to be transmitted to the second communication terminal, the control unit transmits a request for transmission permission to the first communication terminal via the communication unit; the control unit measures a period of time until obtaining a response to the request for transmission permission from the first communication terminal; in a case in which the period of time until obtaining the response to the request for transmission permission from the first communication terminal exceeds the predetermined period of time, the control unit determines that the transmission permission has not been obtained; in a case in which the transmission permission is obtained before the period of time exceeds the predetermined period of time until obtaining the response, the control unit transmits the first information via the communication unit; and after determining that the transmission permission has not been obtained, the control unit transmits first encryption information encrypted from the first information to the second communication terminal via the communication unit.

Furthermore, the present invention relates to a communication system including: a first communication terminal that can transmit decryption key information; a main communication terminal that can transmit encryption information encrypted from a part or all of first identification information corresponding to the first communication terminal and first associated information associated with the first identification information to a second communication terminal different from the first communication terminal; the second communication terminal that can receive the encryption information transmitted from the main communication terminal; and a server that can receive the decryption key information transmitted from the first communication terminal, and can transmit the decryption key information to the second communication terminal, in which the main communication terminal includes at least a main communication terminal side storage unit, a main communication terminal side control unit and a main communication unit; the main communication terminal side storage unit stores first information including first identification information corresponding to the first communication terminal, and first associated information associated with the first identification information, as well as second information including second identification information corresponding to the second communication terminal, and second associated information associated with the second identification information; in a case in which the first information is selected as information to be transmitted to the second communication terminal, the main communication terminal side control unit encrypts the first information to generate encryption information; the main communication terminal side control unit requests permission for transmitting the encryption information to the second communication terminal via the main communication unit; the main communication terminal side control unit transmits, to the server via the main communication unit, first notification information including, notification information for notifying of the fact that the first information has been transmitted to the second communication terminal, the first identification information, and the second identification information; the server includes at least a server side storage unit, a server side control unit and a server communication unit; the server side storage unit can store the first identification information and the second identification information included in the first notification information thus received, and the decryption key information transmitted from the first communication terminal; in a case in which the first notification information is received, the server side control unit transmits second notification information, which includes notification information for notifying of the fact that the first information has been transmitted from the main communication terminal to the second communication terminal, and the second identification information stored in the server side storage unit, to the first communication terminal identified by way of the first identification information stored in the server side storage unit, via the server communication unit; the first communication terminal includes at least a first communication terminal side storage unit, a first communication terminal side control unit and a first communication terminal side communication unit; and the first communication terminal side storage unit stores the first identification information, the second identification information included in the second notification information received by the first communication terminal side communication unit, and the decryption key information.

Moreover, the present invention relates to a communication system including: a first communication terminal that can transmit decryption key information; a main communication terminal that can transmit encryption information, which is encrypted from first information including first identification information corresponding to the first communication terminal and first associated information associated with the first identification information, to a second communication terminal different from the first communication terminal; the second communication terminal that can receive the encryption information transmitted from the main communication terminal; and a server that can receive the decryption key information transmitted from the first communication terminal, and can transmit the decryption key information to the second communication terminal, in which the main communication terminal includes at least a storage unit, a control unit and a communication unit; the storage unit stores the first information and second information including second identification information corresponding to the second communication terminal and second associated information associated with the second identification information; in a case in which the first information is selected as information to be transmitted to the second communication terminal, the control unit generates encryption information; the control unit transmits a request for transmission permission of the encryption information to the second communication terminal via the communication unit by way of a first communication method; the control unit transmits first notification information, which includes notification information for notifying of the fact that the first information has been transmitted to the second communication terminal, the first identification information and the second identification information, to the server by way of a second communication method different from the first communication method; the server includes at least a server side storage unit, a server side control unit and a server communication unit; the server side storage unit can store the first identification information and the second identification information included in the first notification information received by way of the second communication method, and the decryption key information transmitted from the first communication terminal; in a case in which the first notification information is received by way of the second communication method, the server side control unit transmits second notification information, which includes notification information for notifying of the fact that a part or all of the first identification information and the first associated information has been transmitted from the main communication terminal to the second communication terminal, and the second identification information stored in the server side storage unit, to the first communication terminal identified by way of the first identification information stored in the server side storage unit, by way of the second communication method; the first communication terminal includes at least a first communication terminal side storage unit; and the first communication terminal side storage unit stores the first identification information, the second identification information included in the second notification information received by way of the second communication method, and the decryption key information.

In addition, it is preferable for the first communication terminal to include: a first communication terminal side second communication unit that can communicate by way of the second communication method; and a first communication terminal side decryption key information transmission unit that causes the first communication terminal side second communication unit to transmit the decryption key information stored in the first communication terminal side storage unit to the server, in a case in which the first communication terminal side second communication unit receives the second notification information; and the second communication terminal includes: a second communication terminal side first communication unit that performs communication by way of the first communication method; a second communication terminal side second communication unit that performs communication by way of the second communication method different from the first communication method; a second communication terminal side storage unit that stores the encryption information received by the second communication terminal side first communication unit; a second communication terminal side decryption key information request unit that causes the second communication terminal side second communication unit to transmit first request information for requesting the decryption key information to the server; and a decryption processing unit that decrypts the encryption information stored in the second communication terminal side storage unit, based on a decryption key included in the decryption key information transmitted from the server, in which the server includes: a server side second communication unit that can communicate by way of the second communication method; and a server side decryption key information transmission unit that causes the server side second communication unit to transmit the decryption key information stored in the server side storage unit to the second communication terminal identified by way of the second identification information stored in the server side storage unit, in a case in which the server side second communication unit receives the first request information.

Furthermore, it is preferable for the server to include: a server side determination unit that determines whether the decryption key information is stored in the server side storage unit, in a case in which the server side second communication unit receives the first request information; and a server side decryption key information request unit that causes the server side second communication unit to transmit second request information for requesting transmission of the encryption information to the first communication terminal, in a case in which the server side determination unit determines that the encryption information is not stored in the server side storage unit.

Moreover, it is preferable for the first communication terminal to include a non-permission information transmission unit that causes the first communication terminal side second communication unit to transmit, to the server, non-permission information for not permitting transmission of the decryption key information stored in the first communication terminal side storage unit to the second communication terminal; the server to include a first erasing instruction information transmission unit that causes the server side second communication unit to transmit first erasing instruction information, which includes an instruction to erase the encryption information stored in the second communication terminal side storage unit, to the second communication terminal, in a case in which the server side second communication unit receives the non-permission information; and the second communication terminal to include a second communication terminal side erasing unit that erases the encryption information stored in the second communication terminal side storage unit, in a case in which the second communication terminal side second communication unit receives the first erasing instruction information.

In addition, it is preferable for the server to include a server side erasing unit that erases the decryption key information stored in the server side storage unit, in a case in which the server side second communication unit receives the non-permission information.

Furthermore, it is preferable for the second communication terminal to include a second communication terminal side timing unit that measures a period of time since the second communication terminal side first communication unit received the encryption information, and in a case in which the period of time measured by the second communication terminal side timing unit has passed a predetermined period of time, the second communication terminal side erasing unit erases the encryption information stored in the second communication terminal side storage unit.

Moreover, it is preferable for the main communication terminal to include: a reply request unit that causes the communication unit to transmit reply request information for requesting a reply regarding whether transmission of the first information is permitted, to the first communication terminal identified by way of the first identification information, in a case in which the selected information is the first information; a timing unit that measures a period of time since the communication unit transmitted the reply request information; a first transmission permission unit that does not permit the communication unit to transmit the first information to the second communication terminal in a case in which the period of time measured by the timing unit exceeds the predetermined period of time, and permits the communication unit to transmit the first information to the second communication terminal in a case in which the communication unit receives a permission reply for permitting transmission of the first information from the first communication terminal before the period of time measured by the timing unit exceeds the predetermined period of time; and an encryption processing unit that encrypts the first information to generate the encryption information, and in a case in which the first transmission permission unit does not permit the communication unit to transmit the first information to the second communication terminal, the encryption processing unit performs encryption processing on the first information.

In addition, the present invention relates to a communication system, including: a first communication terminal that can be identified by way of first identification information, and can transmit first decryption key information for enabling decryption of first encryption information that is generated by encrypting the first identification information; a second communication terminal that can be identified by way of second identification information, and can transmit second decryption key information for enabling decryption of second encryption information that is generated by encrypting second associated information associated with the second identification information; a main communication terminal that can transmit the first encryption information to the second communication terminal, and can transmit the second encryption information to the first communication terminal, in which the main communication terminal includes at least a main communication terminal side storage unit and a main communication terminal side control unit; the main communication terminal side storage unit stores the first identification information and the second associated information; in a case in which the first identification information is selected as information to be transmitted to the second communication terminal, the main communication terminal side control unit performs control such that the first encryption information generated by encrypting the first identification information is transmitted to the second communication terminal, and performs control such that the second encryption information generated by encrypting the second associated information is transmitted to the first communication terminal; the first communication terminal includes at least a first communication terminal side storage unit and a first communication terminal side control unit; the first communication terminal side storage unit stores the first decryption key information; in a case in which the second encryption information is received from the main communication terminal, the first communication terminal side control unit performs control such that the first decryption key information stored in the first communication terminal side storage unit can be transmitted to the second communication terminal; the second communication terminal includes at least a second communication terminal side storage unit and a second communication terminal side control unit; the second communication terminal side storage unit stores the second decryption key information; and in a case in which the second communication terminal side control unit has performed control such that the first encryption information received from the main communication terminal is decrypted with the first decryption key information received from the first communication terminal, the second communication terminal side control unit performs control such that the second decryption key information stored in the second communication terminal side storage unit is transmitted to the first communication terminal.

Furthermore, the present invention relates to a communication system, including: a first communication terminal that can be identified by way of first identification information; a second communication terminal that can be identified by way of second identification information; a main communication terminal that can transmit first encryption information to the second communication terminal, and can transmit second encryption information to the first communication terminal; and a server that can transmit first decryption key information for enabling decryption of the first encryption information generated by encrypting the first identification information, and can transmit second decryption key information for enabling decryption of the second encryption information generated by encrypting second associated information associated with the second identification information, in which the main communication terminal includes at least a main communication terminal side storage unit, a main communication terminal side control unit and a communication unit; the main communication terminal side storage unit stores the first identification information and the second associated information; in a case in which the first identification information is selected as information to be transmitted to the second communication terminal, the main communication terminal side control unit transmits the first encryption information generated by encrypting the first identification information to the second communication terminal via the communication unit, and transmits the second encryption information generated by encrypting the second associated information to the first communication terminal via the communication unit; the first communication terminal includes at least a first communication terminal side storage unit and a first communication terminal side control unit; the first communication terminal side storage unit stores the first decryption key information; in a case in which the second encryption information is received from the main communication terminal, the first communication terminal side control unit performs control such that the first decryption key information stored in the first communication terminal side storage unit can be transmitted to the server; the second communication terminal includes at least a second communication terminal side storage unit, a second communication terminal side control unit and a second communication unit; the second communication terminal side storage unit stores the second decryption key information; in a case in which the first encryption information is received from the main communication terminal, the second communication terminal side control unit transmits the second decryption key information stored in the second communication terminal side storage unit to the server via the second communication unit; the server includes at least a server side control unit and a server communication unit; and in a case in which the first decryption key information is received from the first communication terminal, and the second decryption key information is received from the second communication terminal, the server side control unit transmits the second decryption key information to the first communication terminal via the server communication unit, and transmits the first decryption key information to the second communication terminal via the server communication unit.

Effects of the Invention

According to the present invention, it is possible to provide a communication terminal that can suppress the transmission of personal information against the intention of the person to whom the personal information belongs.

Moreover, according to the present invention, it is possible to provide a communication terminal that can suppress the continuation of a state in which the destination of personal information is unknown to the person to whom the personal information belongs.

In addition, the present invention can provide a communication system including such a communication terminal.

BRIEF DESCRIPTION OF THE DRAWINGS

FIG. 8 is an example of non-permission notification mail in Example 1-2;

FIG. 10 is a functional block diagram illustrating a functional configuration of a first cellular telephone device A2 according to the second embodiment;

FIG. 11 is a functional block diagram illustrating a functional configuration of a second cellular telephone device B2 according to the second embodiment;

FIG. 12 is a sequence diagram showing operations in Example 2-1 relating to the communication system of the second embodiment;

FIG. 13 is an example of encryption information transmission completion notification mail in Examples 2-1 and 2-2;

FIG. 14 is a sequence diagram showing operations in Example 2-2 relating to the communication system of the second embodiment;

FIG. 15 is a sequence diagram showing operations in Example 2-3 relating to the communication system of the second embodiment;

FIG. 16 is an example of encryption information transmission completion notification mail in Example 2-3;

FIG. 17 is a functional block diagram illustrating a functional configuration of a main cellular telephone device 1B according to a third embodiment;

FIG. 18 is a functional block diagram illustrating a functional configuration of a first cellular telephone device A3 according to the third embodiment;

FIG. 20 is an example of data transmission completion notification mail in Example 3;

FIG. 31 is an example of second notification information mail in Example 4-1;

FIG. 33 is an example of second request information mail in Example 4-2;

FIG. 34 is an example of third notification information mail in Example 4-2;

FIG. 44 is a diagram showing address book information to be added to transmitted information.

Figure 1:
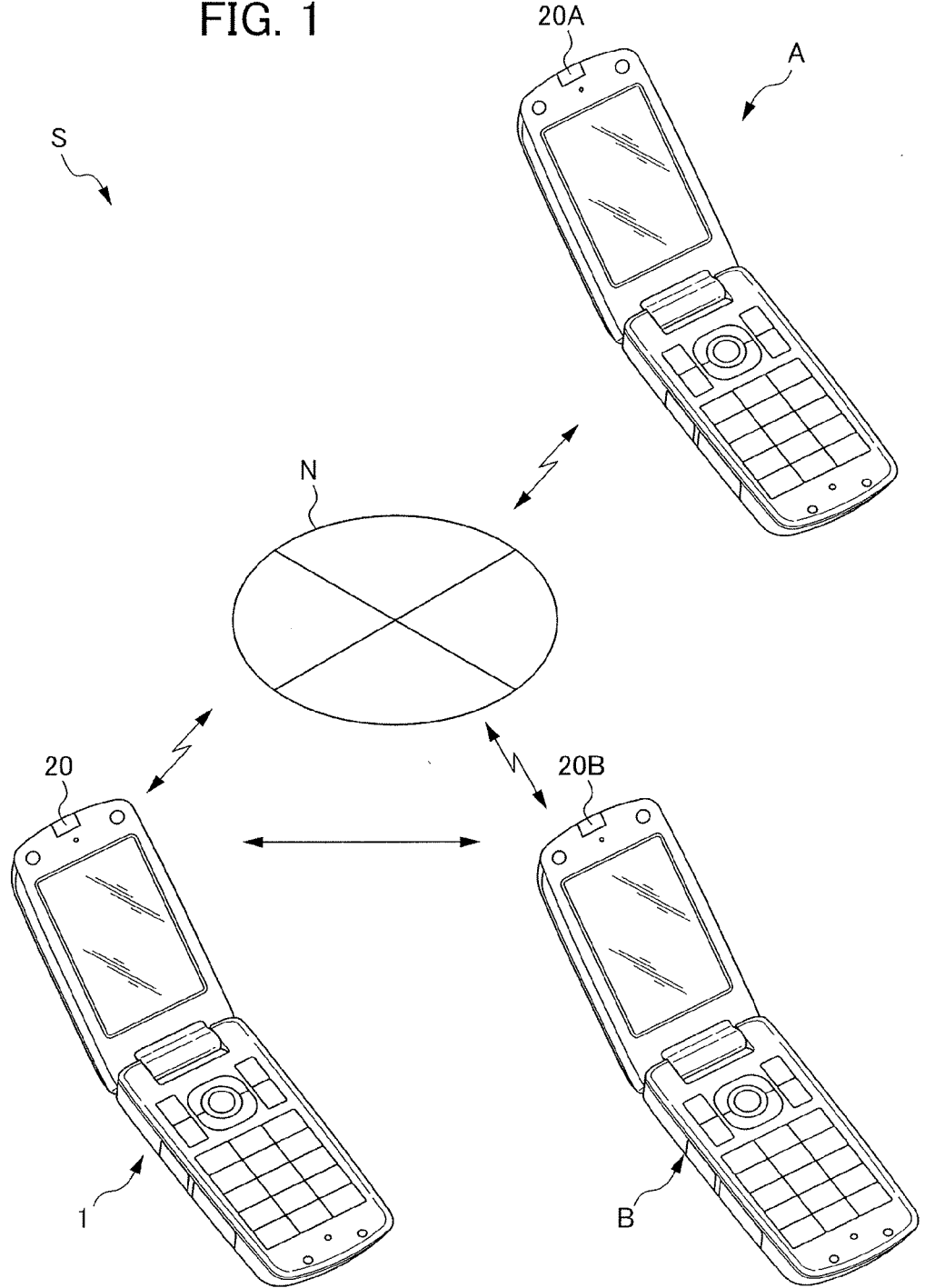
FIG. 1 is a diagram illustrating an overview of a communication system S including a main cellular telephone device 1.

EXPLANATION OF REFERENCE NUMERALS 1, 1A, 1B, 1C, 1D, 1E, 1F main cellular telephone device (main communication terminal)
A, A1, A2, A3, A4, A5, A6 first cellular telephone device (first communication terminal)
B, B1, B2, B3, B4, B5, B6 second cellular telephone device (second communication terminal)
S communication system
N communication network
W, W1 server
20 first communication unit (communication unit)
20B second communication terminal side first communication unit
21, 21A, 21B display unit
80, 80A timer (timing unit)
80B timer (second communication terminal side timing unit)
45, 45A, 45B, 45C, 45D, 45E, 45F CPU (control unit)
121, 221, 321, 421, 521 selection unit (information creation unit)
122, 222, 322, 422, 522 reply request unit
123, 223, 323, 423, 523 first communication permission unit, first transmission permission unit
124 notification unit
131, 231, 331, 431, 531 first identification/associated information storage unit (first storage unit)
134, 234, 334, 434, 534 second identification/associated information storage unit (second storage unit)
200 second communication unit (communication unit)
200A first communication terminal side second communication unit
200B second communication terminal side second communication unit
224, 424 encryption processing unit
225 second communication permission unit
227 third communication permission unit
236 third information storage unit (third storage unit)
241 first communication terminal side third communication permission unit
242 first communication terminal side notification unit
251, 437, 537 decryption key information storage unit
262 decryption key request unit
263 erasing unit
324 fourth communication permission unit
341 comparing unit
342 extracting unit
343 display control unit
424 encryption processing unit
425 encryption information transmission permission unit
426 first notification information transmission unit
436 third information storage unit (third storage unit)
441 first communication terminal side decryption key information transmission unit
442, 542 non-permission information transmission unit
451 first communication terminal side first storage unit
452 first communication terminal side second storage unit
453, 552 first communication terminal side decryption key information storage unit
462 second communication terminal side decryption key information request unit
461 decryption processing unit
463 second communication terminal side erasing unit
471 second communication terminal side encryption information storage unit
571 second communication terminal side decryption key information storage unit
544 first communication terminal side decryption processing unit
561 second communication terminal side decryption processing unit
911 second notification information transmission unit 912, 1011 server side decryption key information transmission unit
913, 1012 server side determination unit
914 server side decryption key information request unit
915 third notification information transmission unit
916 fourth notification information transmission unit
917 server side erasing unit
918 first erasing instruction information transmission unit
941 server side first storage unit
942 server side second storage unit
943 server side decryption key information storage unit
960 server side second communication unit (server side communication unit)

DETAILED DESCRIPTION OF THE INVENTION

Embodiments of the present invention are hereinafter described with reference to the drawings. First, with reference to FIG. 1, a description is provided for a communication system S that includes a main cellular telephone device 1 as a (main) communication terminal, a first cellular telephone device A1 as a first communication terminal, and a second cellular telephone device B1 as a second communication terminal. FIG. 1 is a diagram illustrating an overview of the communication system S including the main cellular telephone device 1.

As shown in FIG. 1, the communication system S includes the main cellular telephone device 1, the first cellular telephone device A1, and the second cellular telephone device B1. Here, users of the first cellular telephone device A1, the main cellular telephone device 1, and the second cellular telephone device B1 are referred to as a user X, a user Y and a user Z, respectively.

The main cellular telephone device 1 can transmit and receive predetermined information to and from the first cellular telephone device A1 and the second cellular telephone device B1 by way of wireless communication (second communication method) via a communication network N. In addition, the main cellular telephone device 1 can transmit and receive predetermined information to and from the second cellular telephone device B1 by way of infrared communication (first communication method).

In a case in which the main cellular telephone device 1 transmits predetermined information to the second cellular telephone device B1 by way of infrared communication, the main cellular telephone device 1 is disposed adjacent to the second cellular telephone device B1. On the other hand, the first cellular telephone device A1 is disposed at a position separated from the main cellular telephone device 1 and the second cellular telephone device B1. In other words, the main cellular telephone device 1 is disposed at a position in which it is not possible to directly confirm whether personal information of the user X may be transmitted to the user (the user X) of the first cellular telephone device A1. Even in this state, the communication system S in the present embodiment achieves an effect.

Figure 2:
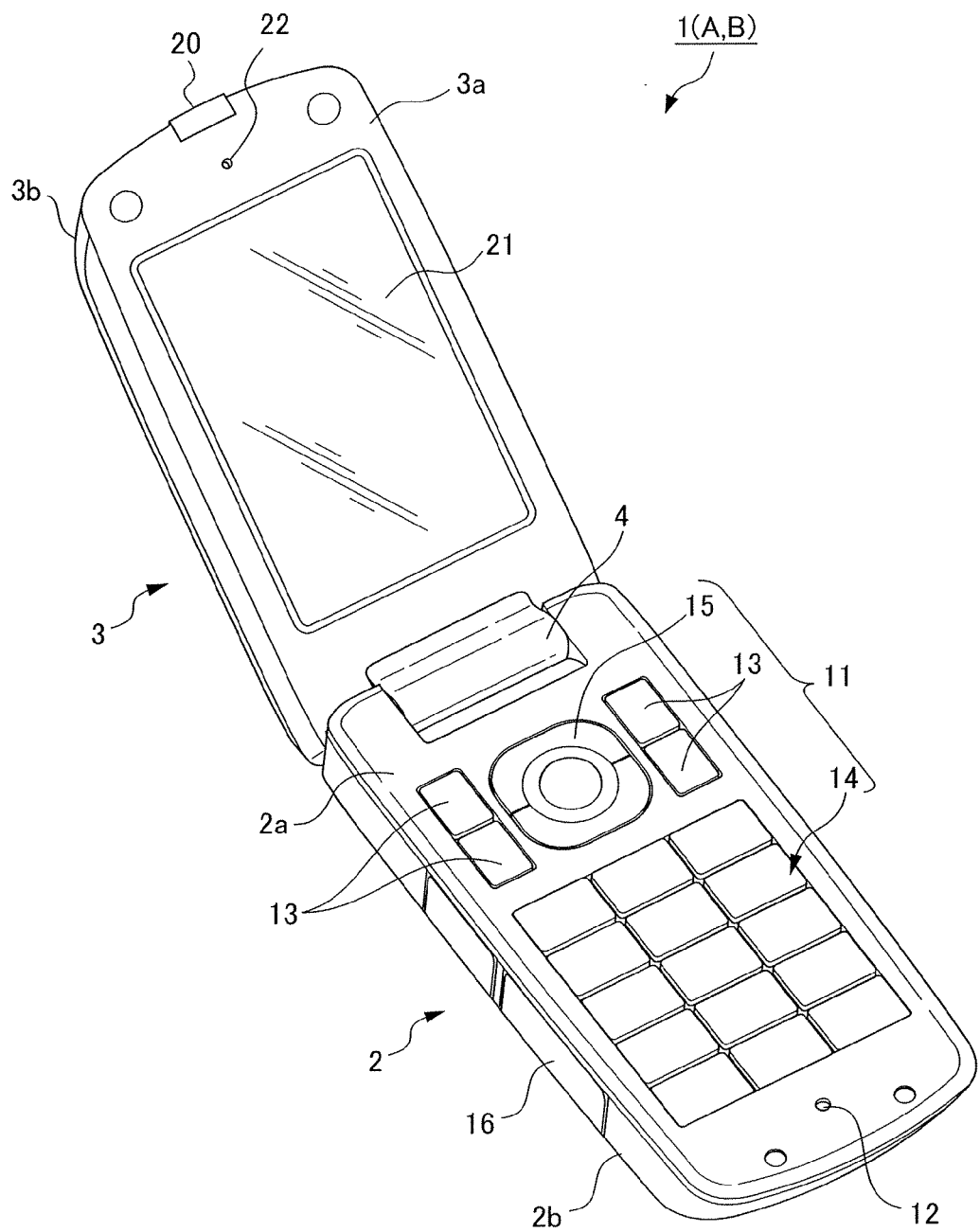
FIG. 2 is a perspective view showing an appearance of the main cellular telephone device 1 in an opened state.

Next, a detailed description is provided for the configuration of the main cellular telephone device 1 according to the communication system S of the first embodiment with reference to FIG. 2. FIG. 2 is a perspective view showing an appearance of the main cellular telephone device 1 in an opened state.

As shown in FIG. 2, the main cellular telephone device 1 includes an operation unit side body 2 and a display unit side body 3 as its bodies. The operation unit side body 2 and the display unit side body 3 are connected so as to be openable and closable via a connecting portion 4 including a hinge mechanism. More specifically, an upper end portion of the operation unit side body 2 and a lower end portion of the display unit side body 3 are connected via the connecting portion 4 including the hinge mechanism. As a result, the main cellular telephone device 1 is configured such that the operation unit side body 2 and the display unit side body 3 connected via the hinge mechanism can be relatively moved. In other words, the main cellular telephone device 1 can be transformed between a state in which the operation unit side body 2 and the display unit side body 3 are opened (the opened state), and a state in which the operation unit side body 2 and the display unit side body 3 are folded (a closed state). Here, the closed state refers to a state in which both bodies are disposed so as to be mutually superimposed. The opened state refers to a state in which both bodies are disposed so as not to be mutually superimposed.

An outer face of the operation unit side body 2 is configured with a front case 2a and a rear case 2b. The operation unit side housing 2 is configured to expose, on the front case 2a side, both an operation key set 11 as an input unit and a microphone 12 to which sound produced by the user of the main cellular telephone device 1 during a phone call is input.

The operation key set 11 is configured with: function setting operation keys 13 for operating various functions such as for various settings, a telephone number directory function and a mail function; input operation keys 14 for inputting digits of a telephone number, characters for mail, etc.; and a selection operation key 15 for performing selection of the various operations and scrolls up, down, left and right. Predetermined functions are assigned (key assignment) to each key configuring the operation key set 11 in accordance with the opened/closed state of the operation unit side body 2 and the display unit side body 3, various modes, and the type of application that is running. An operation corresponding to a function assigned to each key is executed by the user depressing each key.

The microphone 12 is disposed on an outer end side that is opposite to the connecting portion 4 side of the operation unit side body 2 in a longitudinal direction. In other words, the microphone 12 is disposed on one outer end side of the main cellular telephone device 1 in the opened state.

An interface (not illustrated) for communicating with an external device (for example, a host device) is disposed on one side face of the operation unit side body 2. Side keys to which predetermined functions are assigned, and an interface (not illustrated) where external memory is inserted and removed are disposed on another side face of the operation unit side body 2. The interfaces are covered by caps. When not in use, an interface is covered by the respective cap.

An outer surface of the display unit side body 3 is configured with a front case 3a and a rear case 3b. On the front case 3a of the display unit side body 3, a display unit 21 for displaying a variety of information, and a speaker 22 as a receiver that outputs sound of the other party of a phone call are disposed so as to be exposed to the outside. Here, the display unit 21 is configured with a liquid crystal display panel, a drive circuit that drives the liquid crystal display panel, and a light source unit such as a backlight that irradiates light from the back face side of the liquid crystal display panel.

Figure 3:
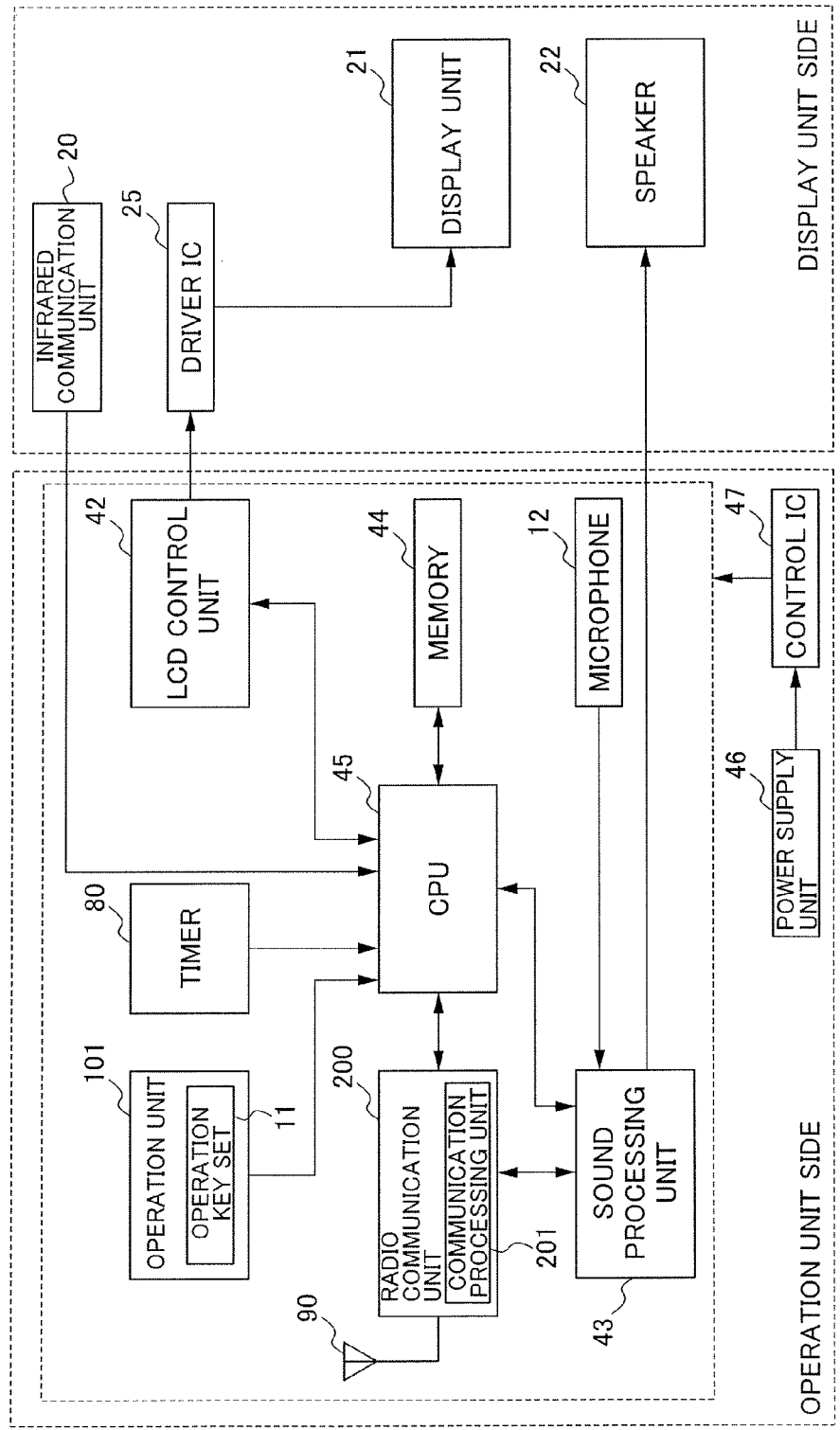
FIG. 3 is a circuit block diagram illustrating a circuit configuration of the main cellular telephone device 1 according to a first embodiment.

Next, a circuit configuration of the main cellular telephone device 1 is described with reference to FIG. 3. FIG. 3 is a circuit block diagram illustrating a circuit configuration of the main cellular telephone device 1 according to the first embodiment.

As shown in FIG. 3, the operation unit side body 2 of the main cellular telephone device 1 includes: a radio communication unit 200 as a second communication unit; an operation unit 101 as an input unit; the microphone 12; an LCD control unit 42; a sound processing unit 43; memory 44; a CPU 45; a power supply unit 46; a control IC 47; and a timer 80 as a timing unit. In addition, the display unit side body 3 of the main cellular telephone device 1 includes: the display unit 21, the speaker 22, a driver IC 25, and an infrared communication unit 20 as a first communication unit.

It should be noted that a communication unit conforming to, for example, Bluetooth (IEEE 802.15.1, registered trademark) may be provided in place of the infrared communication unit 20, or in addition to the infrared communication unit 20.

The radio communication unit 200 includes an antenna unit 90 and a communication processing unit 201.

The radio communication unit 200 is configured so as to be capable of externally transmitting and receiving predetermined information. The radio communication unit 200 performs communication by way of a method using radio waves (the second communication method) that is different from infrared communication. The radio communication unit 200 can transmit predetermined information to the first cellular telephone device A via the predetermined communication network N (see FIG. 1). The radio communication unit 200 can, for example, transmit predetermined information as a text of E-mail or as an attachment to E-mail.

The radio communication unit 200 can, for example, transmit information such as: address information (first identification information) such as a mail address and a telephone number; profile information (first associated information) such as a name, an address and a profile; information for prompting a user (the user Z) of another cellular telephone device to transmit a reply of permitting transmission of predetermined information; information for permitting transmission of predetermined information; and decryption key information including a decryption key for decrypting predetermined encryption information.

Based on a predetermined communication method (for example, CDMA (Code Division Multiple Access) 2000_1x or the like), the antenna unit 90 performs communication by phone, mail or the like with other communication terminals via a base station.

The communication processing unit 201 is configured with a transmitting circuit that performs transmission processing, and a receiving circuit that performs reception processing. The communication processing unit 201 performs demodulation processing by the receiving circuit on a signal received via the antenna unit 90, and transmits the signal thus processed to the CPU 45. In addition, the communication processing unit 201 performs modulation processing by the transmitting circuit on the signal transmitted from the CPU 45, and transmits the signal to a base station via the antenna unit 90.

The operation unit 101 is configured to include the operation key set 11.

The LCD control unit 42 performs predetermined image processing on input image data in accordance with control by the CPU 45, and outputs the image data, on which the image processing has been performed, to the driver IC 25. The driver IC 25 stores the image data being input from the LCD control unit 42 in frame memory, and outputs the image data stored in the frame memory to the display unit 21 at predetermined timing.

The display unit 21 displays predetermined characters and images based on the data that is input from the driver IC 25.

The memory 44 stores predetermined data. More specifically, the memory 44 has various storage units that store a variety of data and application programs for operating various functions (see FIG. 4). Details about the memory 44 will be described later.

The CPU 45 controls the entirety of the main cellular telephone device 1. The CPU 45 performs predetermined control of the radio communication unit 200, the LCD control unit 42 and the sound processing unit 43, in particular. Details about the CPU 45 will be described later.

In accordance with control by the CPU 45, the sound processing unit 43 performs predetermined sound processing on a signal transmitted from the communication processing unit 201, and outputs the signal on which the sound processing has been performed to the speaker 22. Based on a signal transmitted from the sound processing unit 43, the speaker 22 outputs sound externally. Moreover, in accordance with control by the CPU 45, the sound processing unit 43 performs predetermined processing on a signal that is input from the microphone 12, and outputs the signal thus processed to the communication processing unit 201. The communication processing unit 201 performs predetermined processing on the signal that is input from the sound processing unit 43, and outputs the signal thus processed to the antenna unit 90.

The power supply unit 46 is configured to include a battery (not illustrated). The battery is composed of a lithium-ion battery having predetermined capacity.

The control IC 47 converts a power supply voltage, which is supplied from the power supply unit 46, into a predetermined power supply voltage, and supplies the power supply voltage thus converted to each unit (for example, the CPU 45 and the like) of the main cellular telephone device 1.

The timer 80 has a timing function. The timer 80 is configured to measure a period of time that elapses from a predetermined time, and to be capable of outputting a predetermined signal (a time-up signal) to the CPU 45 when the elapsed period of time exceeds a predetermined period of time. For example, the timer 80 measures a period of time since the radio communication unit 200 transmitted information for requesting a reply.

The infrared communication unit 20 is disposed in the display unit side body 3 in the vicinity of the end portion that is opposite to the connecting portion 4. The infrared communication unit 20 is configured to be compatible with the IrDA (Infrared Data Association) standard. The infrared communication unit 20 is configured to be capable of outputting a predetermined signal externally. The infrared communication unit 20 is configured to be capable of outputting information stored in the memory 44 and the like, which will be described later.

The infrared communication unit 20 transmits predetermined information stored in the memory 44 to the second cellular telephone device B that is disposed outside and includes a similar infrared communication unit 20B. The infrared communication unit 20 can transmit and receive information by way of an infrared communication method (the first communication method) using infrared light, which is a communication method different from that of the radio communication unit 200. Information transmitted from the communication unit 20 of the main cellular telephone device 1 is received by the communication unit 20B of the second cellular telephone device B as the second communication terminal.

The infrared communication unit 20 can transmit address information and profile information of the user Y of the main cellular telephone device 1, address information and profile information of the user X of the first cellular telephone device A, etc. Moreover, the infrared communication unit 20 can also transmit and receive encryption information that is profile information or the like on which encryption processing has been performed.

In an infrared communication mode that enables infrared communication, the selection operation key 15 is assigned with a function of selecting information (for example, address information and profile information) to be transmitted to another cellular telephone device (for example, the second cellular telephone device B) as the second communication terminal, and a function of determining transmission of the information thus selected.

Figure 4:
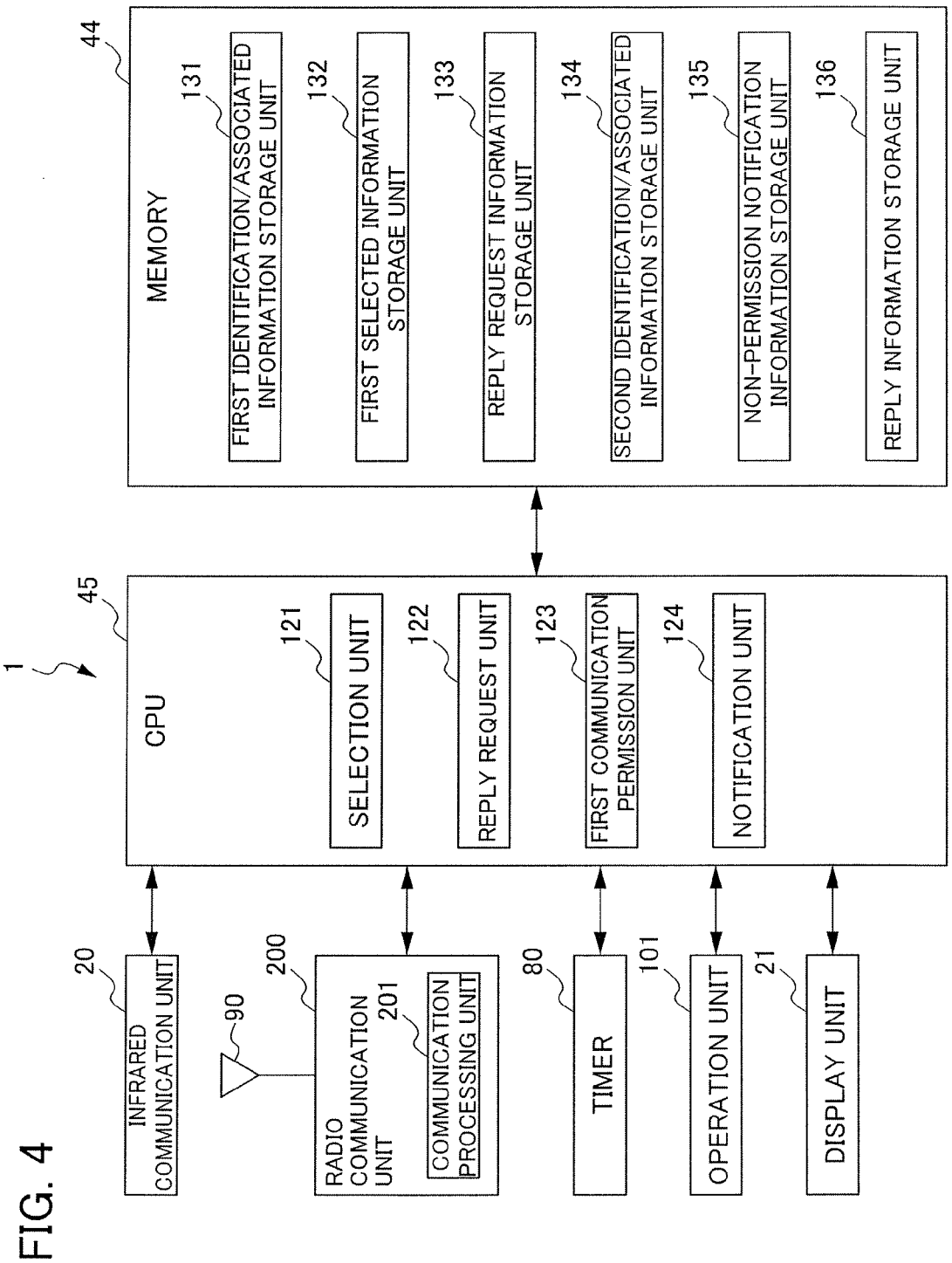
FIG. 4 is a functional block diagram illustrating a functional configuration of the main cellular telephone device 1 according to the first embodiment.

Next, functions of the main cellular telephone device 1 according to the first embodiment are described in detail with reference to FIG. 4. FIG. 4 is a functional block diagram illustrating a functional configuration of the main cellular telephone device 1 according to the first embodiment. Here, the functional configuration relating to the memory 44 and the functional configuration relating to the CPU 45 are mainly described with reference to FIG. 4.

The memory 44 includes: a first identification/associated information storage unit 131, a first selected information storage unit 132, a reply request information storage unit 133, a second identification/associated information storage unit 134, a non-permission notification information storage unit 135, and a reply information storage unit 136.

The first identification/associated information storage unit 131 stores first identification information corresponding to the first cellular telephone device A1, and first associated information that is associated with the first identification information. The first identification information is information corresponding to the first cellular telephone device A1 or its user (the user X), and is, for example, a mail address, a telephone number (address information) and the like of the user X. The first associated information is information associated with the first identification information, and is, for example, a name, an address, a profile (profile information), a facial photograph and the like of the user X.

The first selected information storage unit 132 stores information selected by a selection unit 121 of the CPU 45, which will be described later. More specifically, the first selected information storage unit 132 stores "a part or all of the first identification information and the first associated information stored in the first identification/associated information storage unit 131" selected by the selection unit 121 of the CPU 45.

It should be noted that the "part or all of the first identification information and the first associated information" is hereinafter also referred to as "first identification/associated information".

The reply request information storage unit 133 stores reply request information transmitted by a reply request unit 122 of the CPU 45, which will be described later.

The second identification/associated information storage unit 134 stores second identification information corresponding to the second cellular telephone device B1, and second associated information that is associated with the second identification information. The second identification information is information corresponding to the second cellular telephone device B1 or its user (the user Z), and is, for example, a mail address, a telephone number (address information) and the like of the user Z. The second associated information is information associated with the second identification information, and is, for example, a name, an address, a profile (profile information), a photograph and the like of the user Z.

It should be noted that the "part or all of the second identification information and the second associated information" is hereinafter also referred to as "second identification/associated information".

The non-permission notification information storage unit 135 stores non-permission notification information transmitted by a notification unit 124 of the CPU 45, which will be described later.

The reply information storage unit 136 stores information replied from the first cellular telephone device A1.

Next, the functional configuration of the CPU 45 is described. The CPU 45 includes the selection unit (information creation unit) 121, the reply request unit 122, a first communication permission unit 123, and the notification unit 124.

It should be noted that the CPU 45 of the main cellular telephone device 1 performs control such that the radio communication unit 200 is preferentially used rather than the infrared communication unit 20, for communication with the first cellular telephone device A1. By performing control in this way, even in a case in which the user (the user X) of the first cellular telephone device A is not present near the user (the user Y) of the main cellular telephone device 1, communication with the first cellular telephone device A1 can be performed more reliably by using the radio communication unit 200 via the communication network N.

From among the first identification/associated information stored in the first identification/associated information storage unit 131, the selection unit 121 selects information to be transmitted by the infrared communication unit 20 to the second cellular telephone device B1. For example, the selection unit 121 selects a mail address of the user X. The first identification/associated information selected by the selection unit 121 is also referred to as "first selected information". The selection unit 121 causes the first selected information storage unit 132 of the memory 44 to store the first selected information.

In a case in which the information selected by the selection unit 121 is the first identification/associated information, the reply request unit 122 causes the radio communication unit 200 to transmit, to the first cellular telephone device A1, information (reply request information) for requesting a reply regarding whether to permit transmission of the first identification/associated information (the first selected information). For example, in a case in which the first selected information is a mail address of the user X, the radio communication unit 200 is caused to transmit, to the first cellular telephone device A1, information (reply request information) for requesting a reply regarding whether to permit transmission of the mail address of the user X.

In a case in which the radio communication unit 200 receives a permission reply for permitting transmission of the first identification/associated information (the first selected information) that has been returned from the first cellular telephone device A1, the first communication permission unit 123 permits the infrared communication unit 20 to transmit the first selected information to the second cellular telephone device B1. For example, in a case in which the radio communication unit 200 receives a permission reply for permitting transmission of the mail address of the user X, the infrared communication unit 20 is permitted to transmit the mail address of the user X to the second cellular telephone device B1.

Moreover, in a case in which a period of time measured by the timer 80 exceeds a predetermined period of time (for example, 5 minutes), the first communication permission unit 123 does not permit transmission of the first identification/ associated information (the first selected information) to the second cellular telephone device B1.

Moreover, in a case in which after the first communication permission unit 123 does not permit transmission of the first identification/associated information (the first selected information, for example, a mail address of the user X), the radio communication unit 200 subsequently receives a permission reply, the first communication permission unit 123 permits transmission of the first selected information to the second cellular telephone device B1 when the first selected information is selected again by the selection unit 121.

In a case in which a period of time measured by the timer 80 exceeds a predetermined period of time (for example, 5 minutes), and the first communication permission unit 123 does not permit transmission of the first identification/associated information (the first selected information, for example, a mail address of the user X) to the second cellular telephone device B1, the notification unit 124 causes the radio communication unit 200 to transmit non-permission notification information to the first cellular telephone device A1. The "non-permission notification information" is information for notifying of the fact that the first communication permission unit 123 does not permit transmission of the first selected information (for example, a mail address of the user X) to the second cellular telephone device B1.

The first cellular telephone device A1 and the second cellular telephone device B1 according to the first embodiment have a configuration similar to that of the main cellular telephone device 1 according to the first embodiment, except for the functional configurations of the memory 44 and the CPU 45 as described above. Therefore, the description regarding the main cellular telephone device 1 is appropriately applied to the first cellular telephone device A1 and the second cellular telephone device B1, and descriptions thereof are omitted.

Figure 5:
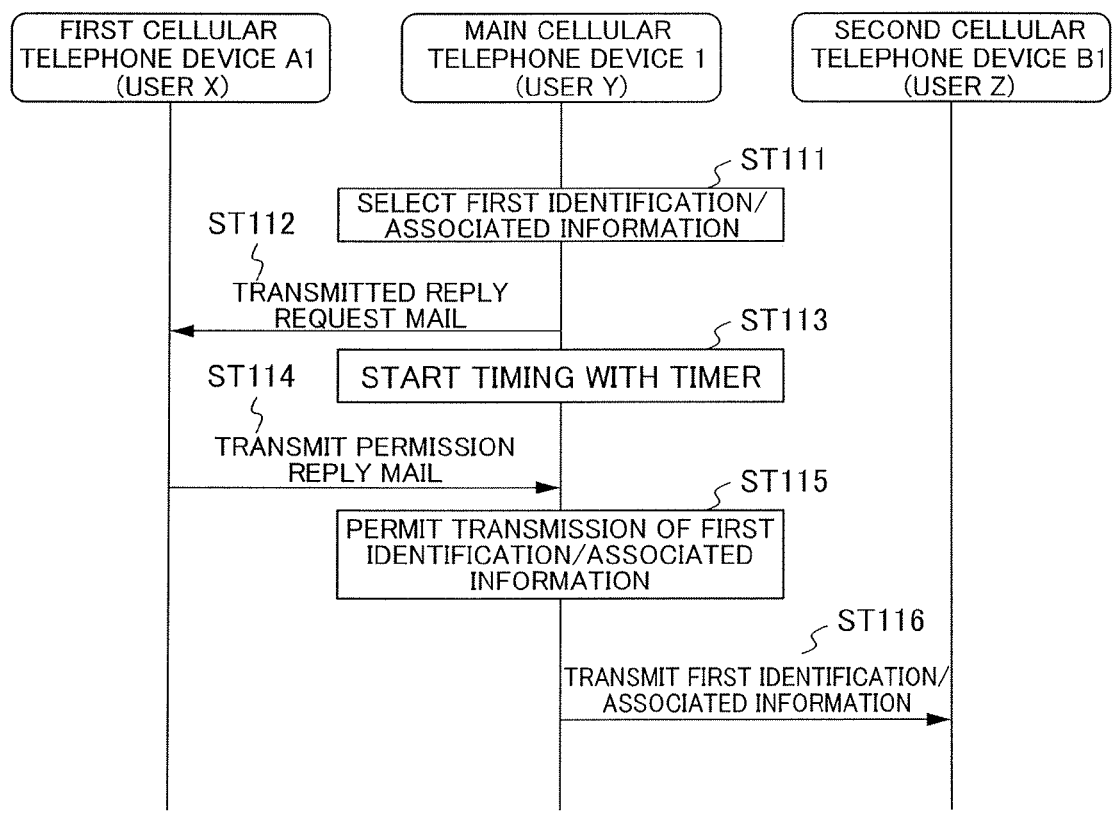
FIG. 5 is a sequence diagram showing operations in Example 1-1 relating to the communication system of the first embodiment.
Figure 6:
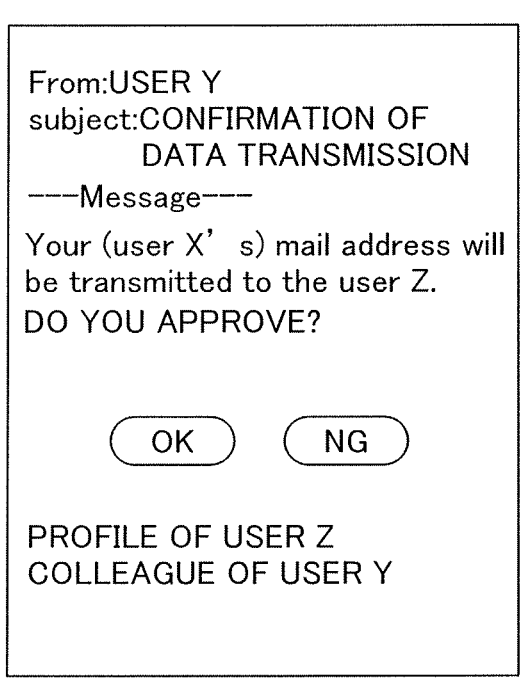
FIG. 6 is an example of reply request mail in Example 1-1.
Figure 7:
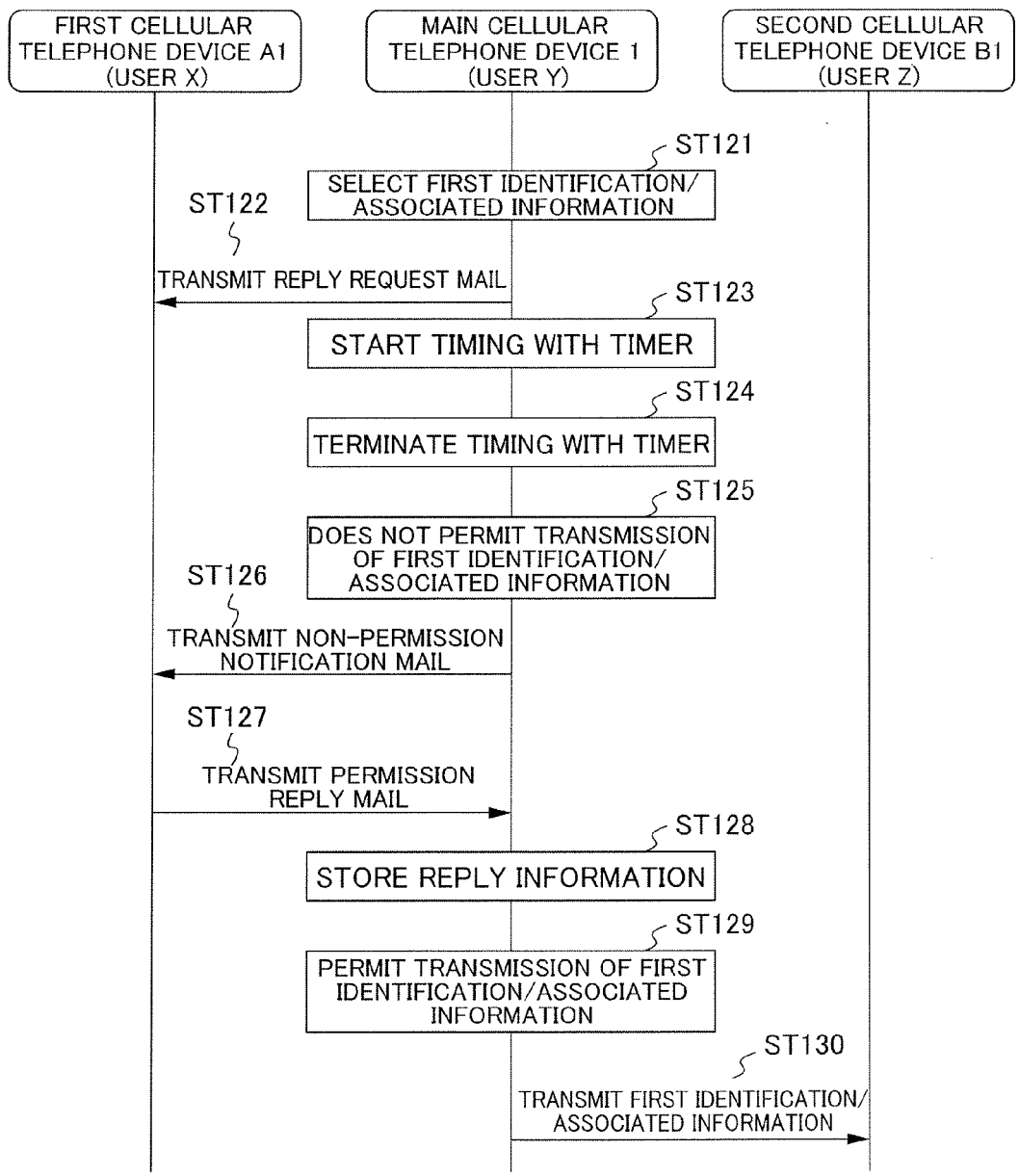
FIG. 7 is a sequence diagram showing operations in Example 1-2 relating to the communication system of the first embodiment.

Next, a description is provided for operations of the communication system of the first embodiment, which includes the main cellular telephone device 1, the first cellular telephone device A1, and the second cellular telephone device B1. Examples 1-1 and 1-2 are hereinafter described as examples relating to the communication system of the first embodiment. Example 1-1 is an example of a case in which permission reply mail is received within a predetermined period of time after transmitting reply request mail. Example 1-2 is an example of a case in which permission reply mail is not received within a predetermined period of time after transmitting reply request mail. FIG. 5 is a sequence diagram showing operations in Example 1-1 according to the communication system of the first embodiment. FIG. 6 is an example of the reply request mail in Example 1-1. FIG. 7 is a sequence diagram showing operations in Example 1-2 according to the communication system of the first embodiment. FIG. 8 is an example of the non-permission notification mail in Example 1-2.

Example 1-1

Operations in Example 1-1 are described with reference to FIGS. 5 and 6.

When the user Y performs an operation to select information to be transmitted to the user Z from among the first identification/associated information, in Step ST111, the selection unit 121 of the CPU 45 selects information (the first selected information) to be transmitted to the second cellular telephone device B1 owned by the user Z from among the first identification/associated information stored in the first identification/associated information storage unit 131 of the memory 44. In the present example, the first selected information is a mail address of the user X. In addition, the selection unit 121 stores the first selected information in the first selected information storage unit 132 of the memory 44.

In Step ST112, in a case in which the first selected information is the first identification/associated information, the reply request unit 122 of the CPU 45 causes the radio communication unit 200 to transmit, to the first cellular telephone device A1, information (reply request information) for requesting a reply regarding whether to permit transmission of the first selected information. Here, the reply request information is stored in the reply request information storage unit 133 of the memory 44.

In the present example, the reply request unit 122 transmits mail (reply request mail) for requesting a reply regarding whether to permit transmission of the first selected information (a mail address) to the user X. As shown in FIG. 6, this reply request mail includes, for example, a message stating that "Your (the user X's) mail address will be transmitted to the user Z. Do you approve? OK/NG" for requesting confirmation and reply, and includes a profile of the user Z (for example, "the user Z is a colleague of the user Y").

In Step ST113, the timer 80 measures (times) a period of time (elapsed time) since the radio communication unit 200 transmitted the reply request information (reply request mail).

When the user X confirms the reply request mail, and performs an operation (selecting "OK") to transmit a reply (a permission reply) for permitting transmission of the first identification/associated information, in Step ST114, the CPU 45A of the first cellular telephone device A1 causes the radio communication unit 200A to transmit permission reply mail. As a result, the radio communication unit 200A of the first cellular telephone device A1 transmits the permission reply mail.

In a case in which the second cellular telephone device B1 receives the permission reply mail via the radio communication unit 200 before the elapsed time measured by the timer 80 reaches a predetermined period of time (for example, 5 minutes), in Step ST115, the first communication permission unit 123 permits the infrared communication unit 20 to transmit the first identification/associated information selected by the selection unit 121 (the first selected information stored in the first selected information storage unit 132) to the second cellular telephone device B1.

In Step ST116, the main cellular telephone device 1 transmits the first identification/associated information (a mail address of the user X) to the second cellular telephone device B1 via the infrared communication unit 20.

In this way, in Example 1-1, on condition of permission by the user X, the first identification/associated information (a mail address of the user X) is transmitted to the second cellular telephone device B1 owned by the user Z.

It should be noted that, in Example 1-1, in a case in which the first cellular telephone device A1 transmits reply mail for not permitting transmission of the first identification/associated information, and in a case in which the permission reply mail is not transmitted, the first identification/associated information (a mail address of user X) is not transmitted from the main cellular telephone device 1 to the second cellular telephone device B1.

Example 1-2

Operations in Example 1-2 are described with reference to FIGS. 7 and 7.

Since Steps ST121 to ST123 in Example 1-2 are similar to Steps ST111 to ST113 in Example 1-1, respectively, descriptions thereof are omitted.

In a case in which permission reply mail is not received from the first cellular telephone device A1 after the elapsed time measured by the timer 80 exceeds a predetermined period of time (for example, 5 minutes), in Step ST124, the timer 80 terminates the timing.

When the timer 80 terminates the timing, in Step ST125, the first communication permission unit 123 does not permit (does not approve) transmission of the first identification/associated information to the second cellular telephone device B1.

In addition, when the elapsed time measured by the timer 80 exceeds the predetermined period of time, and the first communication permission unit 123 does not permit transmission of the first identification/associated information to the second cellular telephone device B1, in Step ST126, the notification unit 124 causes the first cellular telephone device A1 to transmit non-permission notification information stored in the non-permission notification information storage unit 135 of the memory 44 (information for notifying of the fact that the first communication permission unit does not permit transmission of the first identification/associated information to the second cellular telephone device B1).

In the present example, as shown in FIG. 8, the notification unit 124 transmits non-permission notification mail (cancellation mail) stating that "Since a reply has not come from you (the user X), transmission of the mail address to the user Z is suspended. If you approve transmission of the mail address to the user Z, please reply as such."

After a predetermined period of time elapses since the non-permission notification mail was transmitted, in Step ST127, according to an operation by the user X, the radio communication unit 200 of the first cellular telephone device A1 transmits a reply (permission reply) for permitting transmission of the first selected information to the second cellular telephone device B1, or a reply (non-permission reply) for not permitting transmission of the first selected information to the second cellular telephone device B1. In addition, the permission reply or the non-permission reply is received by the radio communication unit 200 of the main cellular telephone device 1.

In Step ST128, the permission reply or the non-permission reply received by the main cellular telephone device 1 is stored in the reply information storage unit 136 of the memory 44.

In a case in which transmission of the first identification/associated information is not permitted, and the main cellular telephone device 1 subsequently receives a permission reply, in Step ST129, the first communication permission unit 123 permits transmission of the first identification/associated information to the second cellular telephone device B1 when the first identification/associated information is selected again by the selection unit 121.

In Step ST130, the main cellular telephone device 1 transmits the first identification/associated information (a mail address of the user X) to the second cellular telephone device B1 via the infrared communication unit 20.

In this way, in Example 1-2, even if a permission reply of the user X is not received within a predetermined period of time measured by the timer 80, so long as a permission reply is subsequently received, the first identification/associated information (a mail address of the user X) is transmitted to the second cellular telephone device B1 owned by the user Z.

It should be noted that, in a case in which the radio communication unit 200 receives a non-permission reply, even if the first identification/associated information is selected again by the selection unit 121, the first communication permission unit 123 does not permit transmission of the first identification/associated information to the second cellular telephone device B1.

As described above, according to the first embodiment, only in a case in which permission reply mail is received from the first cellular telephone device A1 (the user X), the main cellular telephone device 1 (the user Y) transmits the first identification/associated information (a mail address of the user X) to the second cellular telephone device B1 (the user Z). Therefore, the first identification/associated information that is personal information of the user X can be prevented from being transmitted to the user Z without permission of (against the intention of) the user X. A state in which the destination of personal information is unknown to oneself can be prevented from continuing.

Moreover, as in Example 1-2, even if permission reply mail is not received from the first cellular telephone device A1 (the user X) within a predetermined period of time, so long as permission reply mail is subsequently received, the main cellular telephone device 1 (the user Y) transmits the first identification/associated information (a mail address of the user X) to the second cellular telephone device B1 (the user Z) without the necessity of asking for permission from the user X again.

Next, the communication system S of a second embodiment is described. The communication system S of the second embodiment includes a main cellular telephone device 1A, a first cellular telephone device A2, and a second cellular telephone device B2.

Figure 9:
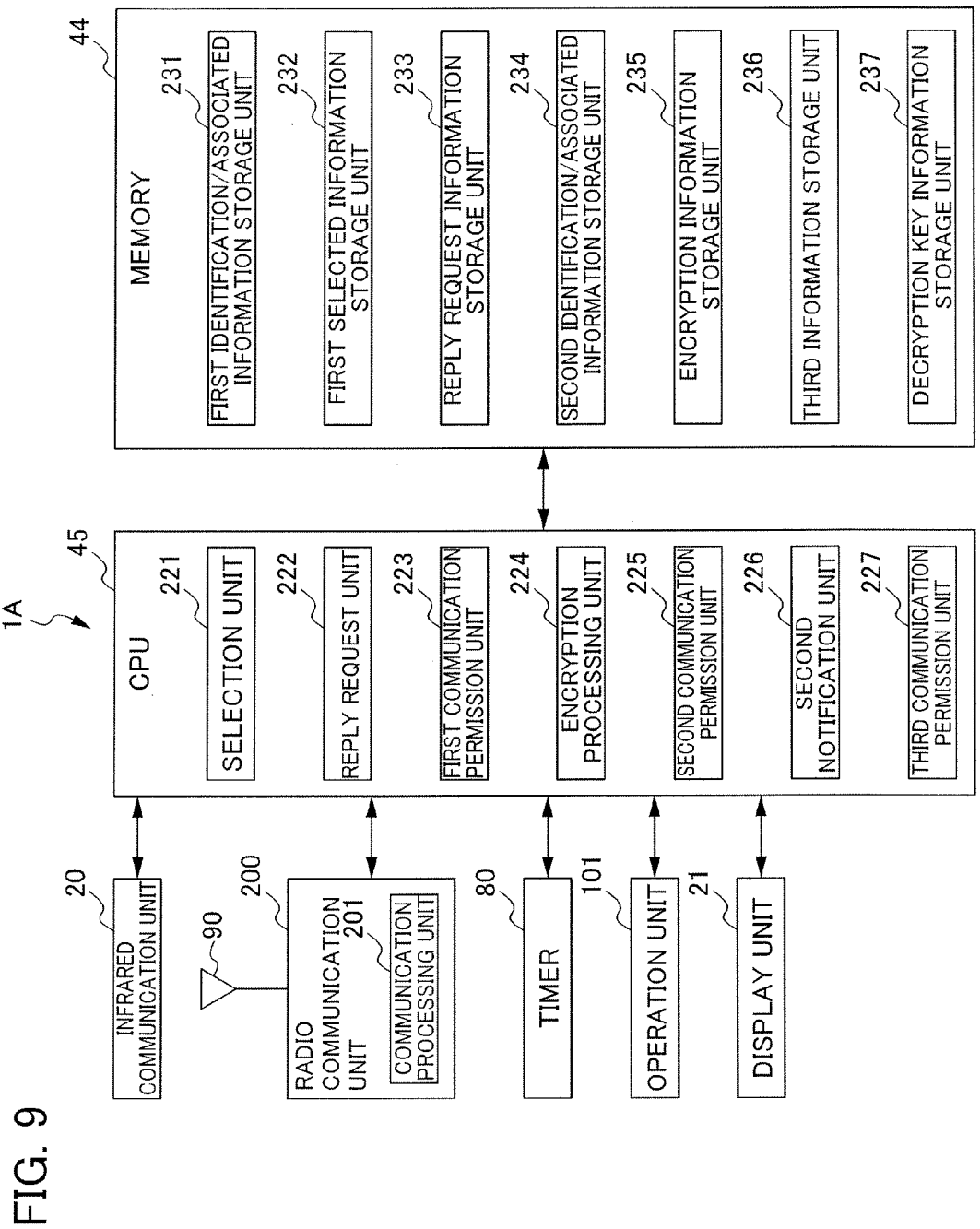
FIG. 9 is a functional block diagram illustrating a functional configuration of a main cellular telephone device 1A according to a second embodiment.

FIG. 9 is a functional block diagram illustrating a functional configuration of the main cellular telephone device 1A according to the second embodiment. FIG. 10 is a functional block diagram illustrating a functional configuration of the first cellular telephone device A2 according to the second embodiment. FIG. 11 is a functional block diagram illustrating a functional configuration of the second cellular telephone device B2 according to the second embodiment. FIG. 12 is a sequence diagram showing operations in Example 2-1 according to the communication system of the second embodiment. FIG. 13 is an example of encryption information transmission completion notification mail in Examples 2-1 and 2-2. FIG. 14 is a sequence diagram showing operations in Example 2-2 according to the communication system of the second embodiment. FIG. 15 is a sequence diagram showing operations in Example 2-3 according to the communication system of the second embodiment. FIG. 16 is an example of encryption information transmission completion notification mail in Example 2-3.

The functional configuration relating to the memory 44 and the functional configuration relating to the CPU 45 in the main cellular telephone device 1A are mainly described with reference to FIG. 9. Since configurations that are not described in particular are similar to the configurations of the main cellular telephone device 1 in the first embodiment shown in FIG. 4, descriptions thereof are omitted.

In the main cellular telephone device 1A according to the second embodiment, the memory 44 includes a first identification/associated information storage unit 231, a first selected information storage unit 232, a reply request information storage unit 233, a second identification/associated information storage unit 234, an encryption information storage unit 235, a third information storage unit 236 as a third storage unit, and a decryption key information storage unit 237.

The first identification/associated information storage unit 231, the first selected information storage unit 232, the reply request information storage unit 233, and the second identification/associated information storage unit 234 in the second embodiment are similar to the first identification/associated information storage unit 131, the first selected information storage unit 132, the reply request information storage unit 133, and the second identification/associated information storage unit 134 in the first embodiment, respectively; therefore, descriptions thereof are omitted.

The encryption information storage unit 235 stores encryption information generated by an encryption processing unit 224 that will be described later.

The third information storage unit 236 stores third information. The third information includes: a plurality of pieces of third identification information corresponding to a plurality of communication terminals, respectively; and a plurality of pieces of third associated information that are associated with the plurality of pieces of third identification information, respectively.

The third identification information is, for example, a mail address and a telephone number of a user. The third associated information is, for example, a name, an address and a profile of the user.

The decryption key information storage unit 237 stores decryption key information. The decryption key information includes a decryption key for decrypting predetermined encryption information, usable number-of-times restriction information for restricting the number of times the decryption key can be utilized for decryption processing of the encryption information, etc.

In the main cellular telephone device 1A according to the second embodiment, the CPU 45 includes a selection unit 221, a reply request unit 222, a first communication permission unit 223, an encryption processing unit 224, a second communication permission unit 225, a second notification unit 226, and a third communication permission unit 227.

The selection unit 221, the reply request unit 222 and the first communication permission unit 223 in the second embodiment are similar to the selection unit 121, the reply request unit 122 and the first communication permission unit 123 in the first embodiment, respectively; therefore, descriptions thereof are omitted.

In a case in which a period of time measured by the timer 80 exceeds a predetermined period of time, and thus the first communication permission unit 223 does not permit transmission of the first identification/associated information, the encryption processing unit 224 encrypts the first identification/associated information to generate encryption information. Moreover, the encryption processing unit 224 causes the decryption key information storage unit 237 of the memory 44 to store decryption key information including a decryption key for decrypting this encryption information.

The second communication permission unit 225 permits the infrared communication unit 20 to transmit the encryption information generated by the encryption processing unit 224 to the second cellular telephone device B1.

In a case in which the main cellular telephone device 1A transmits encryption information to the second cellular telephone device B2, the second notification unit 226 causes the radio communication unit 200 to transmit, to the first cellular telephone device A2, information for notifying of the fact that encryption information generated by encrypting the first identification/associated information has been transmitted to the second cellular telephone device B2.

In a case in which encryption information is transmitted to the second cellular telephone device B2, and the radio communication unit 200a subsequently receives a permission reply from the first cellular telephone device A2, the third communication permission unit 227 permits the radio communication unit 200 to transmit the decryption key information including the decryption key for decrypting the encryption information. In addition, the third communication permission unit 227 permits the infrared communication unit 20 to transmit the decryption key information stored in the decryption key information storage unit 237 to the second cellular telephone device B2. In addition, the third communication permission unit 227 permits the radio communication unit 200 to transmit the decryption key information stored in the decryption key information storage unit 237 to the first cellular telephone device A2.

Next, the functional configuration relating to memory 44A and the functional configuration relating to a CPU 45A in the first cellular telephone device A2 according to the second embodiment are mainly described with reference to FIG. 10. Since configurations that are not described in particular are similar to the configurations of the main cellular telephone device 1A in the second embodiment, descriptions thereof are omitted. Moreover, among the configurations of the first cellular telephone device, the configurations similar to the configurations of the main cellular telephone device are denoted by reference numerals with a suffix "A" (for example, the infrared communication unit 20 of the main cellular telephone device is denoted as an infrared communication unit 20A of the first cellular telephone device).

In the first cellular telephone device A2 according to the second embodiment, the memory 44A includes a decryption key information storage unit 251, and a decryption key information transmission information storage unit 252.

The decryption key information storage unit 251 stores decryption key information that is transmitted from the main cellular telephone device 1A and is received via the radio communication unit 200A.

The decryption key information transmission information storage unit 252 stores decryption key information transmission information that is transmitted to the main cellular telephone device 1A by a first communication terminal side notification unit 242 of the CPU 45A, which will be described later.

In the first cellular telephone device A2 according to the second embodiment, the CPU 45A includes a first communication terminal side third communication permission unit 241 and the first communication terminal side notification unit 242.

The first communication terminal side third communication permission unit 241 permits the radio communication unit 200A of the first cellular telephone device A2 to transmit decryption key information stored in the decryption key information storage unit 251 to the second cellular telephone device B2.

In a case in which the first communication terminal side third communication permission unit 241 transmits decryption key information to the second cellular telephone device B2, the first communication terminal side notification unit 242 causes the radio communication unit 200A to transmit information (decryption key information transmission notification information), to the main communication terminal 1A, for notifying of the fact that the decryption key information has been transmitted to the second cellular telephone device B2.

Next, the functional configuration relating to memory 44B and the functional configuration relating to a CPU 45B in the second cellular telephone device B2 according to the second embodiment are mainly described with reference to FIG. 11. Since configurations that are not described in particular are similar to the configurations of the main cellular telephone device 1A in the second embodiment, descriptions thereof are omitted. Moreover, among the configurations of the second cellular telephone device, the configurations similar to the configurations of the main cellular telephone device are denoted by reference numerals with a suffix "B" (for example, the infrared communication unit 20 of the main cellular telephone device is denoted as the infrared communication unit 20B of the second cellular telephone device).

In the second cellular telephone device B2 according to the second embodiment, a timer 80B measures a period of time elapsed since the infrared communication unit 20B received encryption information transmitted from the main communication terminal 1A.

In the second cellular telephone device B2 according to the second embodiment, the memory 44B includes a second encryption information storage unit 271 and a decryption key request information storage unit 272.

The second encryption information storage unit 271 stores encryption information that is transmitted from the main cellular telephone device 1A and is received via the infrared communication unit 20B.

The decryption key request information storage unit 272 stores information for requesting a decryption key from the main cellular telephone device 1A.

In the second cellular telephone device B2 according to the second embodiment, the CPU 45B includes a decryption processing unit 261, a decryption key request unit 262, and an erasing unit 263.

Based on information including a decryption key, the decryption processing unit 261 decrypts encryption information to generate the first identification/associated information.

In a case in which the infrared communication unit 20B receives encryption information transmitted from the main cellular telephone device 1A, the decryption key request unit 262 causes the radio communication unit 200B to transmit request information (decryption key information transmission request information) to the main cellular telephone device 1A to request transmission of decryption key information including a decryption key for decrypting the encryption information.

In a case in which the elapsed time measured by the timer 80B exceeds a predetermined period of time, the erasing unit 263 erases the encryption information stored in the second encryption information storage unit 271.

Next, a description is provided for operations of the communication system of the second embodiment, which includes the main cellular telephone device 1A, the first cellular telephone device A2, and the second cellular telephone device B2. Examples 2-1, 2-2 and 2-3 are hereinafter described as examples relating to the communication system of the second embodiment.

FIG. 12 is a sequence diagram showing operations in Example 2-1 relating to the communication system of the second embodiment. FIG. 13 is an example of the encryption information transmission completion notification mail in Examples 2-1 and 2-2. FIG. 14 is a sequence diagram showing operations in Example 2-2 relating to the communication system of the second embodiment. FIG. 15 is a sequence diagram showing operations in Example 2-3 relating to the communication system of the second embodiment. FIG. 16 is an example of the encryption information transmission completion notification mail in Example 2-3.

Example 2-1

Operations in Example 2-1 are described with reference to FIGS. 12 and 13.

Since Steps ST211 to ST215 in Example 2-1 are similar to Steps ST121 to ST125 in Example 1-2, respectively, descriptions thereof are omitted.

It should be noted that, although not illustrated in the sequence diagram shown in FIG. 12, in a case in which the radio communication unit 200 receives a permission reply returned from the first cellular telephone device A2 for permitting transmission of the first identification/associated information before the elapsed time measured by the timer 80 exceeds a predetermined period of time (for example, 5 minutes), the first communication permission unit 223 permits the infrared communication unit 20 to transmit the first identification/associated information to the second cellular telephone device B2.

Regarding Example 2-1, Steps ST216 and after are described.

In Step ST215, in a case in which the elapsed time measured by the timer 80 exceeds a predetermined period of time (for example, 5 minutes), and thus the first communication permission unit 223 does not permit transmission of the first identification/associated information to the second cellular telephone device B2, in Step ST216, the encryption processing unit 224 encrypts the first identification/associated information to generate encryption information. In addition, the encryption processing unit 224 stores the encryption information thus generated in the encryption information storage unit 235 of the memory 44.

In Step ST217, the second communication permission unit 225 permits the infrared communication unit 20 to transmit the encryption information, which is generated by the encryption processing unit 224 and is stored in the encryption information storage unit 235, to the second cellular telephone device B2. As a result, the infrared communication unit 20 of the main cellular telephone device 1A transmits the encryption information to the second cellular telephone device B2.

After transmitting encryption information to the second cellular telephone device B2, in Step ST218, the second notification unit 226 notifies the first cellular telephone device A2 of the information that the encrypted first identification/associated information (encryption information) has been transmitted to the user Z, and information for requesting permission for transmitting a decryption key or the like for decrypting the encryption information to the user Z.

In the present example, as shown in FIG. 13, the second notification unit 226 transmits encryption information transmission completion notification mail stating that "Although there has been no reply from you (the user X), transmission of the encrypted information (a mail address) to the user Z has been completed. If you permit a decryption key for the encryption information to be transmitted to the user Z, please send your permission reply. Please note that, if the encryption information is not decrypted within 12 hours since the user Z received the encryption information, the encryption information will be erased."

On the other hand, in the second cellular telephone device B2, in Step ST219, when the infrared communication unit 20B receives the encryption information, the erasing unit 263 causes the timer 80B as a second communication terminal side timing unit to start measuring the time. As a result, the timer 80B measures (times) a period of time (elapsed time) since the infrared communication unit 20B received the encryption information.

Subsequently, in the first cellular telephone device A2 that has received the encryption information transmission completion notification mail, according to an operation of the user X, the first cellular telephone device A2 transmits a reply to the main cellular telephone device 1A for permitting transmission of the decryption key information in Step ST220. In the present example, the first cellular telephone device A2 transmits the permission reply mail to the main cellular telephone device 1A.

When the main cellular telephone device 1A receives the permission reply mail, in Step ST221, the third communication permission unit 227 permits the radio communication unit 200 to transmit decryption key information. As a result, the radio communication unit 200 of the main cellular telephone device 1A transmits the decryption key information to the second cellular telephone device B2.

In a case in which the second cellular telephone device B2 receives the decryption key information before the elapsed time measured by the timer 80B reaches a predetermined period of time (for example, 12 hours), in Step ST222, the decryption processing unit 261 of the second cellular telephone device B2 decrypts the encryption information based on the decryption key information to generate the first identification/associated information. As a result, the first identification/associated information is obtained in the second cellular telephone device B2 (the user Z).

In this way, in Example 2-1, the first identification/associated information (a mail address of the user X) is transmitted in an encrypted state (as encryption information) to the user Z (the second cellular telephone device B2), in a state where permission of the user X is not obtained yet, and subsequently, when permission of the user X is obtained, decryption key information for decrypting the encryption information can be transmitted to the user Z (the second cellular telephone device B2).

It should be noted that, as in the case of the second embodiment in which the decryption key information includes the usable number-of-times restriction information for restricting the number of times the decryption key can be utilized for decryption processing of the encryption information, for example, each time decryption is performed, "1" can be decremented from the usable number-of-times restriction information in the decryption key information.

As a result, when decryption is repeated, the usable number of times will be "0", and thus the usable number of times of a decryption key can be restricted, which is preferable in terms of security. The restriction of the usable number of times of a decryption key can be realized, for example, through a technique similar to a copy guard technique (copy number-of-times restriction). As a result, decryption of encryption information can be restricted from being performed for an unlimited number of times.

Example 2-2

Example 2-2 is an example of a case in which the second cellular telephone device B2 receives encryption information, but the second cellular telephone device B2 does not subsequently receive decryption key information within a predetermined period of time. Since Steps ST211 to ST219 in Example 2-2 are similar to Steps ST211 to ST219 in Example 2-1, respectively, descriptions thereof are omitted.

Regarding Example 2-3, Steps ST223 and after are described.

As shown in FIG. 14, in the second cellular telephone device B2, when a predetermined period of time (for example, 12 hours) has elapsed since the timer 80B started timing, the timing by the timer 80B is terminated in Step ST223.

Subsequently, in Step ST224, the erasing unit 263 erases the encryption information stored in the second encryption information storage unit 271 of the memory 44B.

In this way, in Example 2-2, in a case in which decryption key information is not received within a predetermined period of time after the second cellular telephone device B2 receives encryption information, the decryption key information is erased. Therefore, encryption information received by the second cellular telephone device B2 will not remain in the second cellular telephone device B2 indefinitely, which is preferable in terms of security of the first identification/associated information.

Example 2-3

Example 2-3 is an example of a case in which transmission of decryption key information to the second cellular telephone device B2 is performed not by the main cellular telephone device 1A, but by the first cellular telephone device A2. Since Steps ST231 to ST237 in Example 2-3 are similar to Steps ST211 to ST217 in Example 2-1, respectively, descriptions thereof are omitted.

Regarding Example 2-1, Steps ST238 and after are described.

As shown in FIG. 15, after transmitting encryption information to the second cellular telephone device B2, in Step ST238, the second notification unit 226 of the main cellular telephone device 1A notifies the first cellular telephone device A2 of information of the fact that the encrypted first identification/associated information (encryption information) has been transmitted to the second cellular telephone device B2 (the user Z), and information for requesting transmission of a decryption key or the like for decrypting the encryption information to the user Z.

In the present example, as shown in FIG. 16, the second notification unit 226 transmits encryption information transmission completion notification mail stating that "Although there has been no reply from you (the user X), transmission of the encrypted information (a mail address) to the user Z has been completed. In addition, a decryption key has been transmitted to you (the user X). When there is a request for the decryption key from the user Z, if you do not object, please transmit the decryption key to the user Z."

After the encryption information transmission completion notification mail is transmitted, the third communication permission unit 227 permits the radio communication unit 200 to transmit the decryption key information stored in the decryption key information storage unit 237 to the first cellular telephone device A1. As a result, in Step ST239, the radio communication unit 200 of the main cellular telephone device 1A transmits the decryption key information to the first cellular telephone device A2.

In the second cellular telephone device B2, in a case in which the infrared communication unit 20B receives encryption information transmitted from the main cellular telephone device 1A, in Step ST240, the decryption key request unit 262 requests the radio communication unit 200B of the second cellular telephone device B2 to transmit decryption key request information (information that includes a decryption key for decrypting the encryption information) stored in the decryption key request information storage unit 272. In the present example, mail (decryption key information request mail) for requesting transmission of decryption key information is transmitted to the first cellular telephone device A2 (the user X).

In the first cellular telephone device A2 (the user X), in a case in which encryption information transmission completion notification mail or decryption key information request mail is received, and the user X determines that the decryption key information may be transmitted to the second cellular telephone device B2 (the user Z), according to an operation of the user X, the first communication terminal side third communication permission unit 241 permits the radio communication unit 200A of the first cellular telephone device A2 to transmit the decryption key information stored in the decryption key information storage unit 251 to the second cellular telephone device B2. As a result, in Step ST241, the radio communication unit 200A of the first cellular telephone device A2 transmits the decryption key information to the second cellular telephone device B2.

Moreover, in Step ST242, the first communication terminal side notification unit 242 causes the radio communication unit 200A to notify the main cellular telephone device 1A of the fact that the decryption key information has been transmitted to the second cellular telephone device B2. In the present example, mail (decryption key information transmission completion notification mail) for notifying of the fact that the decryption key information has been transmitted to the second cellular telephone device B2 is transmitted from the radio communication unit 200A to the main cellular telephone device 1A.

When the second cellular telephone device B2 receives the decryption key information, the decryption processing unit 261 of the second cellular telephone device B2 decrypts the encryption information based on the decryption key information to generate the first identification/associated information in Step ST243. As a result, the first identification/associated information is obtained in the second cellular telephone device B2 (the user Z).

In this way, in Example 2-3, after transmitting encryption information to the second cellular telephone device B2 (the user Z), transaction of decryption key information can be performed as a transaction between the first cellular telephone device A2 (the user X) and the second cellular telephone device B2 (the user Z) without involving the main cellular telephone device 1A (the user Y). Therefore, the load on the main cellular telephone device 1A (the user Y) is reduced.

Next, the communication system S of a third embodiment is described. The communication system S of the third embodiment includes a main cellular telephone device 1B, a first cellular telephone device A3, and a second cellular telephone device B3.

Figure 19:
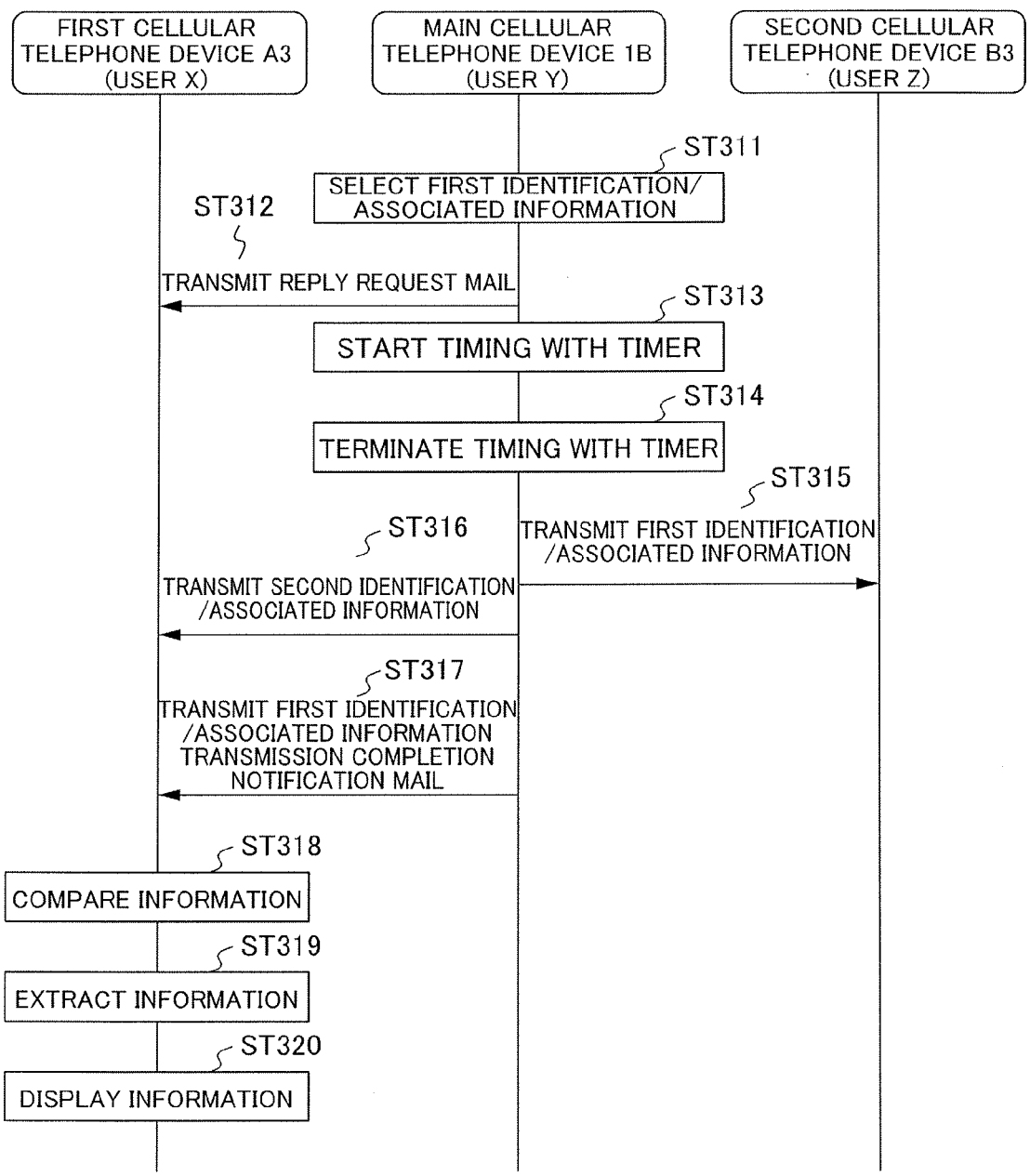
FIG. 19 is a sequence diagram showing operations in Example 3 relating to the communication system of the third embodiment.

FIG. 17 is a functional block diagram illustrating the functional configuration of the main cellular telephone device 1B according to the third embodiment. FIG. 18 is a functional block diagram illustrating the functional configuration of the first cellular telephone device A3 according to the third embodiment. FIG. 19 is a sequence diagram showing operations in Example 3 relating to the communication system of the third embodiment. FIG. 20 is an example of data transmission completion notification mail in Example 3.

The functional configuration relating the memory 44 and the functional configuration relating the CPU 45 in the main cellular telephone device 1B are mainly described with reference to FIG. 17. Since configurations that are not described in particular are similar to the configurations of the main cellular telephone device 1 in the first embodiment shown in FIG. 4, descriptions thereof are omitted.

In the main cellular telephone device 1B according to the third embodiment, the memory 44 includes: a first identification/associated information storage unit 331, a first selected information storage unit 332, a reply request information storage unit 333, and a second identification/associated information storage unit 334.

The first identification/associated information storage unit 331, the first selected information storage unit 332, the reply request information storage unit 333, and the second identification/associated information storage unit 334 in the third embodiment are similar to the first identification/associated information storage unit 131, the first selected information storage unit 132, the reply request information storage unit 133, and the second identification/associated information storage unit 134 in the first embodiment, respectively; therefore, descriptions thereof are omitted.

In the main cellular telephone device 1B according to the third embodiment, the CPU 45 includes a selection unit 321, a reply request unit 322, a first communication permission unit 323, a fourth communication permission unit 324, and a third notification unit 325.

The selection unit 321, the reply request unit 322 and the first communication permission unit 323 in the third embodiment are similar to the selection unit 121, the reply request unit 122 and the first communication permission unit 123 in the first embodiment, respectively; therefore, descriptions thereof are omitted.

In a case in which a period of time measured by the timer 80 exceeds a predetermined period of time, the fourth communication permission unit 324 permits the infrared communication unit 20 to transmit the first identification/associated information to the second cellular telephone device B3. Moreover, the fourth communication permission unit 324 permits the radio communication unit 200 to transmit the second identification/associated information to the first cellular telephone device A3.

In a case in which the main cellular telephone device 1B transmits the first identification/associated information to the second cellular telephone device B3, the third notification unit 325 causes the radio communication unit 200 to transmit, to the first cellular telephone device A3, information for notifying of the fact that the first identification/associated information has been transmitted to the second cellular telephone device B3.

Next, the functional configuration relating to the memory 44A and the functional configuration relating the CPU 45A in the first cellular telephone device A3 according to the third embodiment are mainly described with reference to FIG. 18. Since configurations that are not described in particular are similar to the configurations of the first cellular telephone device A1 in the second embodiment, descriptions thereof are omitted.

In the first cellular telephone device A3 according to the third embodiment, the memory 44A includes a third information storage unit 351 and an extracted information storage unit 352.

The third information storage unit 351 stores third information. The third information includes: a plurality of pieces of third identification information corresponding to a plurality of communication terminals, respectively; and a plurality of pieces of third associated information that are associated with the plurality of pieces of third identification information, respectively.

The extracted information storage unit 352 stores predetermined third information (common third information) extracted by an extracting unit 342 of the CPU 45, which will be described later.

In the first cellular telephone device A3 according to the third embodiment, the CPU 45A includes a comparing unit 341, an extracting unit 342, and a display control unit 343.

In a case in which the radio communication unit 200A receives the second identification/associated information, the comparing unit 341 compares the second identification/associated information with each of the plurality of pieces of third information stored in the third information storage unit 351.

From among the plurality of pieces of third information stored in the third information storage unit 351, the extracting unit 342 extracts predetermined third information (the common third information) that includes contents common with the second identification/associated information based on a result of the comparison by the comparing unit 341.

The display control unit 343 causes the display unit 21 to display the predetermined third information (the common third information) that is extracted by the extracting unit 342 and is stored in the extracted information storage unit 352. For example, the display control unit 343 causes the display unit 21 to display the name of the user Z.

Next, a description is provided for operations of the communication system of the third embodiment, which includes the main cellular telephone device 1B, the first cellular telephone device A3, and the second cellular telephone device B3. Example 3 is hereinafter described as examples relating to the communication system of the third embodiment.

FIG. 19 is a sequence diagram showing operations in Example 3 relating to the communication system of the third embodiment. FIG. 20 is an example of first identification/associated information transmission completion notification mail and second identification/associated information notification mail in Example 3.

Example 3

Operations in Example 3 are described with reference to FIGS. 19 and 20.

Since Steps ST311 to ST314 in Example 3 are similar to Steps ST121 to ST124 in Example 1-2, respectively, descriptions thereof are omitted.

Regarding Example 3, Steps ST315 and after are described.

It should be noted that, although not illustrated in FIG. 19, in a case in which the radio communication unit 200 receives a permission reply returned from the first cellular telephone device A3 for permitting transmission of the first identification/associated information before the elapsed time measured by the timer 80 exceeds a predetermined period of time, the first communication permission unit 323 of the main cellular telephone device 1B permits the infrared communication unit 20 to transmit the first identification/associated information selected by the selection unit 321.

In Step ST315, in a case in which a period of time measured by the timer 80 exceeds a predetermined period of time (for example, 5 minutes), the fourth communication permission unit 324 permits the infrared communication unit 20 to transmit the first identification/associated information to the second cellular telephone device B3. As a result, the first identification/associated information is transmitted to the second cellular telephone device B3.

In Step ST316, the fourth communication permission unit 324 permits the radio communication unit 200 to transmit the second identification/associated information to the first cellular telephone device A3.

Moreover, in Step ST317, the third notification unit 325 transmits, to the radio communication unit 200, mail for notifying of the fact that transmission of the first identification/associated information to the second cellular telephone device B3 has been completed. In the present example, as shown in FIG. 20, the third notification unit 325 transmits data transmission completion notification mail stating that "Although there has been no reply from you (the user X), transmission of your (the user X's) mail address to the user Z has been completed. In return, you are provided with the profile information of the user Z".

In addition, for the first cellular telephone device A3, in Step ST318, in a case in which the radio communication unit 200 receives the second identification/associated information, the comparing unit 341 compares the second identification/associated information with each of the plurality of pieces of third information stored in the third information storage unit 351.

In Step ST319, from among the plurality of pieces of third information stored in the third information storage unit 351, the extracting unit 342 extracts predetermined third information (the common third information) that includes contents common with the second identification/associated information based on a result of the comparison by the comparing unit 341. For example, in a case in which the name of the user Z is commonly included in the second identification/associated information and the third information, the extracting unit 342 extracts the name of the user Z.

In Step ST320, the display control unit 343 causes the display unit 21 to display the predetermined third information (the common third information) that is extracted by the extracting unit 342 and is stored in the extracted information storage unit 352.

As described above, according to the third embodiment, transmission of the first identification/associated information to the second cellular telephone device B3, and transmission of the second identification/associated information to the first cellular telephone device A3 are both performed. Therefore, from the viewpoint of the user X, although the user X's own information (the first identification/associated information) is known to the user Z, the user X can also know information of the other party (the user Z) (the second identification/associated information) who knows the user X's own information; therefore, a state in which the destination of personal information is unknown to oneself can be prevented from continuing.

Moreover, since the name of the user Z can be extracted to be displayed on the display unit 21, for example, the user X can easily and visually identify the other party (the user Z) who knows the user X's own information.

In the third embodiment, as described above, in a case in which a period of time measured by the timer 80 exceeds a predetermined period of time, the fourth communication permission unit 324 of the main cellular telephone device 1B permits the infrared communication unit 20 to transmit the first identification/associated information to the second cellular telephone device B3, and permits the radio communication unit 200 to transmit the second identification/associated information to the first cellular telephone device A3; however, it is not limited thereto.

For example, in place of the fourth communication permission unit 324, the main cellular telephone device 1B can include "a fifth communication permission unit (not illustrated) that permits the radio communication unit 200 to transmit the second identification/associated information to the first cellular telephone device A3 in a case in which a period of time measured by the timer 80 exceeds a predetermined period of time". In an embodiment in which the main cellular telephone device 1B includes the fifth communication permission unit as described above, the first cellular telephone device A3 can receive the second identification/associated information, and thus the user X can determine whether the first identification/associated information may be transmitted based on the second identification/associated information thus received.

Furthermore, the first identification/associated information may include transmission number-of-times information on the number of times of transmission, and restricted number-of-times information including information on the restricted number of times of transmission. In addition, in a case in which the first identification/associated information includes the transmission number-of-times information and the restricted number-of-times information, the first communication unit and/or the second communication unit may be configured so as not to transmit the first identification/associated information in a case in which the transmission number of times included in the transmission number-of-times information is no more than the restricted number of times of transmission included in the restricted number-of-times information.

Figure 21:
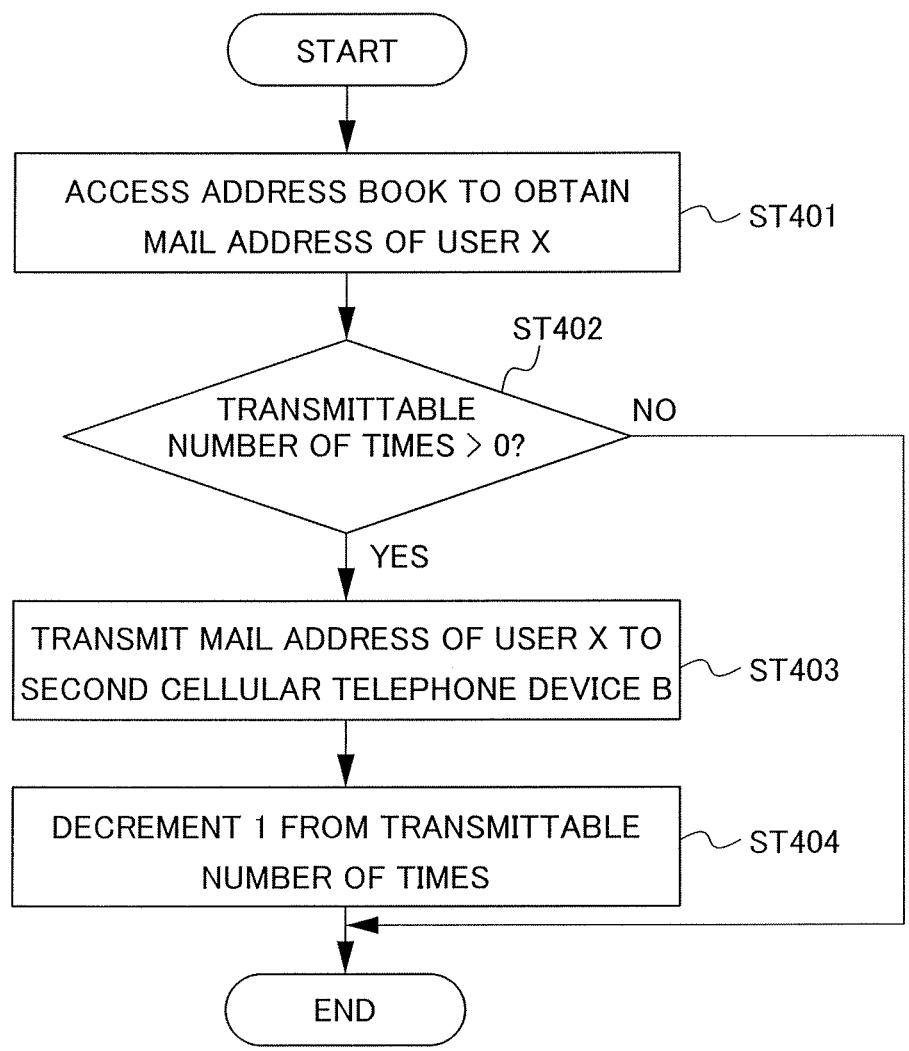
FIG. 21 is a flowchart showing operations in a case in which the first identification/associated information includes the transmission number-of-times information and the restricted number-of-times information.

FIG. 21 is a flowchart showing operations in a case in which the first identification/associated information includes the transmission number-of-times information and the restricted number-of-times information. Restriction of the transmission number of times can be realized, for example, through a technique similar to a copy guard technique (copy number-of-times restriction).

As shown in FIG. 21, in Step ST401, the user Z operates the main cellular telephone device 1 to access the address book of the main cellular telephone device 1 to obtain a mail address of the user X.

In Step ST402, the transmission (transmittable) number of times in the transmission number-of-times information included in the mail address is compared with the restricted number of times in the restricted number-of-times information. Here, the restricted number of times is "zero". In a case in which the transmittable number of times is at least one (for example, three) (YES), the processing advances to Step ST403. Moreover, in a case in which the transmittable number of times is zero (NO), the processing is terminated (transmission is not permitted).

In a case in which the transmittable number of times is at least one (YES), in Step ST403, the main cellular telephone device 1 can transmit a mail address of the user X to the second cellular telephone device B.

When the mail address of the user X is transmitted, "one" is decremented from the transmittable number of times in the transmission number-of-times information included in this mail address. For example, the transmittable number of times may become two. As a result, transmission (transfer) of a mail address of the user X from the main cellular telephone device 1 can be restricted from being performed for an unlimited number of times.

Next, the communication system S of a fourth embodiment is described.

Figure 22:
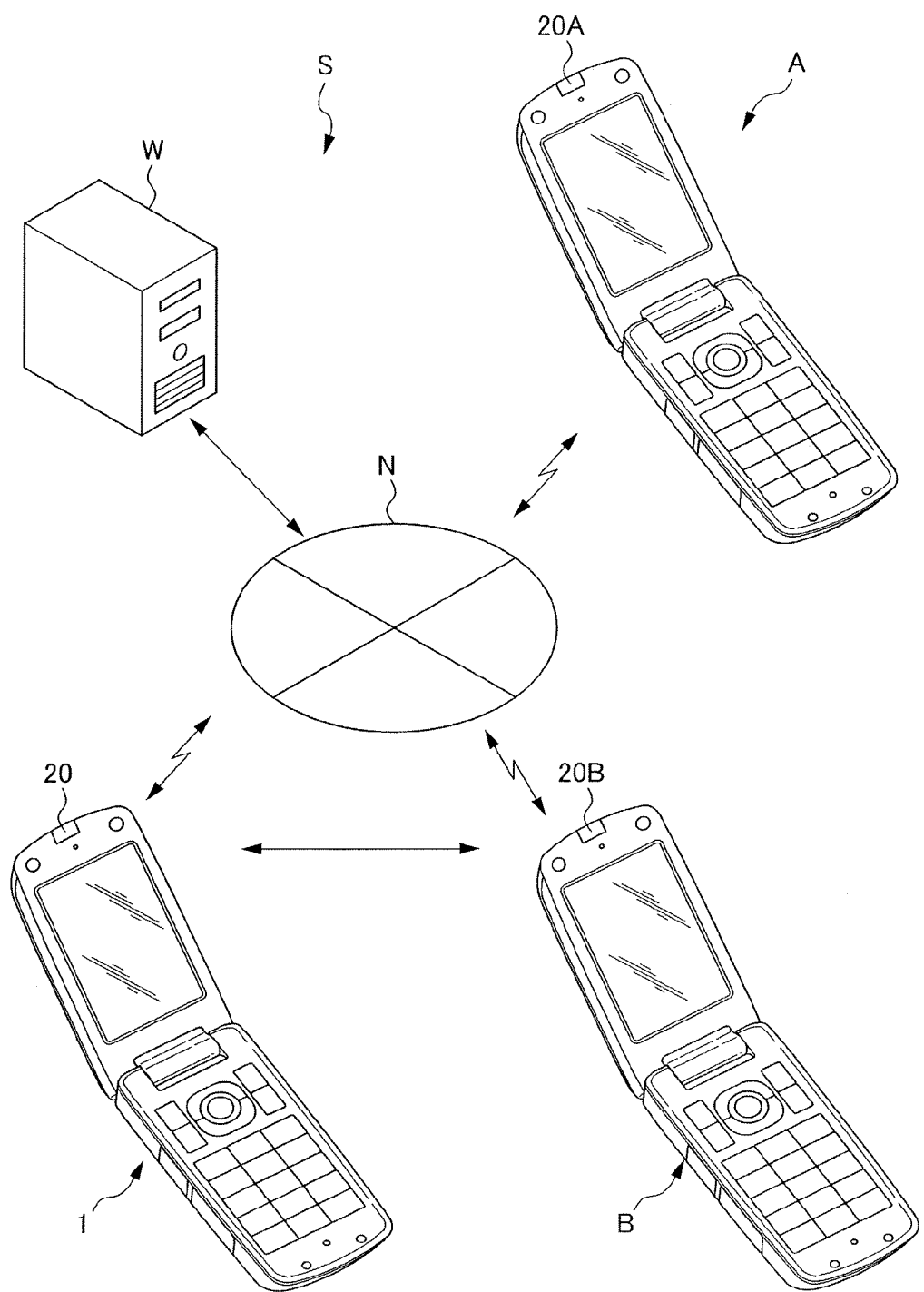
FIG. 22 is a diagram illustrating an overview of the communication system S including a main cellular telephone device 1D.

First, with reference to FIG. 22, a description is provided for the communication system S that includes a main cellular telephone device 1D as the main communication terminal, a first cellular telephone device A4 as the first communication terminal, a second cellular telephone device B4 as the second communication terminal, and a server W.

FIG. 22 is a diagram illustrating an overview of the communication system S including the main cellular telephone device 1D.

As shown in FIG. 22, the communication system S includes the main cellular telephone device 1D, the first cellular telephone device A4, the second cellular telephone device B4, and the server W. Here, the users of the first cellular telephone device A4, the main cellular telephone device 1D, and the second cellular telephone device B4 are referred to as the user X, the user Y and the user Z, respectively.

The main cellular telephone device 1D can transmit and receive predetermined information to and from the first cellular telephone device A4, the second cellular telephone device B4 and the server W by way of wireless communication (the second communication method) via the communication network N. Moreover, the main cellular telephone device 1D can transmit and receive predetermined information to and from the second cellular telephone device B4 by way of infrared communication (the first communication method).

In a case in which the main cellular telephone device 1D transmits predetermined information to the second cellular telephone device B4 by way of infrared communication, the main cellular telephone device 1D is disposed adjacently to the second cellular telephone device B4. On the other hand, the first cellular telephone device A4 is disposed at a position separated from the main cellular telephone device 1D and the second cellular telephone device B4. In other words, the main cellular telephone device 1D is disposed at a position at which it is not possible to directly confirm whether personal information of the user X may be transmitted to the user (the user X) of the first cellular telephone device A4. Even in this state, the communication system S in the present embodiment achieves an effect.

The server W can receive a variety of information transmitted from the main cellular telephone device 1D, the first cellular telephone device A4 and the second cellular telephone device B4. Moreover, the server W can transmit a variety of information to the main cellular telephone device 1D, the first cellular telephone device A4 and the second cellular telephone device B4.

Figure 23:
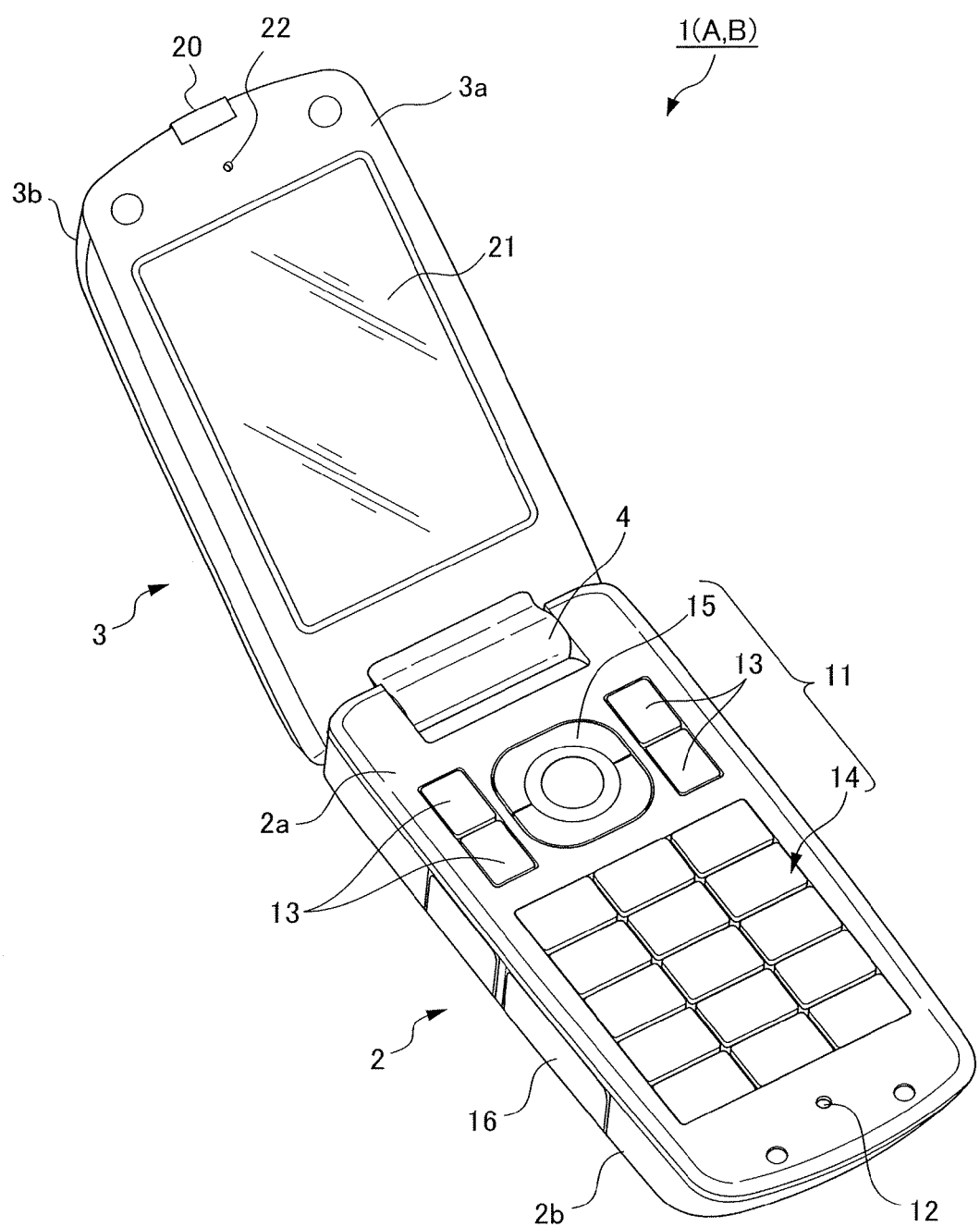
FIG. 23 is a perspective view showing an appearance of the main cellular telephone device 1D in the opened state.

Next, a detailed description is provided for a configuration of the main cellular telephone device 1D according to the communication system S of the present embodiment with reference to FIG. 23. FIG. 23 is a perspective view showing an appearance of the main cellular telephone device 1D in the opened state.

As shown in FIG. 23, the main cellular telephone device 1D includes the operation unit side body 2 and the display unit side body 3 as its bodies. The operation unit side body 2 and the display unit side body 3 are connected so as to be openable and closable via a connecting portion 4 including a hinge mechanism. More specifically, an upper end portion of the operation unit side body 2 and a lower end portion of the display unit side body 3 are connected via the connecting portion 4 including the hinge mechanism. As a result, the main cellular telephone device 1D is configured such that the operation unit side body 2 and the display unit side body 3 connected via the hinge mechanism can be relatively moved. In other words, the main cellular telephone device 1D can be transformed between a state in which the operation unit side body 2 and the display unit side body 3 are opened (the opened state), and a state in which the operation unit side body 2 and the display unit side body 3 are folded (the closed state). Here, the closed state refers to a state in which both bodies are disposed so as to be mutually superimposed. The opened state refers to a state in which both bodies are disposed so as not to be mutually superimposed.

An outer face of the operation unit side body 2 is configured with a front case 2a and a rear case 2b. The operation unit side housing 2 is configured to expose, on the front case 2a side, both an operation key set 11 as an input unit and a microphone 12 to which sound produced by the user of the main cellular telephone device 1D during a phone call is input.

The operation key set 11 is configured with: function setting operation keys 13 for operating various functions such as for various settings, a telephone number directory function and a mail function; input operation keys 14 for inputting digits of a telephone number, characters for mail, etc.; and a selection operation key 15 for performing selection of the various operations and scrolls up, down, left and right. Predetermined functions are assigned (key assignment) to each key configuring the operation key set 11 in accordance with the opened/closed state of the operation unit side body 2 and the display unit side body 3, various modes, and the type of application that is running. An operation corresponding to a function assigned to each key is executed by the user depressing each key.

The microphone 12 is disposed on an outer end side that is opposite to the connecting portion 4 side in a longitudinal direction of the operation unit side body 2. In other words, the microphone 12 is disposed on one outer end side of the main cellular telephone device 1D in the opened state.

An interface (not illustrated) for communicating with an external device (for example, a host device) is disposed on one side face of the operation unit side body 2. Side keys to which predetermined functions are assigned and an interface (not illustrated) where external memory is inserted and removed are disposed on another side face of the operation unit side body 2. The interfaces are covered by caps. When not in use, an interface is covered by the respective cap.

An outer surface of the display unit side body 3 is configured with a front case 3a and a rear case 3b. On the front case 3a of the display unit side body 3, a display unit 21 for displaying a variety of information, and a speaker 22 as a receiver that outputs sound of the other party of a phone call are disposed so as to be externally exposed. Here, the display unit 21 is configured with a liquid crystal display panel, a drive circuit that drives the liquid crystal display panel, and a light source unit such as a backlight that irradiates light from the back face side of the liquid crystal display panel.

Figure 24:
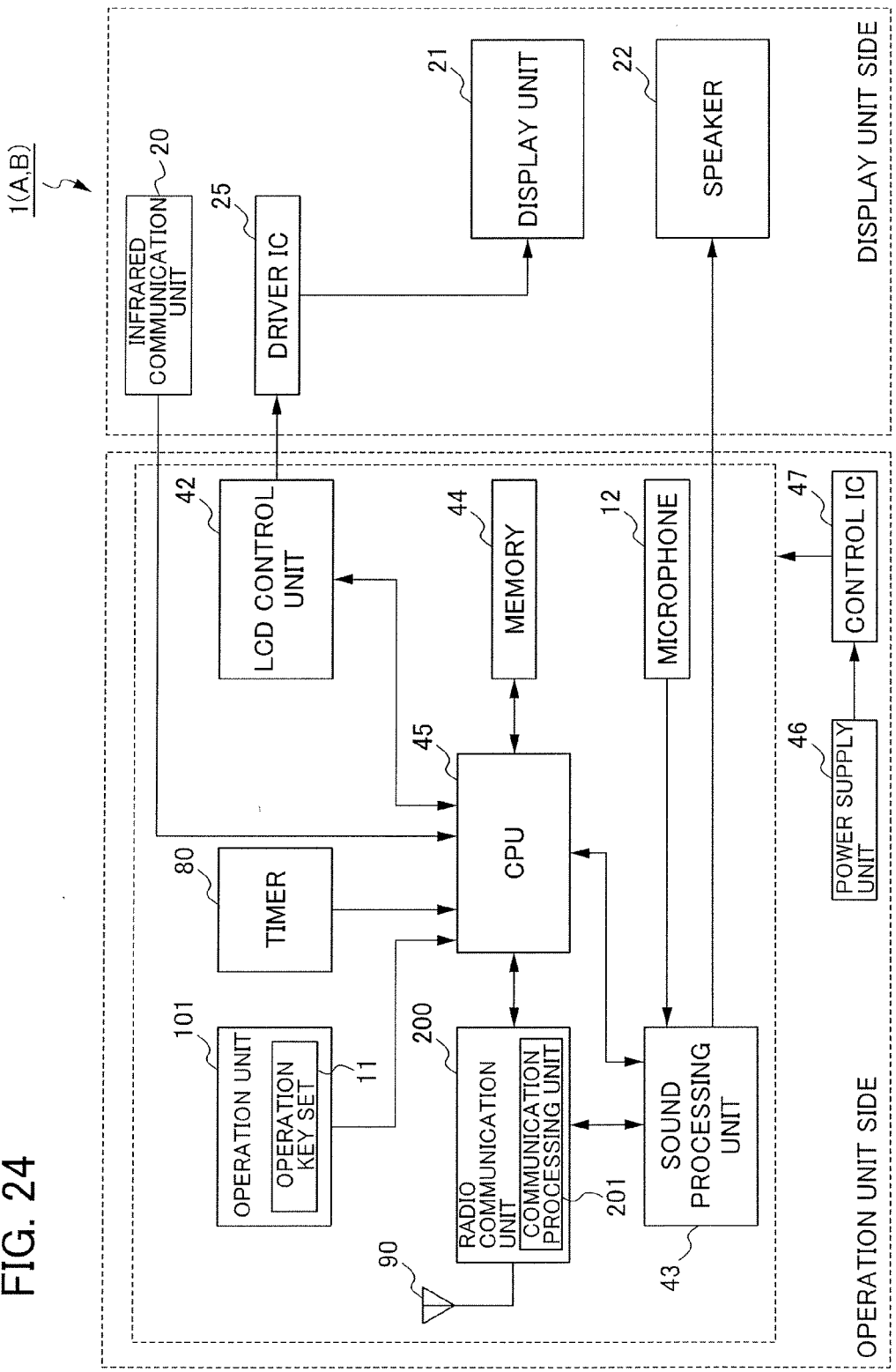
FIG. 24 is a circuit block diagram illustrating a circuit configuration of the main cellular telephone device 1D according to a fourth embodiment.

Next, a circuit configuration of the main cellular telephone device 1D is described with reference to FIG. 24. FIG. 24 is a circuit block diagram illustrating a circuit configuration of the main cellular telephone device 1D according to the fourth embodiment.

As shown in FIG. 24, the operation unit side body 2 of the main cellular telephone device 1D includes: the radio communication unit 200 as the second communication unit; the operation unit 101 as the input unit; the microphone 12; the LCD control unit 42; the sound processing unit 43; the memory 44; the CPU 45; the power supply unit 46; the control IC 47; and the timer 80 as the timing unit. Moreover, the display unit side body 3 of the main cellular telephone device 1D includes: the display unit 21, the speaker 22, the driver IC 25, and the infrared communication unit 20 as the first communication unit. It should be noted that a communication unit conforming to, for example, Bluetooth (IEEE 802.15.1, registered trademark) may be provided in place of the infrared communication unit 20, or in addition to the infrared communication unit 20.

The radio communication unit 200 includes an antenna unit 90 and a communication processing unit 201.

The radio communication unit 200 is configured so as to be capable of externally transmitting and receiving predetermined information. The radio communication unit 200 performs communication by way of a method using radio waves (the second communication method) that is different from infrared communication. The radio communication unit 200 can transmit predetermined information to the first cellular telephone device A4 via the predetermined communication network N (see FIG. 22). The radio communication unit 200 can, for example, transmit predetermined information as a text of E-mail or as an attachment to E-mail.

The radio communication unit 200 can, for example, transmit information such as: address information (first identification information) such as a mail address and a telephone number; profile information (first associated information) such as a name, an address and a profile; information for prompting a user (the user Z) of another cellular telephone device to transmit a reply of permitting transmission of predetermined information; information for permitting transmission of predetermined information; and decryption key information including a decryption key for decrypting predetermined encryption information.

Based on a predetermined communication method (for example, CDMA (Code Division Multiple Access) 2000_1x or the like), the antenna unit 90 performs communication by phone or mail with other communication terminals via a base station.

The communication processing unit 201 is configured with a transmitting circuit that performs transmission processing and a receiving circuit that performs reception processing. The communication processing unit 201 performs demodulation processing by the receiving circuit on a signal received via the antenna unit 90, and transmits the signal thus processed to the CPU 45. In addition, the communication processing unit 201 performs modulation processing by the transmitting circuit on the signal transmitted from the CPU 45, and transmits the signal to a base station via the antenna unit 90.

The operation unit 101 is configured to include the operation key set 11.

The LCD control unit 42 performs predetermined image processing on input image data in accordance with control by the CPU 45, and outputs the image data, on which the image processing has been performed, to the driver IC 25. The driver IC 25 stores the image data being input from the LCD control unit 42 in frame memory, and outputs the image data stored in the frame memory to the display unit 21 at a predetermined timing.

The display unit 21 displays predetermined characters and images based on the data that is input from the driver IC 25.

The memory 44 stores predetermined data. More specifically, the memory 44 has various storage units that store a variety of data and application programs for operating various functions (see FIG. 25). Details of the memory 44 will be described later.

The CPU 45 controls the entirety of the main cellular telephone device 1D. The CPU 45 performs predetermined control of, in particular, the radio communication unit 200, the LCD control unit 42 and the sound processing unit 43. Details of the CPU 45 will be described later.

In accordance with control by the CPU 45, the sound processing unit 43 performs predetermined sound processing on a signal transmitted from the communication processing unit 201, and outputs the signal on which the sound processing has been performed to the speaker 22. The speaker 22 externally outputs sound based on a signal that is transmitted from the sound processing unit 43. Moreover, in accordance with control by the CPU 45, the sound processing unit 43 performs predetermined processing on a signal that is input from the microphone 12, and outputs the signal thus processed to the communication processing unit 201. The communication processing unit 201 performs predetermined processing on the signal that is input from the sound processing unit 43, and outputs the signal thus processed to the antenna unit 90.

The power supply unit 46 is configured to include a battery (not illustrated). The battery is composed of a lithium-ion battery having predetermined capacity.

The control IC 47 converts a power supply voltage, which is supplied from the power supply unit 46, into a predetermined power supply voltage, and supplies the power supply voltage thus converted to each unit (for example, the CPU 45 and the like) of the main cellular telephone device 1D.

The timer 80 has a timing function. The timer 80 is configured to measure a period of time elapsed from a predetermined time, and to be capable of outputting a predetermined signal (a time-up signal) to the CPU 45 when the elapsed period of time exceeds a predetermined period of time. For example, the timer 80 measures a period of time since the radio communication unit 200 transmitted information for requesting a reply (reply request information).

The infrared communication unit 20 is disposed in the vicinity of the end portion that is opposite to the connecting portion 4 in the display unit side body 3. The infrared communication unit 20 is configured to be compatible with the IrDA (Infrared Data Association) standard. The infrared communication unit 20 is configured to be capable of externally outputting a predetermined signal. The infrared communication unit 20 is configured to be capable of outputting information stored in the memory 44 and the like, which will be described later.

The infrared communication unit 20 transmits predetermined information stored in the memory 44 to the second cellular telephone device B4 that is disposed outside and includes a similar infrared communication unit 20B. The infrared communication unit 20 can transmit and receive information by way of an infrared communication method (the first communication method) using an infrared ray, which is a communication method different from that of the radio communication unit 200. Information transmitted from the communication unit 20 of the main cellular telephone device 1D is received by the communication unit 20B in the second cellular telephone device B as the second communication terminal.

The infrared communication unit 20 can transmit encryption information that is address information, profile information or the like of the user Y of the main cellular telephone device 1D, on which encryption processing has been performed, and address information, profile information or the like of the user X of the first cellular telephone device A4. Moreover, the infrared communication unit 20 can also transmit and receive encryption information that is profile information or the like on which encryption processing has been performed.

In the infrared communication mode that enables infrared communication, the selection operation key 15 is assigned with a function of selecting information (for example, address information and profile information) to be transmitted to another cellular telephone device (for example, the second cellular telephone device B4) as the second communication terminal, and a function of determining transmission of the information thus selected.

Figure 25:
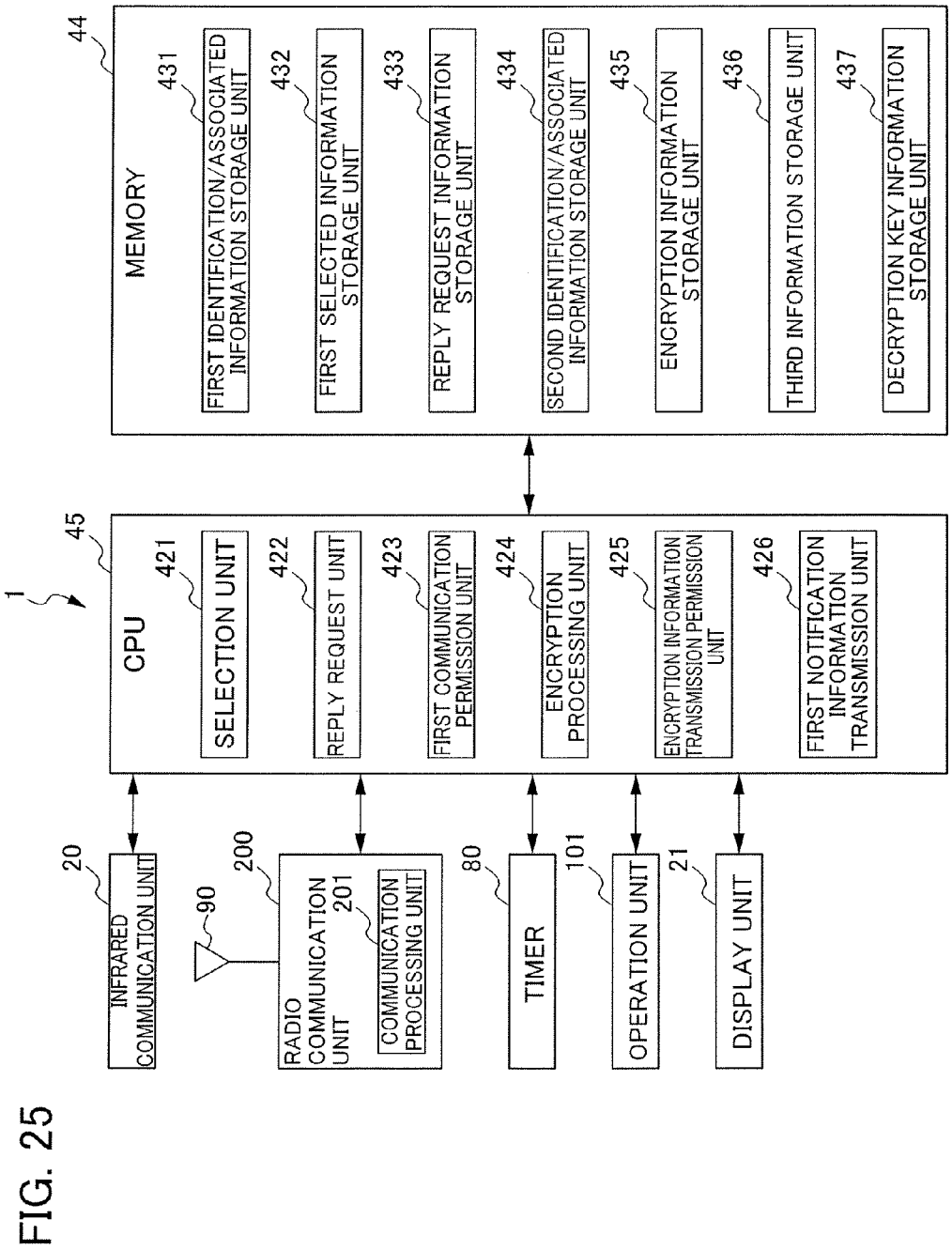
FIG. 25 is a functional block diagram illustrating a functional configuration of the main cellular telephone device 1D according to the fourth embodiment.

Next, functions of the main cellular telephone device 1D according to the fourth embodiment are described in detail with reference to FIG. 25. FIG. 25 is a functional block diagram illustrating a functional configuration of the main cellular telephone device 1D according to the fourth embodiment. Here, the functional configuration relating to the memory 44 and the functional configuration relating to the CPU 45 are mainly described with reference to FIG. 25.

The memory 44 includes a first identification/associated information storage unit 431 as a first storage unit, a first selected information storage unit 432, a reply request information storage unit 433, a second identification/associated information storage unit 434 as a second storage unit, an encryption information storage unit 435, a third information storage unit 436 as a third storage unit, and a decryption key information storage unit 437.

The first identification/associated information storage unit 431 stores the first identification information corresponding to the first cellular telephone device A4, and the first associated information that is associated with the first identification information. The first identification information is information corresponding to the first cellular telephone device A4 or its user (the user X), and is, for example, a mail address, a telephone number (address information) and the like of the user X. The first associated information is information associated with the first identification information, and is, for example, a name, an address, a profile (profile information), a facial photograph and the like of the user X.

The first selected information storage unit 432 stores information selected by a selection unit 421 of the CPU 45, which will be described later. More specifically, the first selected information storage unit 432 stores "a part or all of the first identification information and the first associated information stored in the first identification/associated information storage unit 431" selected by the selection unit 421 of the CPU 45.

It should be noted that the "part or all of the first identification information and the first associated information" is hereinafter also referred to as "first identification/associated information".

The reply request information storage unit 433 stores reply request information transmitted by a reply request unit 422 of the CPU 45, which will be described later.

The second identification/associated information storage unit 434 stores second identification information corresponding to the second cellular telephone device B4, and second associated information that is associated with the second identification information. The second identification information is information corresponding to the second cellular telephone device B4 or its user (the user Z), and is, for example, a mail address, a telephone number (address information) and the like of the user Z. The second associated information is information associated with the second identification information, and is, for example, a name, an address, a profile (profile information), a photograph and the like of the user Z.

It should be noted that the "part or all of the second identification information and the second associated information" is hereinafter also referred to as "second identification/associated information".

The encryption information storage unit 435 stores encryption information generated by an encryption processing unit 424 that will be described later.

The third information storage unit 436 stores server address information corresponding to the server W.

The decryption key information storage unit 437 stores decryption key information. The decryption key information includes a decryption key for decrypting predetermined encryption information, etc.

Next, the functional configuration of the CPU 45 is described. The CPU 45 includes a selection unit 421, a reply request unit 422, a first transmission permission unit 423, an encryption processing unit 424, an encryption information transmission permission unit 425, and a first notification information transmission unit 426.

It should be noted that the CPU 45 of the main cellular telephone device 1D performs control such that the radio communication unit 200 is preferentially used rather than the infrared communication unit 20, for communication with the first cellular telephone device A4. By performing control in this way, even in a case in which the user (the user X) of the first cellular telephone device A4 is not present near the user (the user Y) of the main cellular telephone device 1D, communication with the first cellular telephone device A4 can be performed more reliably by using the radio communication unit 200 via the communication network N.

From among the first identification/associated information stored in the first identification/associated information storage unit 431, the selection unit 421 selects information to be transmitted by the infrared communication unit 20 to the second cellular telephone device B4. For example, the selection unit 421 selects a mail address of the user X. The first identification/associated information selected by the selection unit 421 is also referred to as "first selected information". The selection unit 421 causes the first selected information storage unit 432 of the memory 44 to store the first selected information.

In a case in which the information selected by the selection unit 421 is the first identification/associated information, the reply request unit 422 causes the radio communication unit 200 to transmit, to the first cellular telephone device A4, reply request information for requesting a reply regarding whether to permit transmission of the first identification/associated information (the first selected information). For example, in a case in which the first selected information is a mail address of the user X, the radio communication unit 200 is caused to transmit, to the first cellular telephone device A4, reply request mail for requesting a reply regarding whether to permit transmission of the mail address of the user X.

In a case in which a period of time measured by the timer 80 exceeds a predetermined period of time (for example, 5 minutes), the first transmission permission unit 423 does not permit the infrared communication unit 20 to transmit the first identification/associated information (the first selected information) to the second cellular telephone device B4.

Moreover, in a case in which the radio communication unit 200 receives a permission reply before the period of time measured by the timer 80 exceeds the predetermined period of time, the first transmission permission unit 423 permits the infrared communication unit 20 to transmit the first identification/associated information to the second cellular telephone device B4. The permission reply is a reply returned from the first cellular telephone device A4 for permitting transmission of the first identification/associated information. For example, in a case in which the radio communication unit 200 receives a permission reply for permitting transmission of the mail address of the user X, the first transmission permission unit 423 permits the infrared communication unit 20 to transmit the mail address of the user X to the second cellular telephone device B4.

In a case in which the first transmission permission unit 423 does not permit the infrared communication unit 20 to transmit the first identification/associated information to the second cellular telephone device B4, the encryption processing unit 424 performs encryption processing on the first identification/associated information. In addition, the encryption processing unit 424 causes the decryption key information storage unit 437 of the memory 44 to store decryption key information including a decryption key for decrypting this encryption information.

The encryption information transmission permission unit 425 permits the infrared communication unit 20 to transmit the encryption information stored in the encryption information storage unit 435 and the server address information stored in the third information storage unit 436 to the second cellular telephone device B4.

The encryption information transmission permission unit 425 permits the infrared communication unit 20 to transmit the encryption information generated by the encryption processing unit 424 to the second cellular telephone device B4.

The first notification information transmission unit 426 causes the radio communication unit 200 to transmit the first notification information to the server W identified by way of the server address information. The first notification information is information that includes: the notification information for notifying of the fact that the first identification/associated information has been transmitted to the second cellular telephone device B4; the first identification information; and the second identification information.

Figure 26:
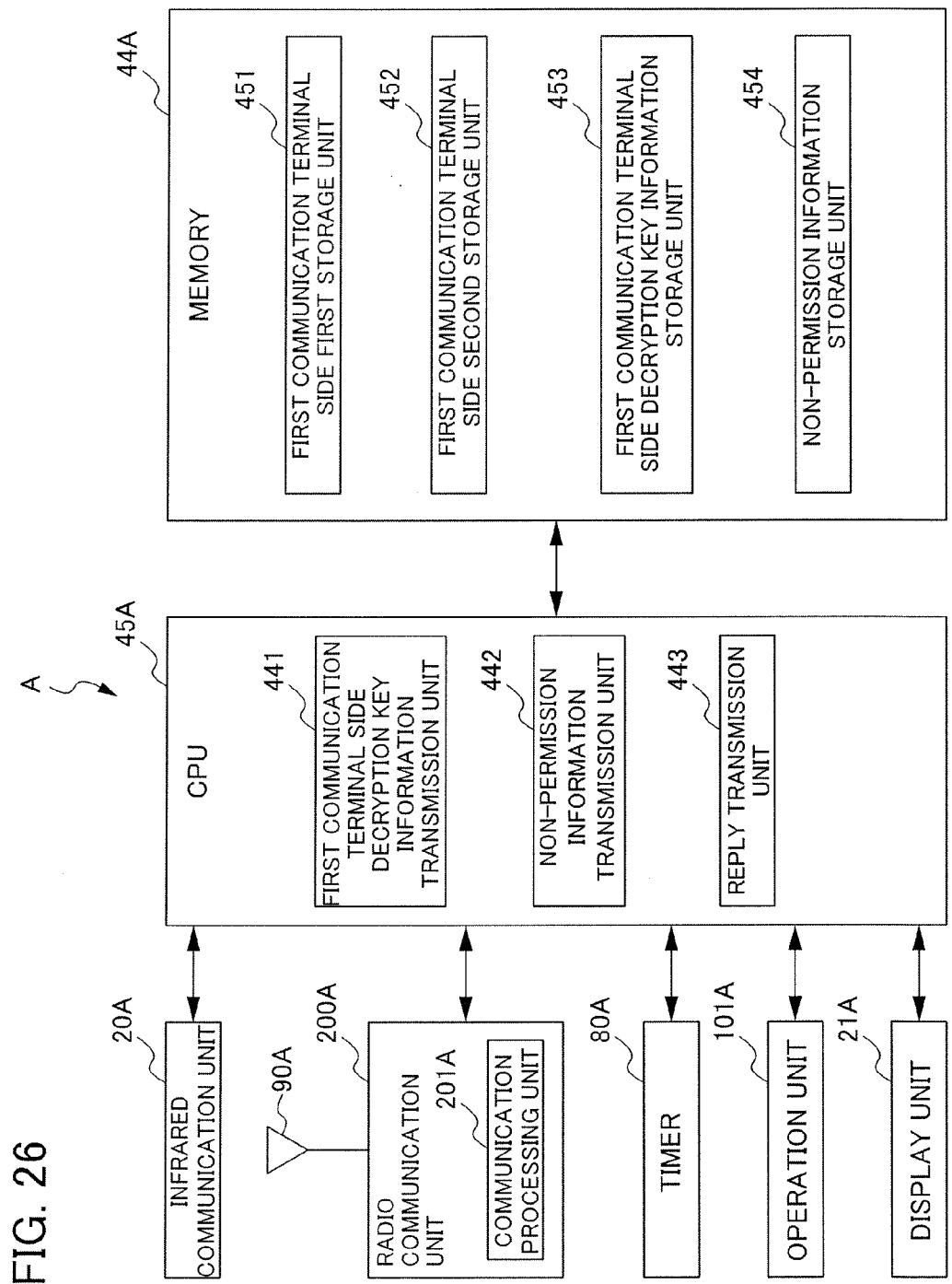
FIG. 26 is a functional block diagram illustrating a functional configuration of a first cellular telephone device A4 according to the fourth embodiment.

Next, the functional configuration relating the memory 44A and the functional configuration relating the CPU 45A in the first cellular telephone device A4 according to the present embodiment are mainly described with reference to FIG. 26. FIG. 26 is a functional block diagram illustrating the functional configuration of the first cellular telephone device A4 according to the fourth embodiment. Since configurations that are not described in particular are similar to the configurations of the main cellular telephone device 1D, descriptions thereof are omitted. Moreover, among the configurations of the first cellular telephone device, the configurations similar to the configurations of the main cellular telephone device are denoted by reference numerals with a suffix "A" (for example, the infrared communication unit 20 of the main cellular telephone device is denoted as an infrared communication unit 20A of the first cellular telephone device).

In the first cellular telephone device A4, the memory 44A includes a first communication terminal side first storage unit 451, a first communication terminal side second storage unit 452, a first communication terminal side decryption key information storage unit 453, and a non-permission information storage unit 454.

The first communication terminal side first storage unit 451 stores the first identification information.

The first communication terminal side second storage unit 452 stores the second identification information and the server address information that are included in the second notification information received by the radio communication unit 200.

The first communication terminal side decryption key information storage unit 453 stores the decryption key information that is transmitted from the main cellular telephone device 1D and is received via the radio communication unit 200A.

The non-permission information storage unit 454 stores non-permission information.

In the first cellular telephone device A4, the CPU 45A includes a first communication terminal side decryption key information transmission unit 441, a non-permission information transmission unit 442, and a reply transmission unit 443.

In a case in which the radio communication unit 200 receives the second notification information, the first communication terminal side decryption key information transmission unit 441 causes the radio communication unit 200 to transmit the decryption key information stored in the first communication terminal side decryption key information storage unit 453 to the server W that is identified by way of the server address information stored in the first communication terminal side second storage unit 452.

The non-permission information transmission unit 442 causes the radio communication unit 200 to transmit the non-permission information to the server W. The non-permission information is information for not permitting transmission of the decryption key information stored in the first communication terminal side decryption key information storage unit 453 to the second cellular telephone device B4.

The reply transmission unit 443 causes the radio communication unit 200 to transmit various replies to the outside by way of an operation of the first cellular telephone device A4 by the user X.

Figure 27:
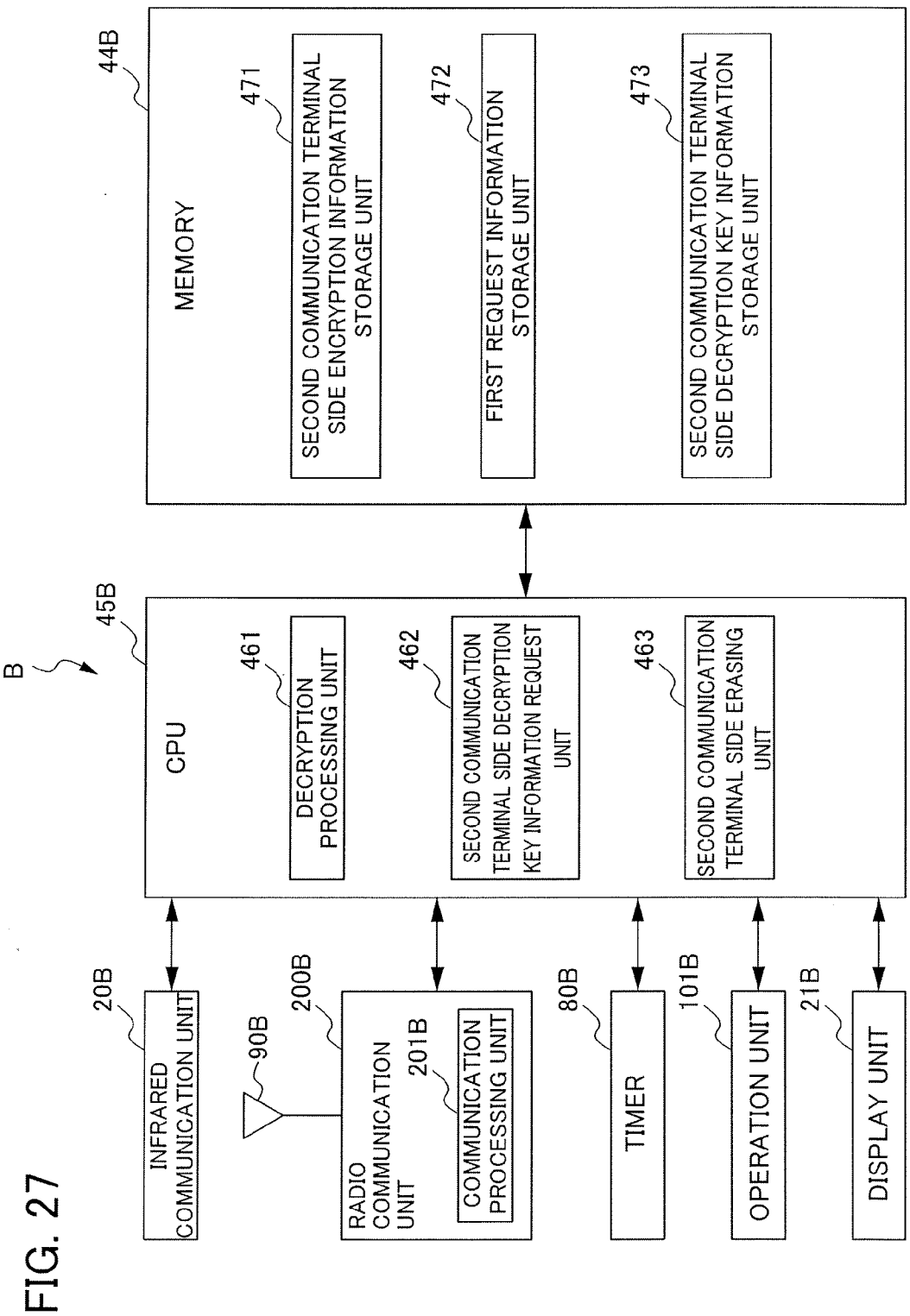
FIG. 27 is a functional block diagram illustrating a functional configuration of a second cellular telephone device B4 according to the fourth embodiment.

Next, the functional configuration relating to the memory 44B and the functional configuration relating to the CPU 45B in the second cellular telephone device B4 are mainly described with reference to FIG. 27. FIG. 27 is a functional block diagram illustrating the functional configuration of the second cellular telephone device B4 according to the fourth embodiment. Since configurations that are not described in particular are similar to the configurations of the main cellular telephone device 1D, descriptions thereof are omitted. Moreover, among the configurations of the second cellular telephone device, configurations similar to the configurations of the main cellular telephone device are denoted by reference numerals with a suffix "B" (for example, the infrared communication unit 20 of the main cellular telephone device is denoted as the infrared communication unit 20B of the second cellular telephone device).

In the second cellular telephone device B4, the timer 80B measures a period of time elapsed since the infrared communication unit 20B received encryption information transmitted from the main communication terminal 1.

In the second cellular telephone device B4, the memory 44B includes a second communication terminal side encryption information storage unit 471, a first request information storage unit 472, and a second communication terminal side decryption key information storage unit 473.

The second encryption information storage unit 471 stores encryption information, server address information and the like that are transmitted from the main cellular telephone device 1D and is received via the infrared communication unit 20B.

The first request information storage unit 472 stores first request information for requesting decryption key information.

The second communication terminal side decryption key information storage unit 473 stores decryption key information.

In the second cellular telephone device B4, the CPU 45B includes a decryption processing unit 461, a second communication terminal side decryption key information request unit 462, and a second communication terminal side erasing unit 463.

Based on a decryption key included in the decryption key information transmitted from the server W, the decryption processing unit 461 performs decryption processing on the encryption information stored in the second communication terminal side encryption information storage unit 471, and generates the first identification/associated information.

The second communication terminal side decryption key information request unit 462 causes the radio communication unit 200B to transmit the first request information for requesting decryption key information to the server W that is identified by way of the server address information stored in the second communication terminal side encryption information storage unit 471.

In a case in which the radio communication unit 200B receives first erasing instruction information, the second communication terminal side erasing unit 463 erases the encryption information stored in the second communication terminal side encryption information storage unit 471.

Moreover, in a case in which a period of time measured by the timer 80B has passed a predetermined period of time, the second communication terminal side erasing unit 463 erases the encryption information stored in the second communication terminal side encryption information storage unit 471.

Figure 28:
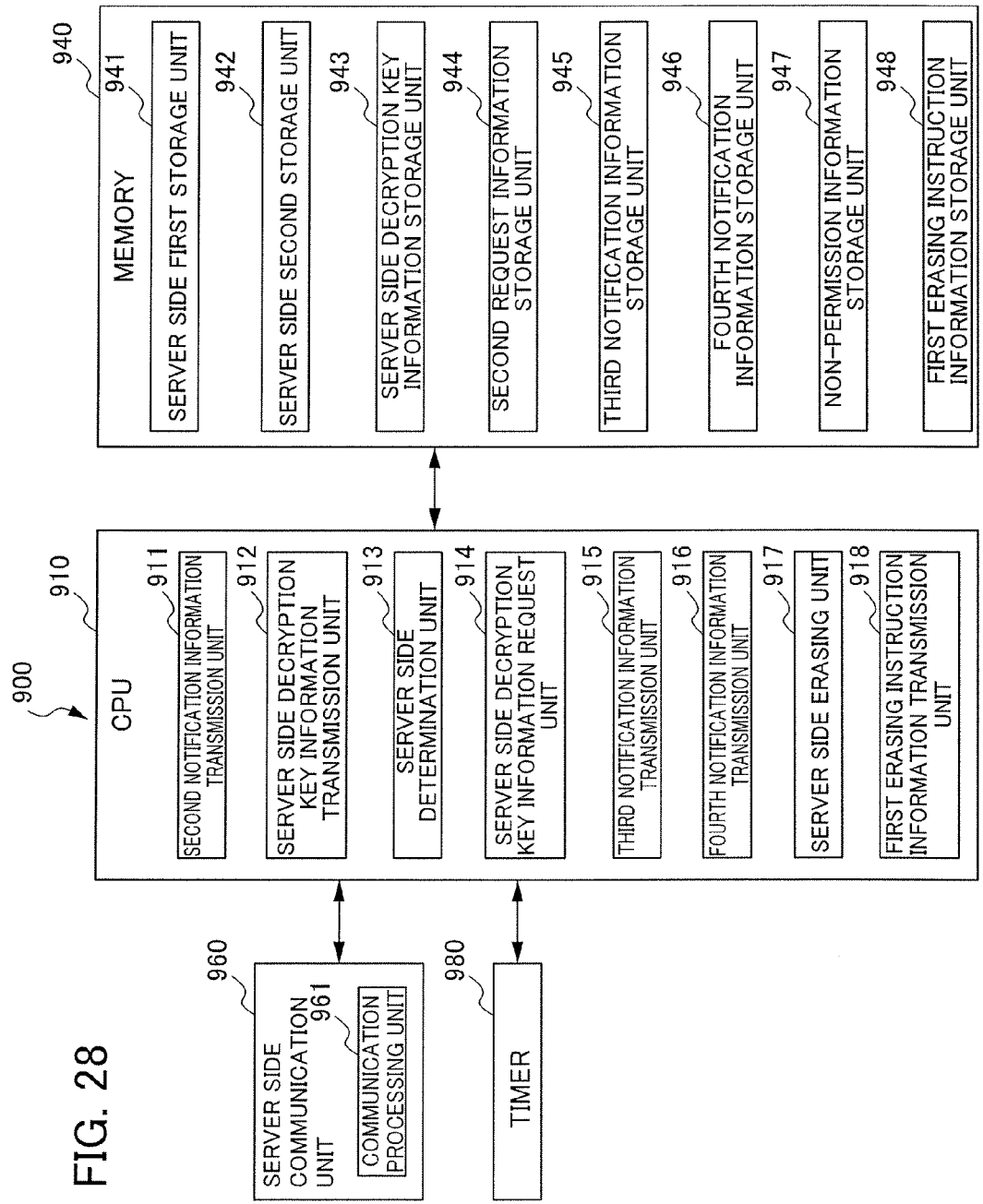
FIG. 28 is a functional block diagram illustrating a functional configuration of a server W according to the fourth embodiment.

Next, the server W is described with reference to FIG. 28. FIG. 28 is a functional block diagram illustrating the functional configuration of the server W according to the fourth embodiment.

The server W includes a server side communication unit 960 as a second server side communication unit, a timer 980, memory 940, and a CPU 910.

The server side communication unit 960 includes a communication processing unit 961. The server side communication unit 960 is configured so as to be capable of externally transmitting and receiving predetermined information. The server side communication unit 960 can transmit predetermined information to the main cellular telephone device 1D, the first cellular telephone device A4 and the second cellular telephone device B4 via the predetermined communication network N (see FIG. 22). The server side communication unit 960 can perform communication by way of a method using radio waves (the second communication method) that is different from infrared communication, or can perform wired communication as well. The server side communication unit 960 can, for example, transmit predetermined information as a text of E-mail or as an attachment to E-mail.

The communication processing unit 961 is configured with a transmitting circuit that performs transmission processing and a receiving circuit that performs reception processing. The communication processing unit 961 performs demodulation processing by the receiving circuit on a signal received via the antenna unit or wired communication, and transmits the signal thus processed to the CPU 910. In addition, the communication processing unit 961 performs modulation processing by the transmitting circuit on the signal transmitted from the CPU 910, and transmits the signal to a base station via the antenna unit or wired communication.

The timer 980 measures (times) a period of time since the non-permission information was received from the first cellular telephone device A4.

In the server W, the memory 940 includes a server side first storage unit 941, a server side second storage unit 942, a server side decryption key information storage unit 943, a second request information storage unit 944, a third notification information storage unit 945, a fourth notification information storage unit 946, a non-permission information storage unit 947, and a first erasing instruction information storage unit 948.

The server side second storage unit 942 stores server address information.

The server side first storage unit 941 stores the first identification information, the second identification information and the like that are included in the first notification information received by the server side communication unit 960.

The server side decryption key information storage unit 943 stores decryption key information and the like transmitted from the first cellular telephone device A4.

The second request information storage unit 944 stores the second request information for requesting transmission of encryption information.

The third notification information storage unit 945 stores third notification information for notifying of the fact that decryption key information is stored in the server side decryption key information storage unit 943.

The fourth notification information storage unit 946 stores fourth notification information for notifying of the fact that decryption key information is not stored in the server side decryption key information storage unit 943.

The non-permission information storage unit 947 stores non-permission information transmitted from the first cellular telephone device A4.

The first erasing instruction information storage unit 948 stores the first erasing instruction information.

In the server W, the CPU 910 includes a second communication information transmission unit 911, a server side decryption key information transmission unit 912, a server side determination unit 913, a server side decryption key information request unit 914, a third notification information transmission unit 915, a fourth notification information transmission unit 916, a server side erasing unit 917, and a first erasing instruction information transmission unit 918.

In a case in which the server side communication unit 960 receives the first notification information, the second communication information transmission unit 911 causes the server side communication unit 960 to transmit the second notification information to the first cellular telephone device A4 that is identified by way of the first identification information stored in the server side first storage unit 941. The second notification information includes: notification information for notifying of the fact that the first identification/associated information has been encrypted and transmitted from the main cellular telephone device 1D to the second cellular telephone device B4; second identification information stored in the server side first storage unit 941; and server address information stored in the server side second storage unit 942.

In a case in which the server side communication unit 960 receives the first request information, the server side decryption key information transmission unit 912 causes the server side communication unit 960 to transmit the decryption key information stored in the server side decryption key information storage unit 943 to the second cellular telephone device B4 identified by way of the second stored identification information stored in the server side first storage unit 941.

In a case in which the server side communication unit 960 receives the first request information, the server side determination unit 913 determines whether the decryption key information is stored in the server side decryption key information storage unit 943.

In a case in which the server side determination unit 913 determines that the encryption information is not stored in the server side decryption key information storage unit 943, the server side decryption key information request unit 914 causes the server side communication unit 960 to transmit, to the first cellular telephone device A4, the second request information for requesting transmission of the encryption information.

In a case in which the server side communication unit 960 receives decryption key information, the third notification information transmission unit 915 causes the server side communication unit 960 to transmit the third notification information for notifying of the fact that the decryption key information is stored in the server side decryption key information storage unit 943, to the second cellular telephone device B4 identified by way of the second identification information stored in the server side first storage unit 941.

In a case in which the server side determination unit 913 determines that the decryption key information is not stored in the server side decryption key information storage unit 943, the fourth notification information transmission unit 916 causes the server side communication unit 960 to transmit the fourth notification information for notifying of the fact that the decryption key information is not stored in the server side decryption key information storage unit 943, to the second cellular telephone device B4 identified by way of the second identification information stored in the server side first storage unit 941.

In a case in which the server side communication unit 960 receives non-permission information, the server side erasing unit 917 erases the decryption key information stored in the server side decryption key information storage unit 943. The decryption key information includes the decryption key itself, and in addition, a variety of information regarding the decryption key (history associated with the decryption key in the server W, etc.). In a case in which the server side communication unit 960 receives non-permission information, the server side erasing unit 917 starts timing by the timer 980.

In a case in which the server side communication unit 960 receives the non-permission information, the first erasing instruction information transmission unit 918 causes the server side communication unit 960 to transmit the first erasing instruction information to the second cellular telephone device B4. The first erasing instruction information includes an instruction to erase the encryption information stored in the second communication terminal side encryption information storage unit 471.

Next, with reference to FIGS. 29 to 37, descriptions are provided for operations of the communication system of the present embodiment, which includes the main cellular telephone device 1D, the first cellular telephone device A4, the second cellular telephone device B4, and the server W. Examples 4-1 to 5 are hereinafter described as examples according to the communication system of the present embodiment.

Figure 29:
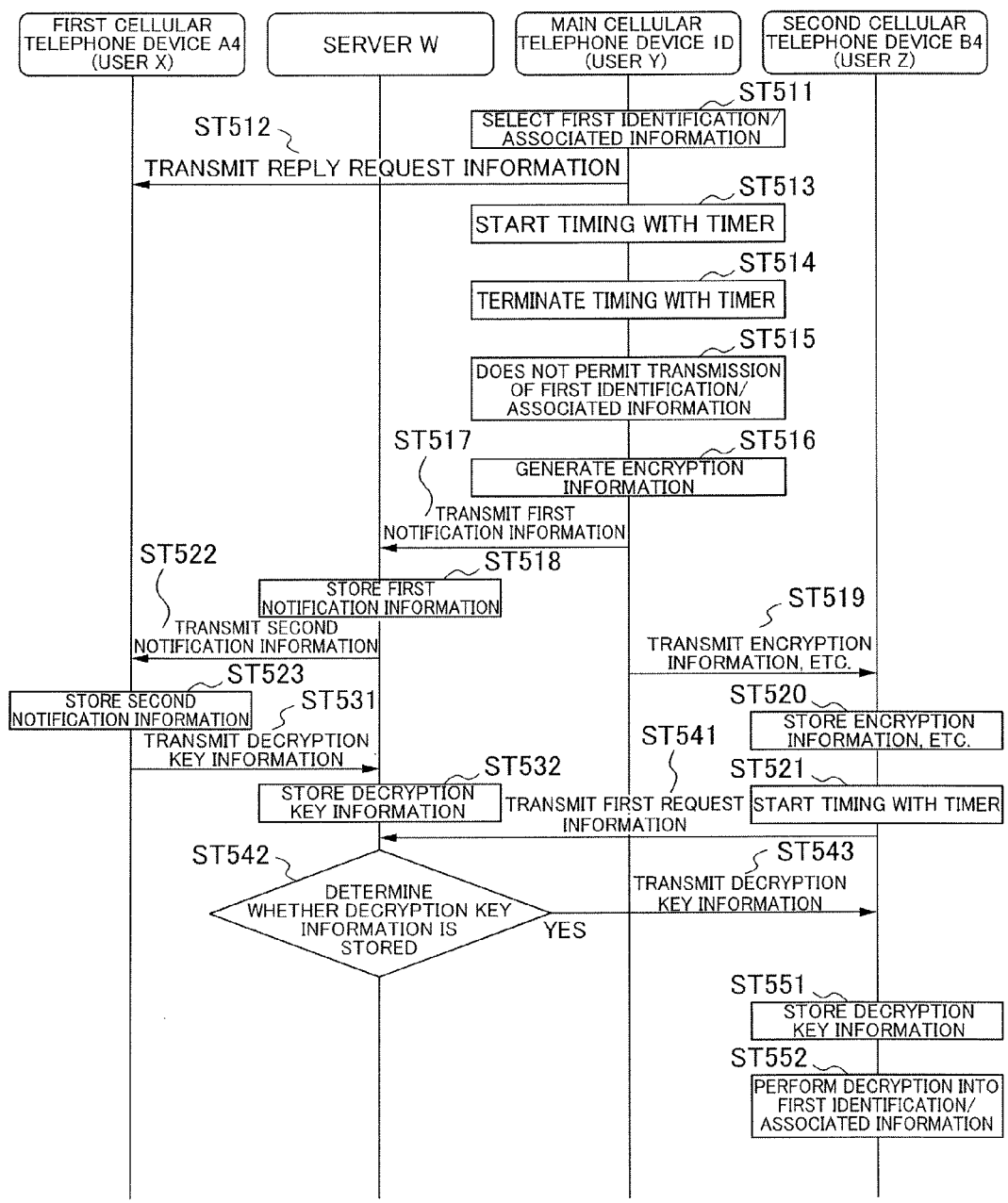
FIG. 29 is a sequence diagram showing operations in Example 4-1 relating to the communication system S of the fourth embodiment.
Figure 30:
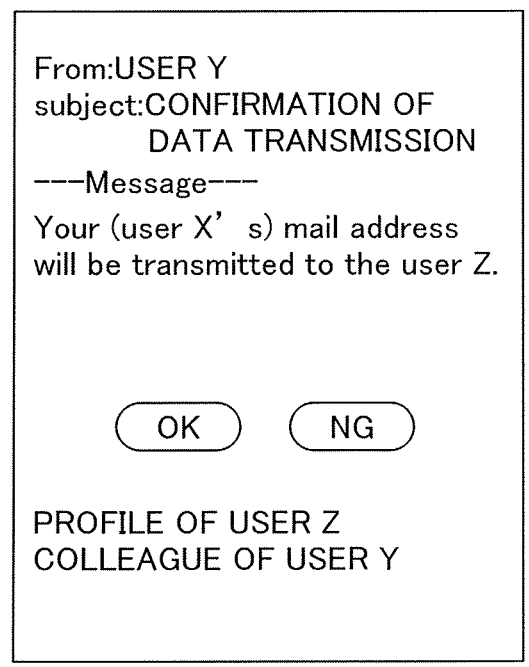
FIG. 30 is an example of reply request mail in Example 4-1.
Figure 32:
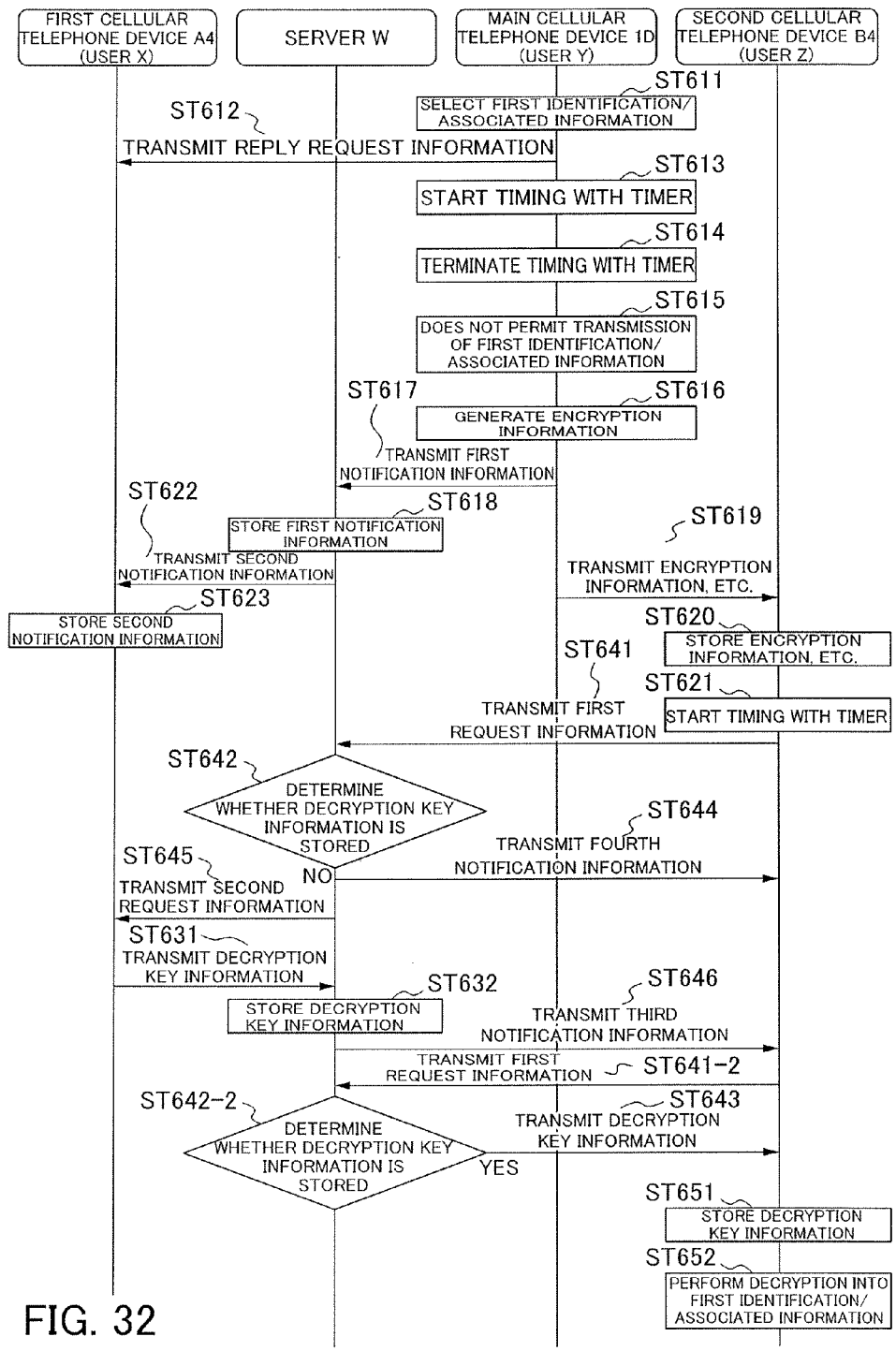
FIG. 32 is a sequence diagram showing operations in Example 4-2 according to the communication system S of the fourth embodiment.
Figure 35:
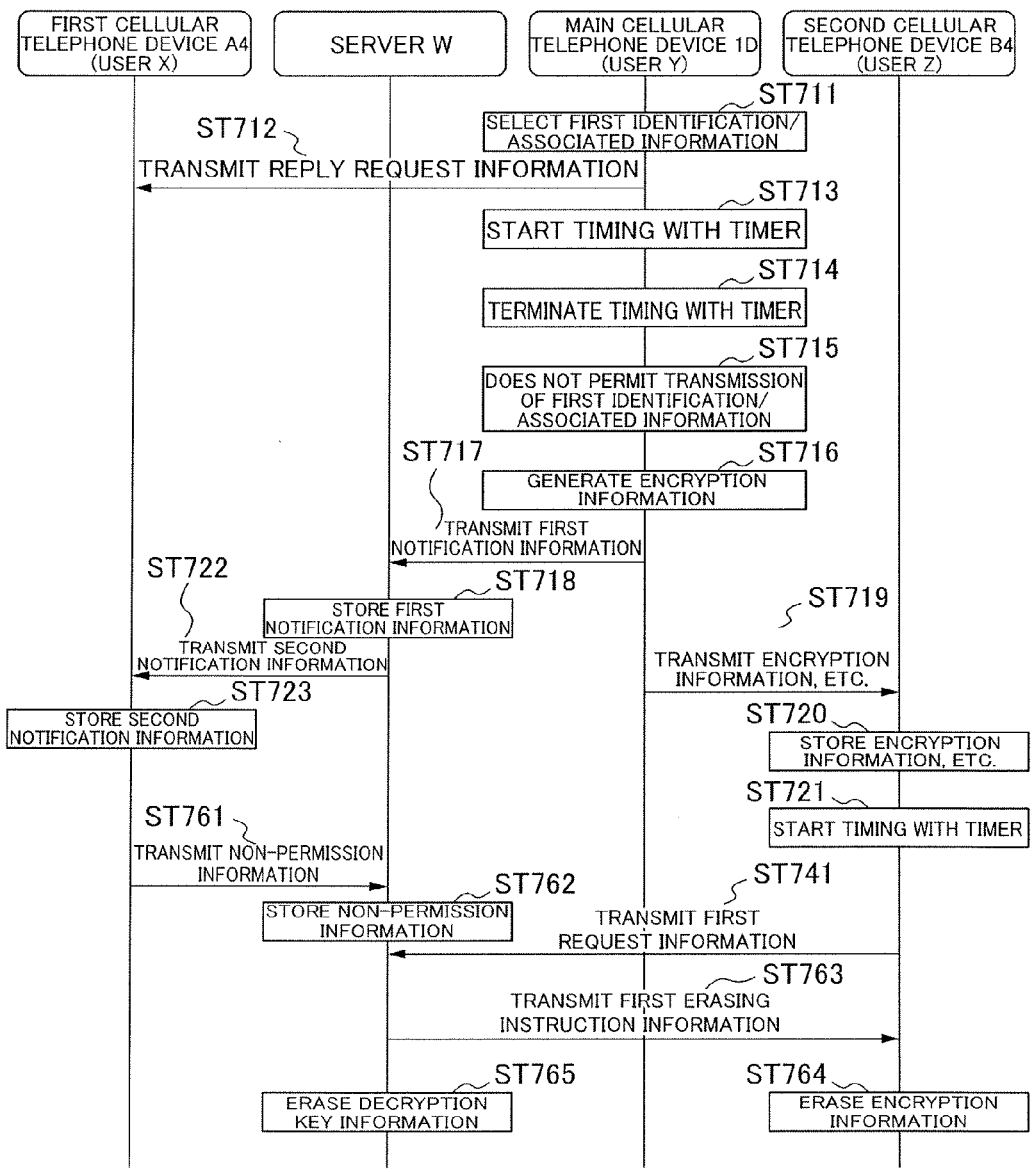
FIG. 35 is a sequence diagram showing operations in Example 4-3 relating to the communication system S of the fourth embodiment.
Figure 36:
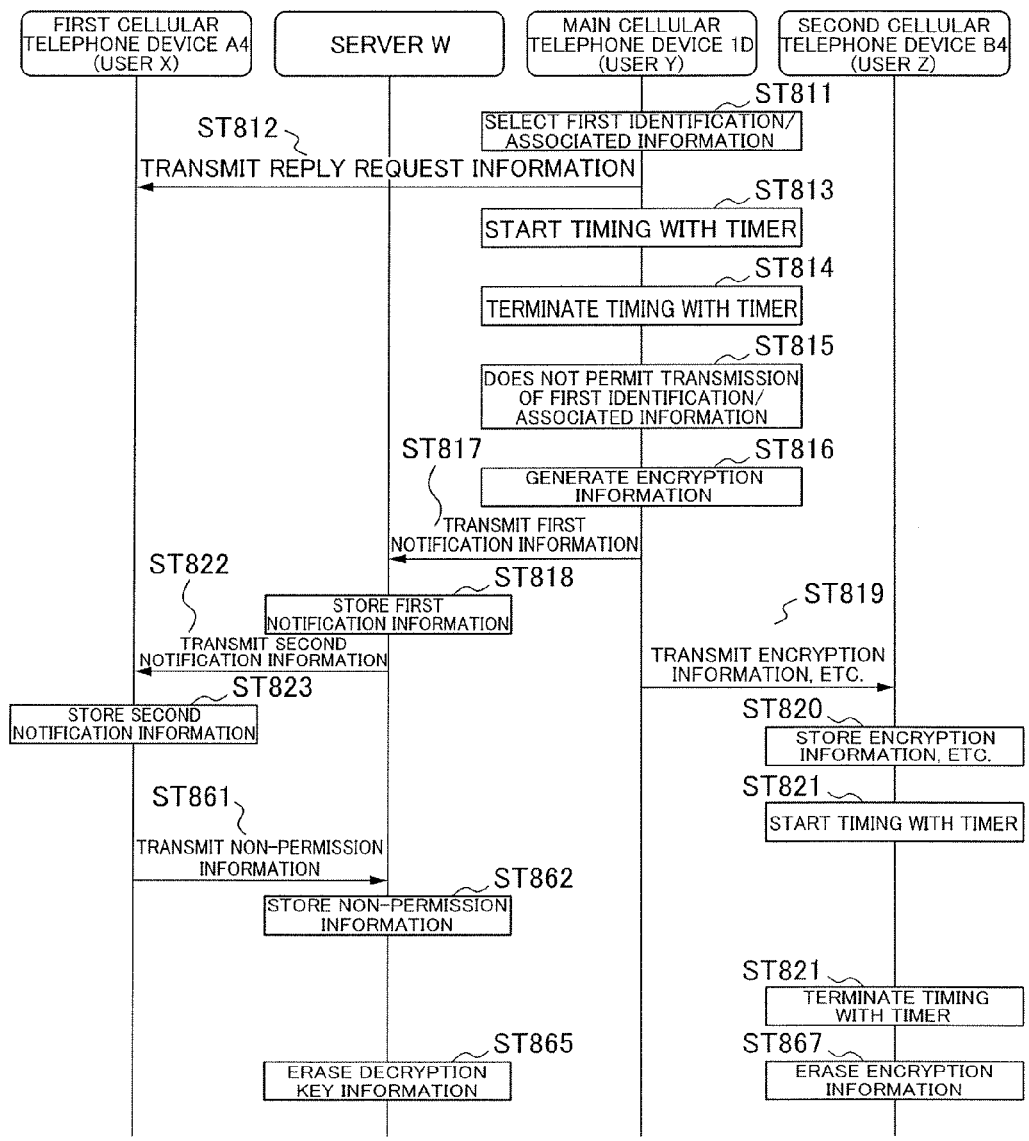
FIG. 36 is a sequence diagram showing operations in Example 4-4 relating to the communication system S of the fourth embodiment.
Figure 37:
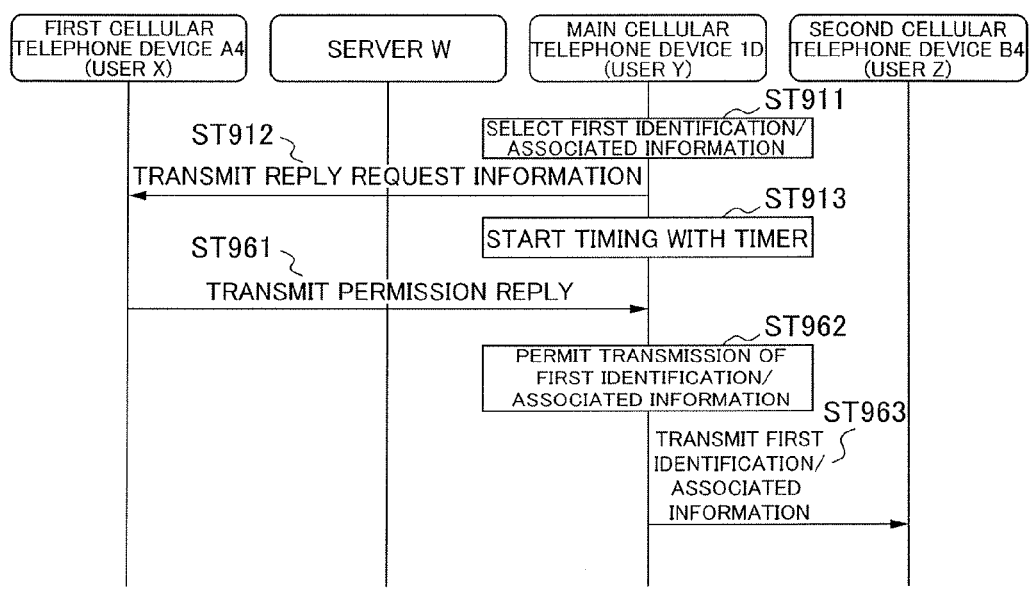
FIG. 37 is a sequence diagram showing operations in Example 4-5 relating to the communication system S of the fourth embodiment.

FIG. 29 is a sequence diagram showing operations in Example 4-1 relating to the communication system S of the fourth embodiment. FIG. 30 is an example of the reply request mail in Example 4-1. FIG. 31 is an example of the second notification information mail in Example 4-1. FIG. 32 is a sequence diagram showing operations in Example 4-2 relating to the communication system S of the fourth embodiment. FIG. 33 is an example of the second request information mail in Example 4-2. FIG. 34 is an example of the third notification information mail in Example 4-2. FIG. 35 is a sequence diagram showing operations in Example 4-3 relating to the communication system S of the fourth embodiment. FIG. 36 is a sequence diagram showing operations in Example 4-4 relating to the communication system S of the fourth embodiment. FIG. 37 is a sequence diagram showing operations in Example 4-5 according to the communication system S of the fourth embodiment.

Example 4-1

Operations in Example 4-1 are described with reference to FIGS. 29 to 31. Example 4-1 is an example in a case in which there is a request for decryption key information from the user Z to the server W, in a state in which encryption information is transmitted to the user Z, and decryption key information is registered (stored) in the server W.

When the user Y performs an operation to select information to be transmitted to the user Z from among the first identification/associated information, in Step ST511, the selection unit 421 of the CPU 45 selects information (the first selected information) to be transmitted to the second cellular telephone device B4 owned by the user Z, from among the first identification/associated information stored in the first identification/associated information storage unit 431 of the memory 44. In the present example, the first selected information is a mail address of the user X. In addition, the selection unit 421 stores the first selected information in the first selected information storage unit 432 of the memory 44.

In Step ST512, in a case in which the first selected information is the first identification/associated information, the reply request unit 422 of the CPU 45 causes the radio communication unit 200 to transmit, to the first cellular telephone device A4, information (reply request information) for requesting a reply regarding whether to permit transmission of the first selected information. Here, the reply request information is stored in the reply request information storage unit 433 of the memory 44.

In the present example, the reply request unit 422 transmits mail (reply request mail) for requesting a reply regarding whether to permit transmission of the first selected information (a mail address) to the user X. As shown in FIG. 30, this reply request mail includes, for example, a message stating that "Your (the user X's) mail address will be transmitted to the user Z. Do you approve? OK/NG", which requests confirmation and reply, and a profile of the user Z (for example, "the user Z is a colleague of the user Y").

In Step ST513, the timer 80 measures (times) a period of time (elapsed time) since the radio communication unit 200 transmitted the reply request information (reply request mail).

In Step ST514, when the elapsed time measured by the timer 80 exceeds a predetermined period of time (for example, 5 minutes), the timer 80 terminates the timing.

When the timer 80 terminates the timing, in Step ST525, the first transmission permission unit 423 does not permit transmission of the first identification/associated information to the second cellular telephone device B4.

Thereafter, in Step ST516, the encryption processing unit 424 encrypts the first identification/associated information to generate encryption information. In addition, the encryption processing unit 424 stores the encryption information thus generated in the encryption information storage unit 435 of the memory 44.

In Step ST517, the first notification information transmission unit 426 causes the radio communication unit 200 to transmit the first notification information to the server W. The first notification information is information that includes: the notification information for notifying of the fact that the first identification/associated information has been transmitted to the second cellular telephone device B4; the first identification information; and the second identification information.

In Step ST518, the server side first storage unit 941 of the server W stores the first identification information, the second identification information and the like that are included in the first notification information received by the server side communication unit 960.

Moreover, in Step ST519, the encryption information transmission permission unit 425 permits the infrared communication unit 20 to transmit the encryption information, which is generated by the encryption processing unit 424 and stored in the encryption information storage unit 435, to the second cellular telephone device B4. As a result, the infrared communication unit 20 of the main cellular telephone device 1D transmits the encryption information to the second cellular telephone device B4.

In Step ST520, the encryption information is stored in the second communication terminal side encryption information storage unit 471 of the second cellular telephone device B4.

When the infrared communication unit 20B receives the encryption information, in Step ST521, the second communication terminal side erasing unit 463 causes the timer 80B as the second communication terminal side timing unit to start measuring the time. As a result, the timer 80B measures (times) a period of time (elapsed time) since the infrared communication unit 20B received the encryption information.

In addition, in a case in which the server side communication unit 960 receives the first notification information, in Step ST522, the second communication information transmission unit 911 of the server W causes the server side communication unit 960 to transmit the second notification information to the first cellular telephone device A4. The second notification information includes: the notification information for notifying of the fact that the first identification/associated information has been encrypted and transmitted from the main cellular telephone device 1D to the second cellular telephone device B4; the second identification information stored in the server side first storage unit 941; and the server address information stored in the server side second storage unit 942.

In the present example, as shown in FIG. 31, the second communication information transmission unit 911 transmits the second notification information mail stating that "The user Y has transmitted the encryption information encrypted from your (the user X's) mail address to the user Z. If you permit decryption of the encryption information, please transmit decryption key information to the server W, and if you do not permit decryption, please transmit non-permission information to the server W."

In Step ST523, the first communication terminal side second storage unit 452 stores the second identification information, the server address information and the like that are included in the second notification information received by the radio communication unit 200A.

Thereafter, in the first cellular telephone device A4 that has received the second notification information mail, according to an operation of the user X, in Step ST531, the first communication terminal side decryption key information transmission unit 441 of the first cellular telephone device A4 causes the radio communication unit 200A to transmit the decryption key information stored in the first communication terminal side decryption key information storage unit 453 to the server W.

In Step ST532, the server side decryption key information storage unit 943 stores the decryption key information transmitted from the first cellular telephone device A4.

In this way, in a state in which the decryption key information is stored in the server W, in the second cellular telephone device B4, according to an operation of the user Z, in Step ST541, the second communication terminal side decryption key information request unit 462 causes the radio communication unit 200B to transmit the first request information for requesting the decryption key information to the server W.

In Step ST542, in a case in which the server side communication unit 960 receives the first request information, the server side determination unit 913 determines whether the decryption key information is stored in the server side decryption key information storage unit 943. In a case in which the server side determination unit 913 determines that the decryption key information is stored in the server side decryption key information storage unit 943 (YES), the processing advances to Step ST543. In a case in which the server side determination unit 913 determines that the decryption key information is not stored in the server side decryption key information storage unit 943 (NO), the processing advances to Step ST644 (see FIG. 32). It should be noted that Example 4-2 is an example in a case in which the server side determination unit 913 determines that the decryption key information is not stored in the server side decryption key information storage unit 943 (NO), and will be described later.

In a case in which the server side communication unit 960 receives the first request information, and the server side determination unit 913 determines that the decryption key information is stored in the server side decryption key information storage unit 943 (YES), in Step ST543, the server side decryption key information transmission unit 912 causes the server side communication unit 960 to transmit the decryption key information stored in the server side decryption key information storage unit 943 to the second cellular telephone device B4.

In a case in which the server side determination unit 913 determines that the decryption key information is stored in the server side decryption key information storage unit 943 (YES), in Step ST551, the decryption key information is stored in the second communication terminal side decryption key information storage unit 473 of the second cellular telephone device B4.

In a case in which the second cellular telephone device B4 receives the decryption key information before the elapsed time measured by the timer 80B reaches a predetermined period of time (for example, 12 hours), in Step ST552, the decryption processing unit 461 of the second cellular telephone device B4 decrypts the encryption information based on the decryption key information to generate the first identification/associated information. As a result, the first identification/associated information is obtained in the second cellular telephone device B4 (the user Z).

Example 4-2

Next, Example 4-2 is described. Example 4-2 is an example in a case in which the server side determination unit 913 determines that the decryption key information is not stored in the server side decryption key information storage unit 943 (NO). Since Steps ST611 to ST623 in Example 4-2 are similar to Steps ST511 to ST523 in Example 4-1, respectively, descriptions thereof are omitted.

Example 4-2 is described from the step after Step ST623.

Steps ST611 to ST623 in Example 4-2 are performed similarly to Steps ST511 to ST523 in Example 4-1.

In Example 4-1, the decryption key information is already stored in the server W (Step ST532) when the second cellular telephone device B4 transmits the first request information (Step ST541); on the other hand, in Example 4-2, the decryption key information is not stored in the server W (Step ST632 is not being performed) when the second cellular telephone device B4 transmits the first request information (Step ST641).

In this way, in a state in which the decryption key information is not stored in the server W, in the second cellular telephone device B4, according to an operation of the user Z, in Step ST641, the second communication terminal side decryption key information request unit 462 causes the radio communication unit 200B to transmit the first request information for requesting the decryption key information to the server W.

In Step ST642, in a case in which the server side communication unit 960 receives the first request information, the server side determination unit 913 determines whether the decryption key information is stored in the server side decryption key information storage unit 943. In Example 4-2, since the decryption key information is not stored in the server side decryption key information storage unit 943, the server side determination unit 913 determines that the decryption key information is not stored in the server side decryption key information storage unit 943 (NO), and the processing advances to Step ST644.

In a case in which the server side determination unit 913 determines that the decryption key information is not stored in the server side decryption key information storage unit 943 (NO), in Step ST644, the fourth notification information transmission unit 916 causes the server side communication unit 960 to transmit, to the second cellular telephone device B4, the fourth notification information for notifying of the fact that the decryption key information is not stored in the server side decryption key information storage unit 943.

Moreover, in a case in which the server side determination unit 913 determines that the decryption key information is not stored in the server side decryption key information storage unit 943 (NO), the server side decryption key information request unit 914 causes the server side communication unit 960 to transmit, to the first cellular telephone device A4, the second request information for requesting transmission of the encryption information.

In the present example, as shown in FIG. 33, the server side decryption key information request unit 914 transmits the second request information mail stating that "A request for decrypting the encryption information of your (the user X's) mail address has arrived from the user Z. If you permit decryption of the encryption information, please transmit decryption key information to the server W, and if you do not permit decryption, please transmit non-permission information to the server W."

Thereafter, in the first cellular telephone device A4 that received the second request information mail, in a case in which the user permits decryption of the encryption information, as shown in FIG. 32, according to an operation of the user X, in Step ST631, the first communication terminal side decryption key information transmission unit 441 of the first cellular telephone device A4 causes the radio communication unit 200A to transmit the decryption key information stored in the first communication terminal side decryption key information storage unit 453 to the server W.

In Step ST632, the server side decryption key information storage unit 943 stores the decryption key information transmitted from the first cellular telephone device A4.

In a case in which the server side communication unit 960 receives decryption key information, in Step ST646, the third notification information transmission unit 915 causes the server side communication unit 960 to transmit, to the second cellular telephone device B4, the third notification information for notifying of the fact that the decryption key information is stored in the server side decryption key information storage unit 943.

In the present example, as shown in FIG. 34, the third notification information transmission unit 915 transmits the third notification information mail stating that "The decryption key of the encryption information has been registered with the server W. The decryption key can be obtained from the server W".

In this way, after the second cellular telephone device B4 has confirmed that the decryption key information is registered (stored) in the server W, according to an operation of the user Z in the second cellular telephone device B4, in Step ST641-2, the second communication terminal side decryption key information request unit 462 causes the radio communication unit 200B to transmit the first request information for requesting the decryption key information to the server W.

It should be noted that the suffix "-2" added to the end of the three-digit step number denotes that the same step is performed twice in the example.

In Step ST642-2, in a case in which the server side communication unit 960 receives the first request information, the server side determination unit 913 determines whether the decryption key information is stored in the server side decryption key information storage unit 943. In this case, the server side determination unit 913 determines that the decryption key information is stored in the server side decryption key information storage unit 943 (YES), and the processing advances to Step ST643.

In a case in which the server side communication unit 960 receives the first request information, and the server side determination unit 913 determines that the decryption key information is stored in the server side decryption key information storage unit 943 (YES), in Step ST643, the server side communication unit 960 is caused to transmit the decryption key information stored in the server side decryption key information storage unit 943 to the second cellular telephone device B4.

In a case in which the server side determination unit 913 determines that the decryption key information is stored in the server side decryption key information storage unit 943 (YES), in Step ST651, the decryption key information is stored in the second communication terminal side decryption key information storage unit 473 of the second cellular telephone device B4.

In a case in which the second cellular telephone device B4 receives the decryption key information before the elapsed time measured by the timer 80B reaches a predetermined period of time (for example, 12 hours), in Step ST652, the decryption processing unit 461 of the second cellular telephone device B4 decrypts the encryption information based on the decryption key information to generate the first identification/associated information. As a result, the first identification/associated information is obtained in the second cellular telephone device B4 (the user Z).

Example 4-3

Next, Example 4-3 is described. Example 4-3 is an example in which the user X transmits non-permission information to the server W. Since Steps ST711 to ST723 in Example 4-3 are similar to Steps ST511 to ST523 in Example 4-1, respectively, descriptions thereof are omitted.

Example 4-3 is described from the step after Step ST723.

Steps ST711 to ST723 in Example 4-3 are performed similarly to Steps ST511 to ST523, ST531 and ST532 in Example 4-1.

Example 4-3 is mainly different from Example 4-1 in that the first cellular telephone device A4 transmits non-permission information to the server W (Step ST761).

In the first cellular telephone device A4 that received the second notification information mail, in a case in which the user X decided not to permit transmission of the decryption key information to the user Z, according to an operation of the user X in the first cellular telephone device A4, in Step ST761, the non-permission information transmission unit 442 causes the radio communication unit 200 to transmit the non-permission information to the server W. The non-permission information is information for not permitting transmission of the decryption key information stored in the first communication terminal side decryption key information storage unit 453 to the second cellular telephone device B4.

When the server side communication unit 960 of the server W receives the non-permission information, in Step ST762, the non-permission information is stored in the non-permission information storage unit 947.

When the server side communication unit 960 of the server W receives the non-permission information, the server side erasing unit 917 starts timing by the timer 980.

In Example 4-3, in a state in which the non-permission information is stored in the non-permission information storage unit 947, in Step ST741, according to an operation of the user Z in the second cellular telephone device B4, the second communication terminal side decryption key information request unit 462 causes the radio communication unit 200B to transmit the first request information for requesting the decryption key information to the server W.

In a case in which the server side communication unit 960 receives the non-permission information, in Step ST763, the first erasing instruction information transmission unit 918 causes the server side communication unit 960 to transmit the first erasing instruction information to the second cellular telephone device B4. The first erasing instruction information includes an instruction to erase the encryption information stored in the second communication terminal side encryption information storage unit 471.

In the second cellular telephone device B4 that received the first erasing instruction information, in a case in which the radio communication unit 200B receives the first erasing instruction information, in Step ST764, the second communication terminal side erasing unit 463 erases the encryption information stored in the second communication terminal side encryption information storage unit 471.

Moreover, in a case in which the server side communication unit 960 receives the non-permission information, in Step ST765, the server side erasing unit 917 erases the decryption key information stored in the server side decryption key information storage unit 943.

Example 4-4

Next, Example 4-4 is described. Example 4-4 is an example in a case in which a predetermined period of time elapsed since the second cellular telephone device B4 received the encryption information, and thus the encryption information stored in the second cellular telephone device B4 is automatically erased. Since Steps ST811 to ST823, ST861 and ST862 in Example 4-4 are similar to Steps ST711 to ST723, ST761 and ST762 in Example 4-3, respectively, descriptions thereof are omitted.

Example 4-2 is described from Step ST823.

Steps ST811 to ST823, ST861 and ST862 in Example 4-4 are performed similarly to Steps ST711 to ST723, ST761 and ST762 in Example 4-3.

As shown in FIG. 36, in Step ST862, the non-permission information storage unit 947 stores the non-permission information transmitted from the first cellular telephone device A4.

In the second cellular telephone device B4, when a predetermined period of time (for example, 12 hours) elapses since the timer 80B started timing, in Step ST866, the timing by the timer 80B is terminated.

Thereafter, in Step ST867, the second communication terminal side erasing unit 463 erases the encryption information stored in the second communication terminal side encryption information storage unit 471 of the memory 44B.

Example 4-5

Next, Example 4-5 is described. Example 4-5 is an example in a case in which the first cellular telephone device A4 (the user X) transmits a permission reply within a predetermined period of time after reply request information (reply request mail) is transmitted. Since Steps ST911 to ST913 in Example 4-5 are similar to Steps ST511 to ST513 in Example 4-1, respectively, descriptions thereof are omitted.

Example 4-5 is described from Step ST913.

As shown in FIG. 37, in Step ST913, the timer 80 of the second cellular telephone device B4 starts measuring (timing) a period of time since the reply request mail was transmitted (see FIG. 30).

When the user X, who owns the first cellular telephone device A4, confirms the reply request mail, and the user X performs an operation (selecting "OK") to transmit a reply (permission reply) for permitting transmission of the first identification/associated information, in Step ST961, the CPU 45A of the first cellular telephone device A4 causes the radio communication unit 200A to transmit permission reply mail as a permission reply. As a result, the radio communication unit 200A of the first cellular telephone device A4 transmits the permission reply mail.

In a case in which the second cellular telephone device B4 receives the permission reply mail via the radio communication unit 200 before the elapsed time measured by the timer 80 reaches a predetermined period of time (for example, 5 minutes), in Step ST962, the first transmission permission unit 423 permits the infrared communication unit 20 to transmit the first identification/associated information selected by the selection unit 421 (the first selected information stored in the first selected information storage unit 432) to the second cellular telephone device B4.

Subsequently, in Step ST963, the main cellular telephone device 1D transmits the first identification/associated information (a mail address of the user X) to the second cellular telephone device B4 via the infrared communication unit 20.

As described above, for example, the following effects are achieved according to the communication system S of the present embodiment.

For example, when the first identification/associated information (the mail address of the user X) being encrypted (encryption information) is transmitted to the user Z (the second cellular telephone device B4) in a state in which permission of the user X is not obtained, and the permission (the decryption key information) of the user X is subsequently obtained, the decryption key information for decrypting the encryption information can be transmitted to the user Z (the second cellular telephone device B4) via the server W.

Moreover, since transactions among the cellular telephone devices are mainly performed by the server W, the processing load on each cellular telephone device is small.

In addition, as in Example 4-2, even in a case in which the decryption key information is not stored in the server W, the decryption key information can be requested to the first cellular telephone device A4 (the user X) by way of the second request information mail via the server W.

Furthermore, as in Examples 4-3 and 4-4, in a case in which the first cellular telephone device A4 (the user X) has transmitted the non-permission information to the server W, and in a case in which the predetermined period of time has elapsed, it is possible to erase the decryption key information stored in the server W and the encryption information stored in the second cellular telephone device B4. This is preferable in terms of the security of the first identification/associated information.

Next, the communication system S of a fifth embodiment is described. With reference to FIGS. 38 to 41, a description is mainly provided for the functional configuration relating to the memory 44 in a main cellular telephone device 1E, a first cellular telephone device A5, and a second cellular telephone device B5, as well as the functional configuration relating to the CPU 45 in the main cellular telephone device 1E, the first cellular telephone device A5, and the second cellular telephone device B5. In the present embodiment, descriptions are omitted for configurations similar to those in the fourth embodiment shown in FIGS. 25 to 27.

Figure 38:
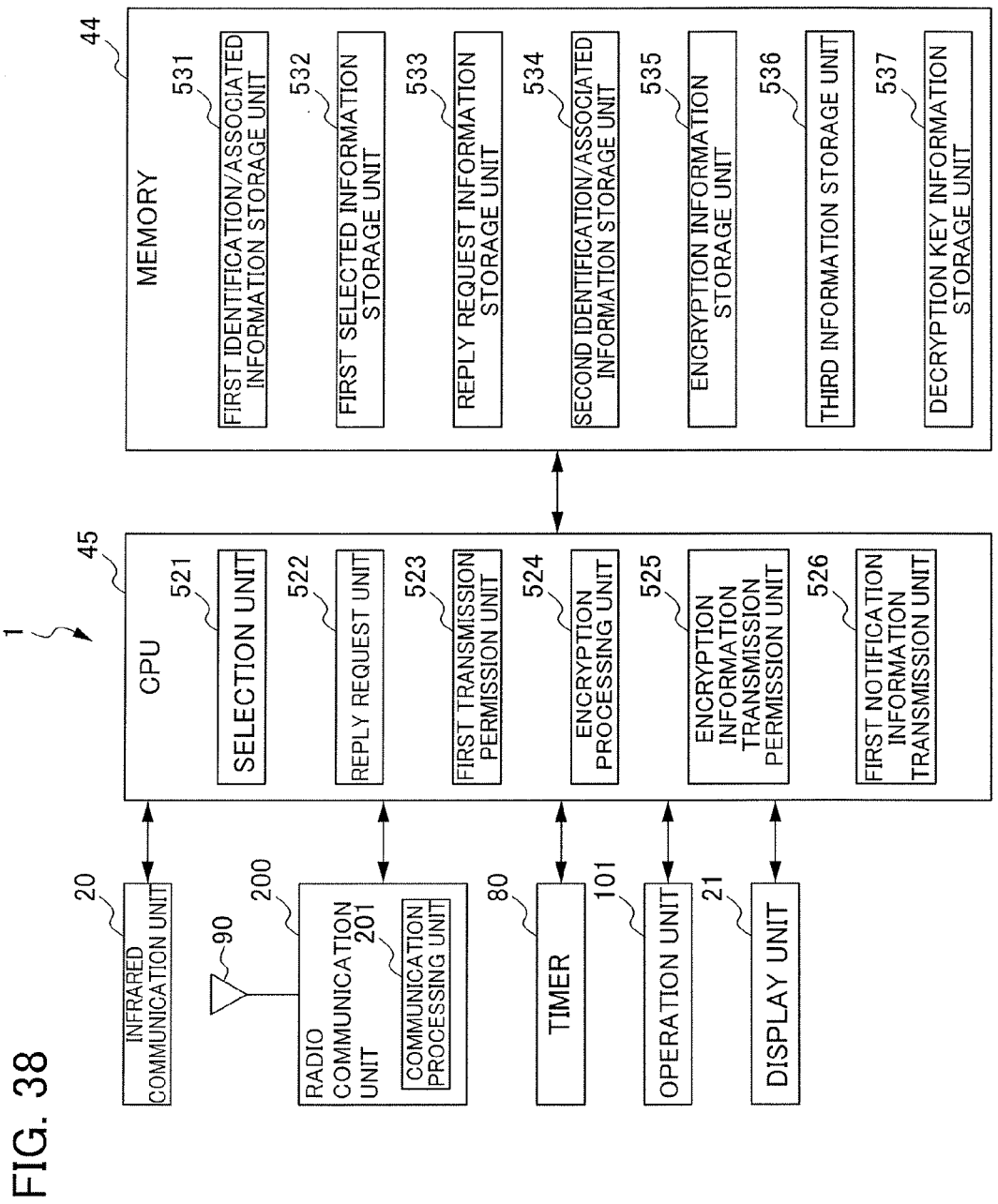
FIG. 38 is a functional block diagram illustrating a functional configuration of the main cellular telephone device 1F according to a fifth embodiment.
Figure 39:
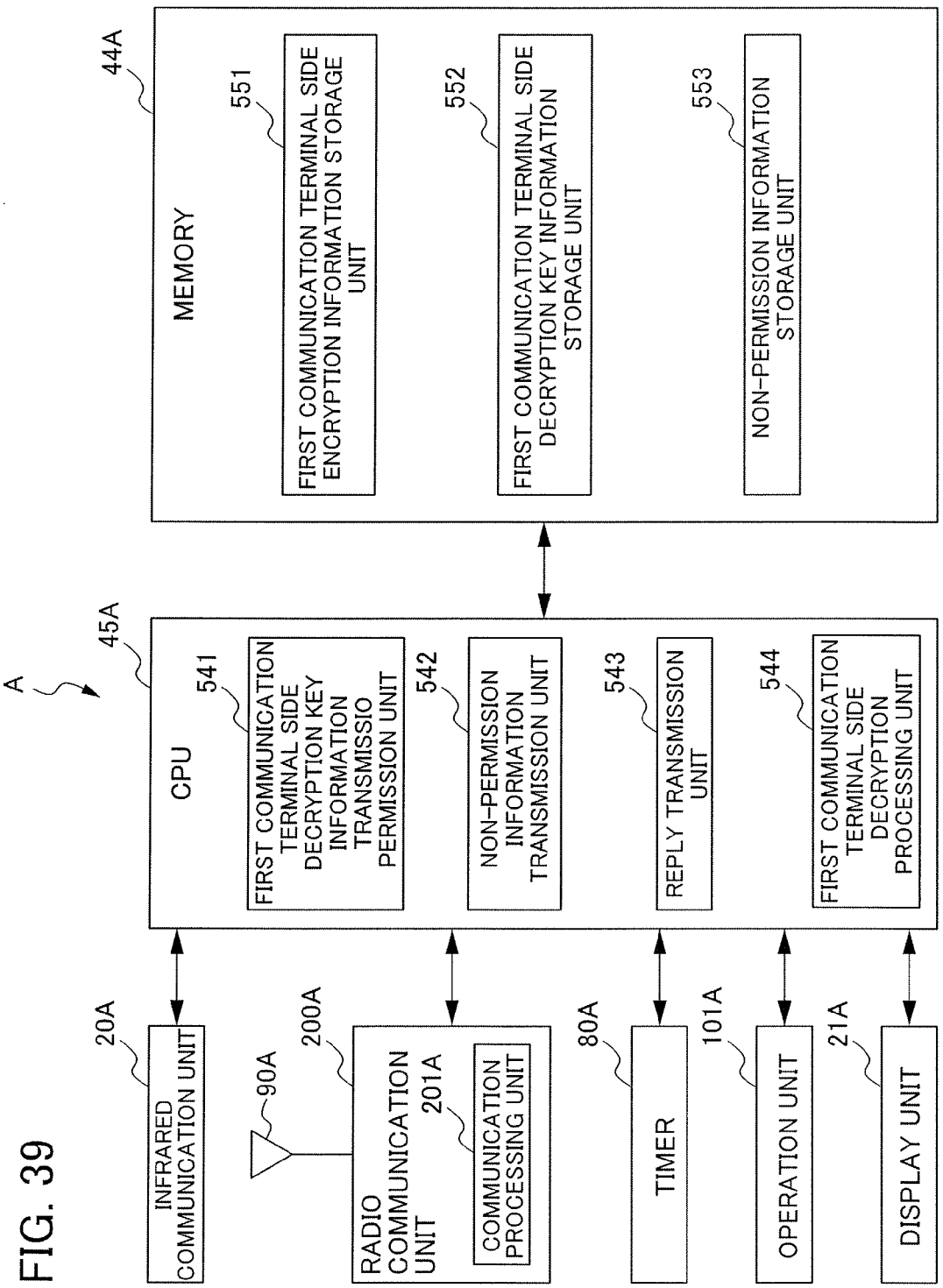
FIG. 39 is a functional block diagram illustrating a functional configuration of a first cellular telephone device A5 according to the fifth embodiment.
Figure 40:
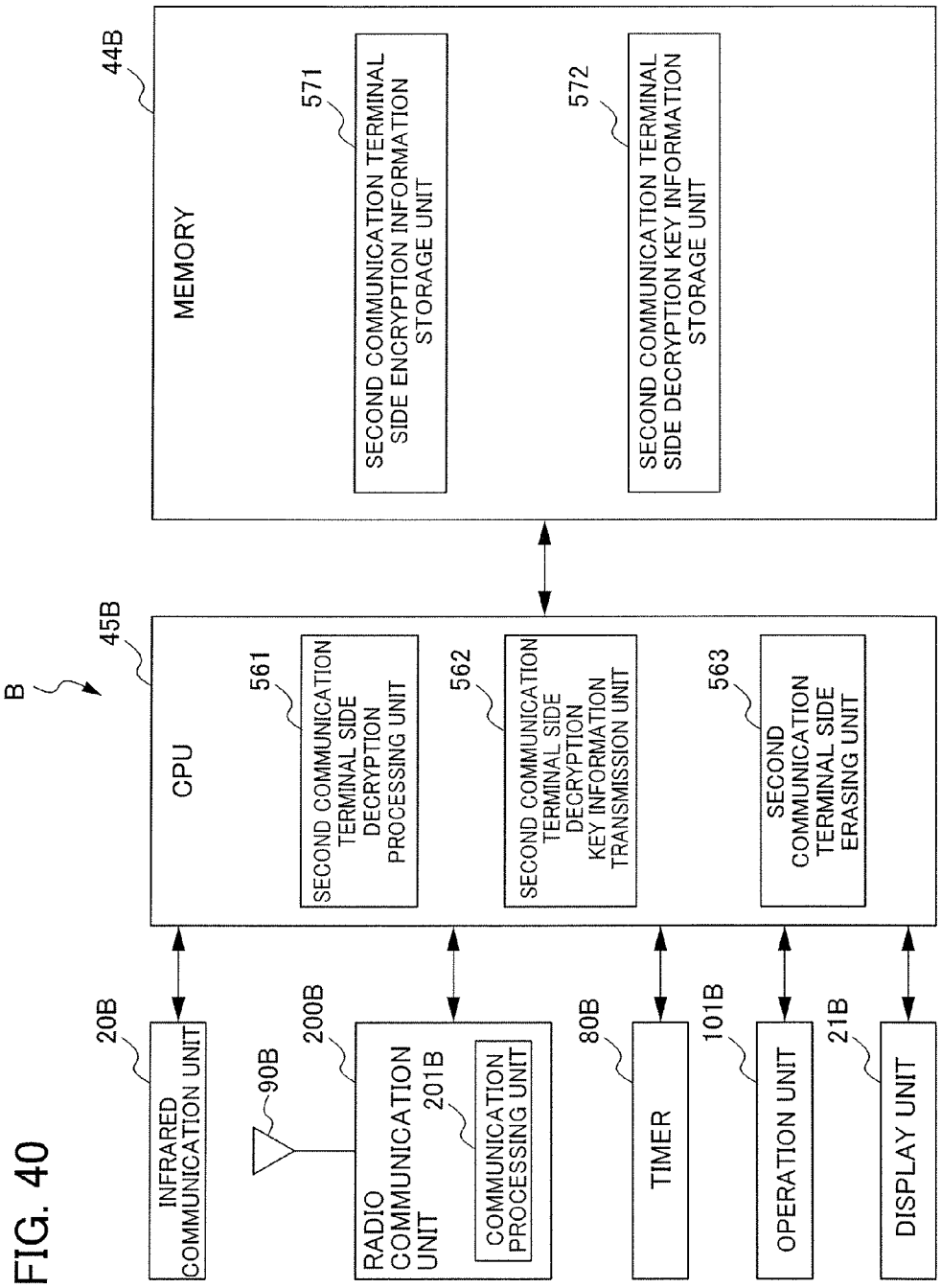
FIG. 40 is a functional block diagram illustrating a functional configuration of a second cellular telephone device B5 according to the fifth embodiment.

FIG. 38 is a functional block diagram illustrating the functional configuration of the main cellular telephone device 1E according to the fifth embodiment. FIG. 39 is a functional block diagram illustrating the functional configuration of the first cellular telephone device A5 according to the fifth embodiment. FIG. 40 is a functional block diagram illustrating the functional configuration of the second cellular telephone device B5 according to the fifth embodiment.

As shown in FIG. 38, in the main cellular telephone device 1E, an encryption processing unit 524 of the CPU 45 encrypts the first identification information of the first cellular telephone device A5 to generate the first encryption information, and encrypts the second associated information of the second cellular telephone device B5 to generate the second encryption information.

Moreover, in the main cellular telephone device 1E, the encryption information storage unit 535 of the memory 44 stores the first encryption information and the second encryption information generated in the encryption processing unit 524.

In addition, in the main cellular telephone device 1E, a decryption key information storage unit 537 of the memory 44 stores the first decryption key information including a first decryption key for decrypting the first encryption information, and the second decryption key information including a second decryption key for decrypting the second encryption information.

As shown in FIG. 39, in the first cellular telephone device A5, the CPU 45A includes a first communication terminal side decryption processing unit 544, and the memory 44A includes a first communication terminal side encryption information storage unit 551 and a first communication terminal side decryption key information storage unit 552.

The first communication terminal side decryption processing unit 544 decrypts the second encryption information based on the second decryption key information to generate the second associated information.

The first communication terminal side encryption information storage unit 551 stores the second encryption information.

The first communication terminal side decryption key information storage unit 552 stores the first decryption key information.

As shown in FIG. 40, in the second cellular telephone device B5, the second CPU 45B includes a second communication terminal side decryption processing unit 561, and the second memory 44B includes a second communication terminal side decryption key information storage unit 572.

The second communication terminal side decryption processing unit 561 decrypts the first encryption information based on the first decryption key information to generate the first identification information.

The second communication terminal side decryption key information storage unit 572 stores the second decryption key information.

Figure 41:
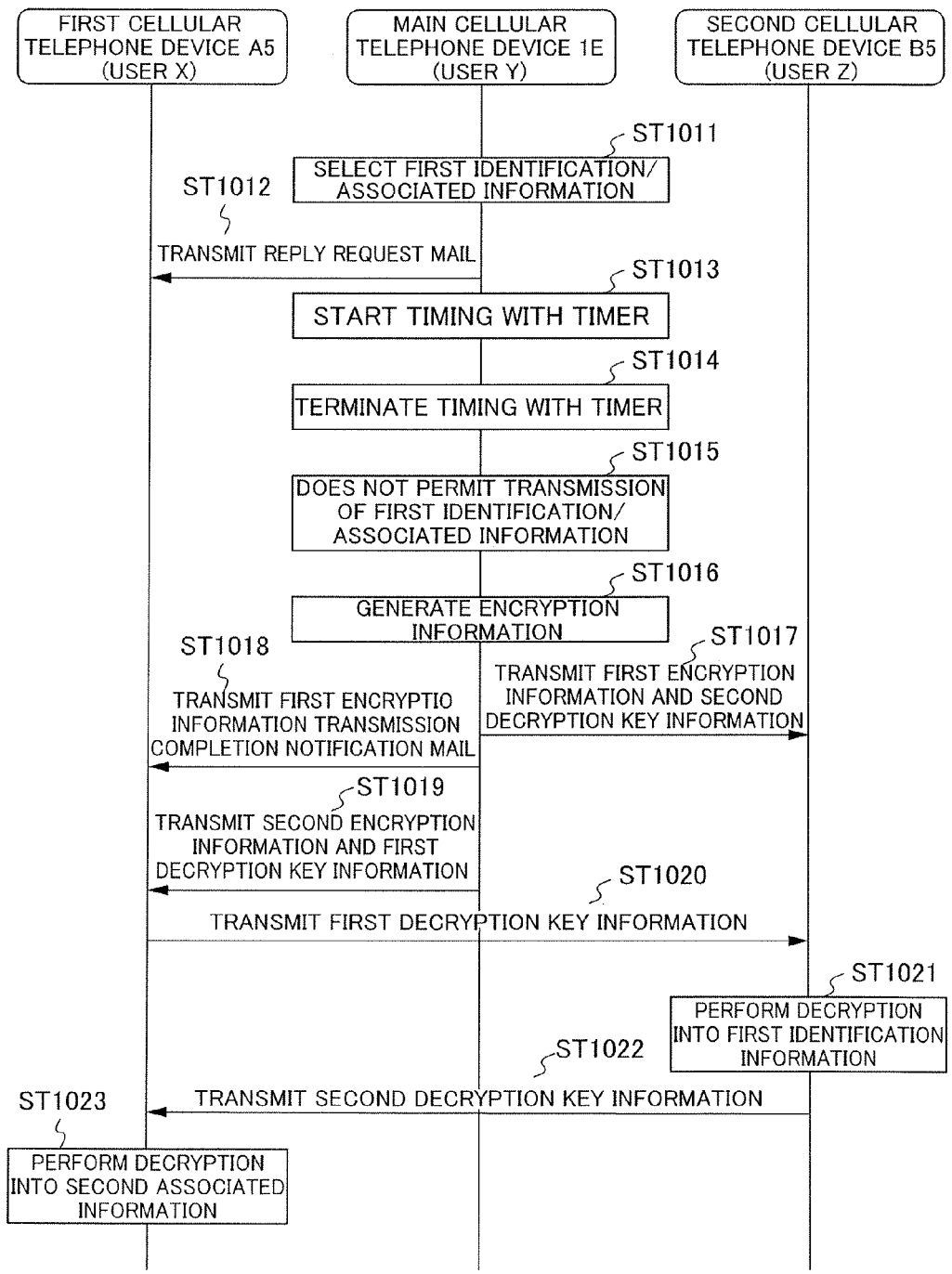
FIG. 41 is a sequence diagram showing operations relating to the communication system S of the fifth embodiment.

Operations relating to the communication system S of the fifth embodiment are described with reference to FIG. 41. FIG. 41 is a sequence diagram showing operations relating to the communication system S of the fifth embodiment.

Since Steps ST1011 to ST1015 in the operations relating to the communication system S of the fifth embodiment are similar to Steps ST231 to ST235 in the second embodiment, respectively, descriptions thereof are omitted.

In Step ST1015, in a case in which the elapsed time measured by the timer 80 exceeds a predetermined period of time (for example, 5 minutes), and thus the first transmission permission unit 523 does not permit transmission of the first identification/associated information to the second cellular telephone device B5, in Step ST1016, the encryption processing unit 524 encrypts the first identification information to generate the first encryption information, and encrypts the second associated information to generate the second encryption information. In addition, the encryption processing unit 524 stores the first encryption information and the second encryption information thus generated in the encryption information storage unit 535 of the memory 44.

In Step ST1017, the first transmission permission unit 532 permits the radio communication unit 200 to transmit, to the second cellular telephone device B5, the first encryption information that is generated by the encryption processing unit 524 and stored in the encryption information storage unit 535, and the second decryption key information stored in the decryption key information storage unit 537. As a result, the first encryption information and the second decryption key information are transmitted from the radio communication unit 200 of the main cellular telephone device 1E to the second cellular telephone device B5. In addition, the second cellular telephone device B5, which received the first encryption information and the second decryption key information from the main cellular telephone device 1E, stores the first encryption information in the second communication terminal side encryption information storage unit 571, and stores the second decryption key information in the second communication terminal side decryption key information storage unit 572.

After the first encryption information is transmitted to the second cellular telephone device B5, in Step ST1018, the second notification unit 526 notifies the first cellular telephone device A5 of information of the fact that the encrypted first identification/associated information (first encryption information) has been transmitted to the user Z, and information for requesting permission for transmitting the first decryption key or the like for decrypting the first encryption information to the user Z.

In Step ST1019, the first transmission permission unit 532 permits the radio communication unit 200 to transmit, to the first cellular telephone device A5, the second encryption information that is generated by the encryption processing unit 524 and stored in the encryption information storage unit 535, and the first decryption key information stored in the decryption key information storage unit 537. As a result, the second encryption information and the first decryption key information are transmitted from the radio communication unit 200 of the main cellular telephone device 1E to the first cellular telephone device A5. The first cellular telephone device A5, which received the second encryption information and the first decryption key information from the main cellular telephone device 1E, stores the second encryption information in the first communication terminal side encryption information storage unit 551, and stores the first decryption key information in the first communication terminal side decryption key information storage unit 552.

In the first cellular telephone device A5 (the user X), in a case in which the encryption information transmission completion notification mail is received, and the user X determines that the first decryption key information may be transmitted to the second cellular telephone device B5 (the user Z), according to an operation of the user X, the first communication terminal side decryption key information transmission permission unit 541 permits the radio communication unit 200A of the first cellular telephone device A5 to transmit the first decryption key information stored in the decryption key information storage unit 537 to the second cellular telephone device B5. As a result, in Step ST1020, the radio communication unit 200A of the first cellular telephone device A5 transmits the first decryption key information to the second cellular telephone device B5.

When the second cellular telephone device B5 receives the first decryption key information, in Step ST1021, the second communication terminal side decryption processing unit 561 decrypts the first encryption information based on the first decryption key information to generate the first identification information. As a result, the first identification information is obtained in the second cellular telephone device B5 (the user Z).

When the first encryption information is decrypted and the first identification information is generated in second cellular telephone device B5, in Step ST1022, the second communication terminal side decryption key information transmission unit 562 causes the radio communication unit 200 to transmit, to the first cellular telephone device A5, the second decryption key information stored in the second communication terminal side decryption key information storage unit 572.

When the first cellular telephone device A5 receives the second decryption key information, in Step ST1023, the first communication terminal side decryption processing unit 544 decrypts the second encryption information based on the second decryption key information to generate the second associated information. As a result, the second associated information is obtained in the first cellular telephone device A5 (the user X).

In this way, in the fifth embodiment, after transmitting the second encryption information and the first decryption key information to the first cellular telephone device A5 (the user X), and transmitting the first encryption information and the second decryption key information to the second cellular telephone device B5 (the user Z), the transactions of the first decryption key information and the second decryption key information can be performed as transactions between the first cellular telephone device A5 (the user X) and the second cellular telephone device B5 (the user Z) without involving the main cellular telephone device 1E (the user Y). Therefore, the load on the main cellular telephone device 1E (the user Y) is reduced.

Moreover, in the fifth embodiment, since the identification information of the first cellular telephone device A5 (the user X) and the associated information of the second cellular telephone device B5 (the user Z) are encrypted, the information transactions can be performed in a state ensuring the security of each of the first cellular telephone device A5 (the user X) and the second cellular telephone device B5 (the user Z).

Next, the communication system S of a sixth embodiment is described. The functional configuration relating to the memory 44 in a server W1 and the functional configuration relating to the CPU 45 are mainly described with reference to FIG. 42. In the present embodiment, descriptions are omitted for configurations similar to those in the fourth embodiment shown in FIGS. 22 to 28 and the fifth embodiment shown in FIGS. 38 to 40. FIG. 28 is a functional block diagram illustrating the functional configuration of the server W1 according to the sixth embodiment.

Figure 42:
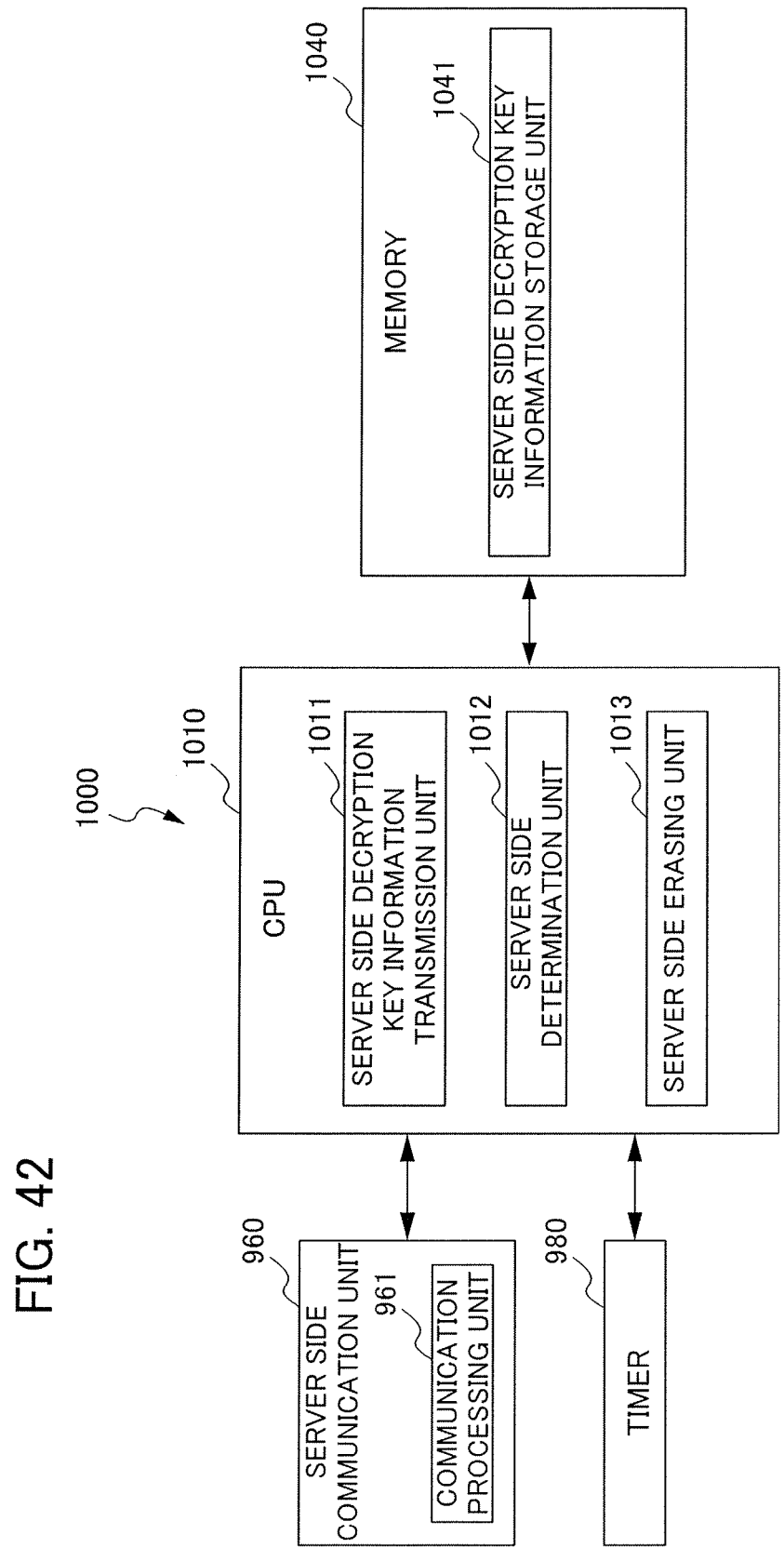
FIG. 42 is a functional block diagram illustrating a functional configuration of a server W1 according to a sixth embodiment.

As shown in FIG. 42, in the server W1, the CPU 1010 includes a server side decryption key information transmission unit 1011, and the memory 1040 includes the server side decryption key information storage unit 1041.

The server side decryption key information transmission unit 1011 transmits the first decryption key information to the second cellular telephone device B6, and transmits the first decryption key information to the second cellular telephone device B6.

The server side decryption key information storage unit 1041 stores the first decryption key information and the second decryption key information.

Moreover, the server side determination unit 1012 determines whether the server side communication unit 960 has received the first decryption key information and the second decryption key information.

When a predetermined time elapses, a server side erasing unit 1013 erases the first decryption key information and the second decryption key information stored in the server side decryption key information storage unit 1041.

Figure 43:
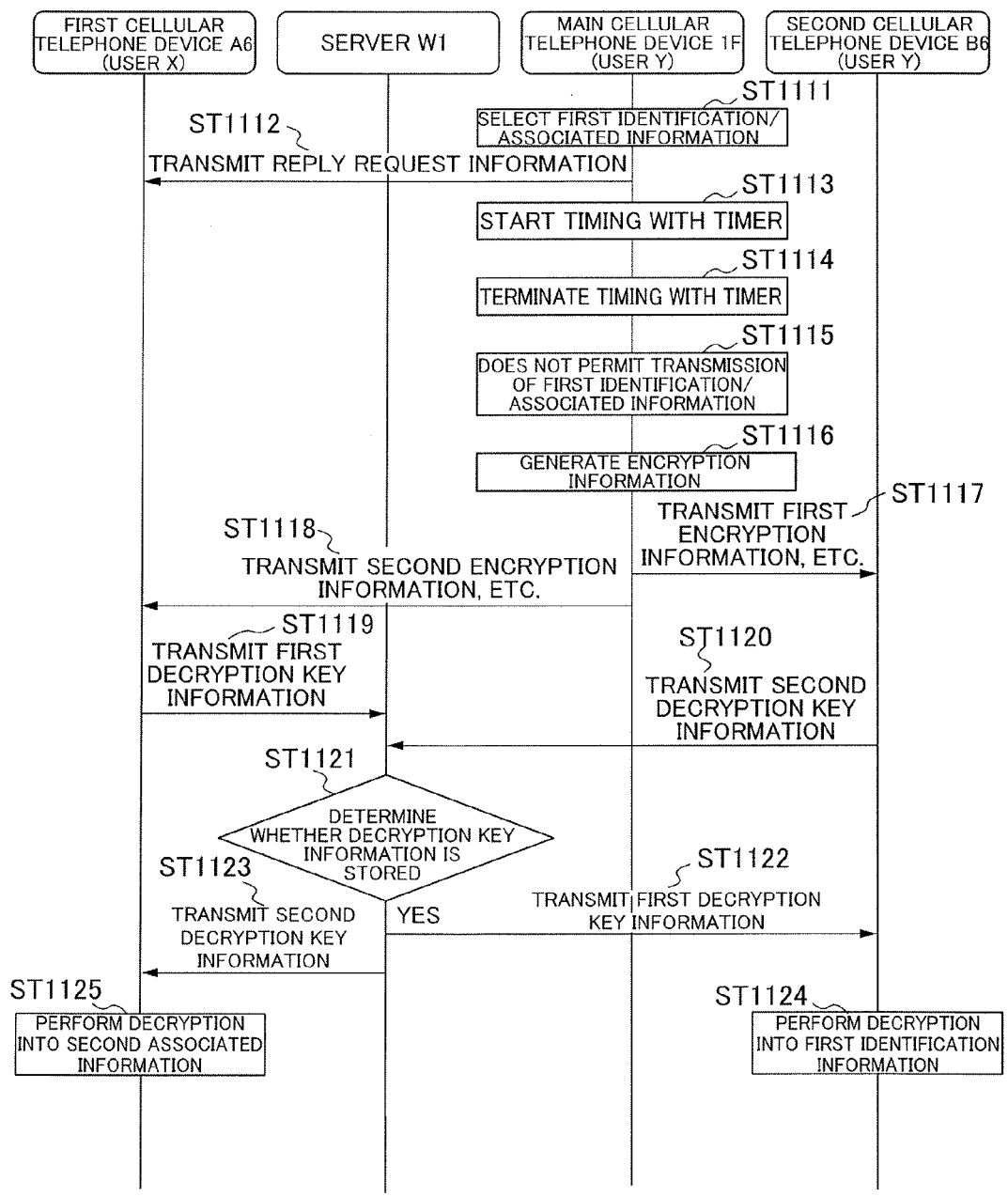
FIG. 43 is a sequence diagram showing operations relating to the communication system S of the sixth embodiment.

Operations relating to the communication system S of the sixth embodiment are described with reference to FIG. 43. FIG. 43 is a sequence diagram showing operations relating to the communication system S of the sixth embodiment.

Since Steps ST1111 to ST1115 in the operations relating to the communication system S of the sixth embodiment are similar to Steps ST711 to ST715 in the fourth embodiment, respectively, descriptions thereof are omitted.

In Step ST1115, in a case in which the elapsed time measured by the timer 80 exceeds a predetermined period of time (for example, 5 minutes), and thus the first transmission permission unit 523 does not permit transmission of the first identification/associated information to the second cellular telephone device B6, in Step ST1116, the encryption processing unit 524 encrypts the first identification information to generate the first encryption information, and encrypts the second associated information to generate the second encryption information. In addition, the encryption processing unit 524 stores the first encryption information and the second encryption information thus generated in the encryption information storage unit 535 of the memory 44.

In Step ST1117, the first transmission permission unit 532 permits the radio communication unit 200 to transmit, to the second cellular telephone device B6, the first encryption information that is generated by the encryption processing unit 524 and stored in the encryption information storage unit 535, and the second decryption key information stored in the decryption key information storage unit 537. As a result, the first encryption information and the second decryption key information are transmitted from the radio communication unit 200 of the main cellular telephone device 1F to the second cellular telephone device B6. In addition, the second cellular telephone device B6, which received the first encryption information and the second decryption key information from the main cellular telephone device 1F, stores the first encryption information in the second communication terminal side encryption information storage unit 571, and stores the second decryption key information in the second communication terminal side decryption key information storage unit 572.

After the first encryption information is transmitted to the second cellular telephone device B6, in Step ST1118, the second notification unit 526 notifies the first cellular telephone device A6 of information of the fact that the encrypted first identification information (the first encryption information) has been transmitted to the user Z, and information for requesting permission for transmitting the first decryption key or the like for decrypting the first encryption information to the user Z.

Moreover, in Step ST1018, the first transmission permission unit 532 permits the radio communication unit 200 to transmit, to the first cellular telephone device A6, the second encryption information that is generated by the encryption processing unit 524 and stored in the encryption information storage unit 535, and the first decryption key information stored in the decryption key information storage unit 537. As a result, the second encryption information and the first decryption key information are transmitted from the radio communication unit 200 of the main cellular telephone device 1F to the first cellular telephone device A6. The first cellular telephone device A6, which has received the second encryption information and the first decryption key information from the main cellular telephone device 1F, stores the second encryption information in the first communication terminal side encryption information storage unit 551, and stores the first decryption key information in the first communication terminal side decryption key information storage unit 552.

After storing the second encryption information and the first decoded information, the first communication terminal side decryption key information transmission permission unit 541 permits the radio communication unit 200A to transmit, to the server W1, the first decryption key information stored in the first communication terminal side decryption key information storage unit 552. As a result, in Step ST1119, the radio communication unit 200A of the first cellular telephone device A6 transmits the first decryption key information to the server W1.

After receiving the first encryption information, in Step ST1120, the second communication terminal side decryption key information transmission unit 562 causes the radio communication unit 200B to transmit the second decryption key information stored in the second communication terminal side decryption key information storage unit 572 to the server W1.

In Step ST1121, in a case in which the server side communication unit 960 receives the first request information, the server side determination unit 1012 determines whether the decryption key information is stored in the server side decryption key information storage unit 1041. In a case in which the server side determination unit 1012 determines that the first decryption key information and the second decryption key information are stored in the server side decryption key information storage unit 1041 (YES), the processing advances to Step ST1122. In a case in which the server side determination unit 1012 determines that the decryption key information is not stored in the server side decryption key information storage unit 1041 (NO), the server side erasing unit 1013 erases information stored in the server side decryption key information storage unit 1041 in a predetermined period of time.

In a case in which the server side determination unit 1012 determines that the first decryption key information and the second decryption key information are stored in the server side decryption key information storage unit 1041 (YES), in Step ST1122, the server side decryption key information transmission unit 1011 causes the server side communication unit 960 to transmit the first decryption key information stored in the server side decryption key information storage unit 1041 to the second cellular telephone device B6.

After transmitting the first decryption key information stored in the server side decryption key information storage unit 1041 to the second cellular telephone device B6, in Step ST1123, the server side decryption key information transmission unit 1011 causes the server side communication unit 960 to transmit the second decryption key information stored in the server side decryption key information storage unit 1041 to the first cellular telephone device A6.

When the second cellular telephone device B6 receives the first decryption key information, in Step ST1124, the second communication terminal side decryption processing unit 561 decrypts the first encryption information based on the first decryption key information to generate the first identification information. As a result, the first identification information is obtained in the second cellular telephone device B6 (the user Z).

When the first cellular telephone device A6 receives the second decryption key information, in Step ST1125, the first communication terminal side decryption processing unit 544 decrypts the second encryption information based on the second decryption key information to generate the second associated information. As a result, the second associated information is obtained in the first cellular telephone device A6 (the user X).

In this way, in the sixth embodiment, after transmitting the second encryption information and the first decryption key information to the first cellular telephone device A6 (the user X), and transmitting the first encryption information and the second decryption key information to the second cellular telephone device B6 (the user Z), the transactions of the first decryption key information and the second decryption key information can be performed through transactions between the first cellular telephone device A6 (the user X) and the second cellular telephone device B6 (the user Z) via the server W1 without involving the main cellular telephone device 1F (the user Y). Therefore, the load on the main cellular telephone device 1F (the user Y) is reduced.

Moreover, in the sixth embodiment, since the identification information of the first cellular telephone device A6 (the user X) and the associated information of the second cellular telephone device B6 (the user Z) are encrypted, the information transactions can be performed in a state of ensuring the security of each of the first cellular telephone device A6 (the user X) and the second cellular telephone device B6 (the user Z).

It should be noted that each embodiment described above can be configured such that the address book information of the sender is added to (or associated with) information (for example, the identification information, the reply request information, the encryption information, etc.) to be transmitted. In this case, the address book information to be added is preferably the identification/associated information obtained by the sender from another cellular telephone device, and is preferably configured as information that cannot be browsed by operation of the cellular telephone device of the user.

With such a configuration, in the communication system S, for example, if the address book information of the main cellular telephone device 1 (the user Y) is added to the transmission permission information or the like from the main cellular telephone device 1 (the user Y) when the main cellular telephone device 1 (user Y) attempts to transmit the identification information of the first cellular telephone device A (the user X) to the second cellular telephone device B (the user Z), it is possible to implement a configuration in which, based on the address book information thus added, the first cellular telephone device A (the user X) searches for information (for example, the associated information such as a name) of the second cellular telephone device B (the user Z) included in the transmission permission information. Accordingly, in the communication system S, it is possible to provide the user X of the first cellular telephone device A with considerations for determining whether to permit transmission by using the results of searching the address book information.

In addition, the identification/associated information configuring the address book information is associated with information on the time when the identification/associated information was obtained (received), thereby making it possible to provide considerations for further determining the relationship between the sender (for example, the main cellular telephone device 1 (the user Y)) and the cellular telephone device corresponding to the identification/associated information of the address book information (for example, the second cellular telephone device (the user Z)).

Furthermore, in the communication system S, each cellular telephone device may be configured such that the address book information of the sender is added to the identification/associated information when the identification/associated information is obtained (received). With the communication system S configured in this way, for example, in a case in which the main cellular telephone device 1 (the user Y) transmits the identification/associated information of the first cellular telephone device A (user X) to the second cellular telephone device B (the user Z), as shown in FIG. 44, it is possible to implement a configuration such that the main cellular telephone device 1 (the user Y) causes the first cellular telephone device A (the user X) to add the address book information of the second cellular telephone device B (the user Z), which was obtained when receiving the identification/associated information from the second cellular telephone device B (the user Z), to the information for permitting transmission, in addition to the information of the second cellular telephone device B (user Z) and the main cellular telephone device 1 (the user Y). In this case, it is preferable to implement a configuration such that the address book information is updated by comparing the already obtained address book information (for example, the address book information obtained when receiving the identification/associated information) and the newly obtained address book information (for example, the address book information obtained when receiving the transmission permission information).

In a case of configuring in this way, further to the address book of the main cellular telephone device 1 (the user Y), in the address book information of the second cellular telephone device B (the user Z), the first cellular telephone device A can be configured to search information (for example, information such as a name) of the main cellular telephone device 1 (the user Y) and the second cellular telephone device B (the user Z) for the address book information of the main cellular telephone device 1 (the user Y) and the second cellular telephone device B (the user Z). Accordingly, in the communication system S, using a search result thereof, it is possible to provide the user X with considerations for determining the relationship of the main cellular telephone device 1 (the user Y) and the second cellular telephone device B (the user Z). Although preferred embodiments have been described above, the present invention is not limited to the aforementioned embodiments, and can be implemented in various modes. For example, the cellular telephone device 1 is described as a communication terminal in the present embodiment; however, the present invention is not limited thereto, and the communication terminal may be a PHS (Personal Handyphone System), a PDA (Personal Digital Assistant), a portable navigation device, a notebook PC, or the like.

Moreover, in the present embodiment, the cellular telephone device 1 is described as being foldable via the connecting portion 4; however, instead of such a folder type, the cellular telephone device may be of: a slider type in which one of the bodies slides in one direction in a state in which the operation unit side body 2 and the display unit side body 3 are mutually superimposed; a rotating (turning) type in which one of the bodies is rotated around an axis line along the direction in which the operation unit side body 2 and the display unit side body 3 are superimposed; and a type (straight type) in which the operation unit side body 2 and the display unit side body 3 are disposed in one body without having a connecting portion. In addition, the cellular telephone device 1 may be of a so-called 2-axis hinge type that is openable and closable as well as rotatable.

In the aforementioned embodiments, the second communication unit (the radio communication unit 200) that performs communication by way of the second communication method communicating via the communication network is used for communication between the main cellular telephone device and the first cellular telephone device, and the first communication unit (the infrared communication unit 20) that performs communication by way of the first communication method communicating without the communication network is used for communication between the main cellular telephone device and the second cellular telephone device; however, it is not limited thereto.

APPENDICES

Appendix 1

A communication terminal, comprising:
a communication unit,
a first storage unit that stores first information related to a first communication terminal;
an information creation unit that creates information to be transmitted to a second communication terminal different from the first communication terminal via the communication unit; and
a control unit,
wherein the control unit includes:
a reply request unit that transmits, from the communication unit to the first communication terminal, information for requesting a reply regarding whether transmission of the created information is permitted, in a case in which the information created by the information creation unit includes a part or all of the first information; and
a first communication permission unit that transmits the created information from the communication unit to the second communication terminal, in a case in which a permission reply for permitting the created information to be transmitted from the first communication terminal is received via the communication unit.

Appendix 2

The communication terminal according to appendix 1, wherein the first information includes: first identification information corresponding to the first communication terminal; and first associated information associated with the first identification information.

Appendix 3

The communication terminal according to appendix 1 or 2, wherein the communication unit includes: a first communication unit that performs communication by way of a first communication method for communicating with communication terminals without a communication network; and a second communication unit that performs communication by way of a second communication method for communicating with the communication terminals via the communication network,
wherein the control unit performs control such that the second communication unit is used preferentially to the first communication unit for communication with the first communication terminal.

Appendix 4

The communication terminal according to any one of appendices 1 to 3, wherein the information creation unit creates information to be transmitted to the second communication terminal, based on the first information stored in the first storage unit.

Appendix 5

A communication terminal, comprising:
a first communication unit that performs communication by way of a first communication method;
a second communication unit that performs communication by way of a second communication method different from the first communication method;
a first storage unit that stores first identification information corresponding to a first communication terminal, and first associated information associated with the first identification information;
a selection unit that selects information to be transmitted to a second communication terminal different from the first communication terminal via the first communication unit;
a reply request unit that causes the second communication unit to transmit information for requesting a reply regarding whether transmission of a part or all of the first identification information and the first associated information is permitted, to the first communication terminal identified by way of the first identification information, in a case in which the information selected by the selection unit is a part or all of the first identification information and the first associated information; and
a first communication permission unit that permits the first communication unit to transmit a part or all of the first identification information and the first associated information selected by the selection unit to the second communication terminal, in a case in which the second communication unit receives a permission reply from the first communication terminal for permitting transmission of the part or all of the first identification information and the first associated information.

Appendix 6

The communication terminal according to appendix 5, further comprising a timing unit that measures a period of time since the second communication unit transmitted the information for requesting a reply;
wherein, in a case in which the period of time measured by the timing unit exceeds a predetermined period of time, the first communication permission unit does not permit transmission of a part or all of the first identification information and the first associated information to the second communication terminal.

Appendix 7

The communication terminal according to appendix 6, further comprising a notification unit that causes,
in a case in which the period of time measured by the timing unit exceeds the predetermined period of time and the first communication permission unit does not permit transmission of a part or all of the first identification information and the first associated information to the second communication terminal, the second communication unit to transmit non-permission notification information for notifying of the fact that the first communication permission unit does not permit transmission of a part or all of the first identification information and the first associated information to the second communication terminal, to the first communication terminal identified by way of the first identification information.

Appendix 8

The communication terminal according to any one of appendices 5 to 7,
wherein, in a case in which the first communication permission unit does not permit transmission of a part or all of the first identification information and the first associated information, and subsequently the permission reply is received via the second communication unit, when the part or all of the first identification information and the first associated information is selected again, the first communication permission unit permits transmission of the part or all of the first identification information and the first associated information to the second communication terminal.

Appendix 9

A communication terminal, comprising:
a first communication unit that performs communication by way of a first communication method;
a second communication unit that performs communication by way of a second communication method different from the first communication method;
a first storage unit that stores first identification information corresponding to a first communication terminal, and first associated information associated with the first identification information;
a second storage unit that stores second identification information corresponding to a second communication terminal, and second associated information associated with the second identification information;
a selection unit that selects information to be transmitted to the second communication terminal via the first communication unit;
a reply request unit that causes the second communication unit to transmit information for requesting a reply regarding whether transmission of a part or all of the first identification information and the first associated information is permitted, to the first communication terminal identified by way of the first identification information, in a case in which the information selected by the selection unit is the part or all of the first identification information and the first associated information;
a timing unit that measures a period of time since the second communication unit transmitted the information for requesting a reply;
a first communication permission unit that does not permit the first communication unit to transmit a part or all of the first identification information and the first associated information to the second communication terminal in a case in which the period of time measured by the timing unit exceeds the predetermined period of time, and permits the first communication unit to transmit the part or all of the first identification information and the first associated information to the second communication terminal in a case in which the second communication unit receives a permission reply for permitting transmission of the part or all of the first identification information and the first associated information from the first communication terminal before the period of time measured by the timing unit exceeds the predetermined period of time;
an encryption processing unit that encrypts a part or all of the first identification information and the first associated information to generate encryption information, in a case in which the first communication permission unit does not permit transmission of the part or all of the first identification information and the first associated information due to the fact that the period of time measured by the timing unit exceeds the predetermined period of time; and
a second communication permission unit that permits the first communication unit to transmit the encryption information generated by the encryption processing unit to the second communication terminal identified by way of the second identification information.

Appendix 10

The communication terminal according to appendix 9, further comprising a third communication permission unit that permits the second communication unit to transmit decryption key information including a decryption key for decrypting the encryption information, in a case in which the encryption information is transmitted to the second communication terminal, and the second communication unit subsequently receives a permission reply from the first communication terminal.

Appendix 11

The communication terminal according to appendix 10, wherein the decryption key information includes usable number-of-times restriction information for restricting the number of times the decryption key can be utilized for decryption processing of the encryption information.

Appendix 12

A communication terminal, comprising:
a communication unit,
a first storage unit that stores first identification information corresponding to a first communication terminal, and first associated information associated with the first identification information;
a second storage unit that stores second identification information corresponding to a second communication terminal, and second associated information associated with the second identification information;
a selection unit that selects information to be transmitted to the second communication terminal via the communication unit;
a reply request unit that causes the communication unit to transmit information for requesting a reply regarding whether transmission of a part or all of the first identification information and the first associated information is permitted, to the first communication terminal identified by way of the first identification information, in a case in which the information selected by the selection unit is the part or all of the first identification information and the first associated information;
a timing unit that measures a period of time since the second communication unit transmitted the information for requesting a reply;
a first communication permission unit that permits the first communication unit to transmit a part or all of the first identification information and the first associated information selected by the selection unit, in a case in which the second communication unit receives a permission reply from the first communication terminal for permitting transmission of the part or all of the first identification information and the first associated information; and a fourth communication permission unit that permits the first communication unit to transmit a part or all of the first identification information and the first associated information to the second communication terminal, and permits the communication unit to transmit the part or all of the second identification information and the second associated information to the first communication terminal identified by way of the first identification information, in a case in which the period of time measured by the timing unit exceeds the predetermined period of time.

Appendix 13

A communication terminal, comprising:
a first communication unit that performs communication by way of a first communication method;
a second communication unit that performs communication by way of a second communication method different from the first communication method;
a first storage unit that stores first identification information corresponding to a first communication terminal, and first associated information associated with the first identification information;
a second storage unit that stores second identification information corresponding to a second communication terminal, and second associated information associated with the second identification information;
a selection unit that selects information to be transmitted to the second communication terminal via the first communication unit;
a reply request unit that causes the second communication unit to transmit information for requesting a reply regarding whether transmission of a part or all of the first identification information and the first associated information is permitted, to the first communication terminal identified by way of the first identification information, in a case in which the information selected by the selection unit is the part or all of the first identification information and the first associated information;
a timing unit that measures a period of time since the second communication unit transmitted the information for requesting a reply;
a first communication permission unit that permits the first communication unit to transmit a part or all of the first identification information and the first associated information selected by the selection unit, in a case in which the second communication unit receives a permission reply from the first communication terminal for permitting transmission of the part or all of the first identification information and the first associated information; and
a fourth communication permission unit that permits the first communication unit to transmit a part or all of the first identification information and the first associated information to the second communication terminal, and permits the second communication unit to transmit the part or all of the second identification information and the second associated information to the first communication terminal identified by way of the first identification information, in a case in which the period of time measured by the timing unit exceeds the predetermined period of time.

Appendix 14

A communication terminal, comprising:
a communication unit,
a first storage unit that stores first identification information corresponding to a first communication terminal, and first associated information associated with the first identification information;
a second storage unit that stores second identification information corresponding to a second communication terminal, and second associated information associated with the second identification information;
a selection unit that selects information to be transmitted to the second communication terminal via the communication unit;
a reply request unit that causes the communication unit to transmit information for requesting a reply regarding whether transmission of a part or all of the first identification information and the first associated information is permitted, to the first communication terminal identified by way of the first identification information, in a case in which the information selected by the selection unit is the part or all of the first identification information and the first associated information;
a timing unit that measures a period of time since the communication unit transmitted the information for requesting a reply;
a first communication permission unit that permits the communication unit to transmit a part or all of the first identification information and the first associated information selected by the selection unit, in a case in which the communication unit receives a permission reply from the first communication terminal for permitting transmission of the part or all of the first identification information and the first associated information; and
a fifth communication permission unit that permits the communication unit to transmit a part or all of the second identification information and the second associated information to the first communication terminal identified by way of the first identification information, in a case in which the period of time measured by the timing unit exceeds the predetermined period of time.

Appendix 15

A communication terminal, comprising:
a first communication unit that performs communication by way of a first communication method;
a second communication unit that performs communication by way of a second communication method different from the first communication method;
a first storage unit that stores first identification information corresponding to a first communication terminal, and first associated information associated with the first identification information;
a second storage unit that stores second identification information corresponding to a second communication terminal, and second associated information associated with the second identification information;
a selection unit that selects information to be transmitted to the second communication terminal via the first communication unit;
a reply request unit that causes the second communication unit to transmit information for requesting a reply regarding whether transmission of a part or all of the first identification information and the first associated information is permitted, to the first communication terminal identified by way of the first identification information, in a case in which the information selected by the selection unit is the part or all of the first identification information and the first associated information;
a timing unit that measures a period of time since the second communication unit transmitted the information for requesting a reply;

a first communication permission unit that permits the first communication unit to transmit a part or all of the first identification information and the first associated information selected by the selection unit, in a case in which the second communication unit receives a permission reply from the first communication terminal for permitting transmission of the part or all of the first identification information and the first associated information; and a fifth communication permission unit that permits the second communication unit to transmit a part or all of the second identification information and the second associated information to the first communication terminal identified by way of the first identification information, in a case in which the period of time measured by the timing unit exceeds the predetermined period of time.

Appendix 16

The communication terminal according to any one of appendices 3, 5, 6, 7, 8, 9, 10, 11, 13 or 15,
wherein the first associated information includes transmission number-of-times information related to a number of times of transmission, and restricted number-of-times information including information related to a restricted number of times of transmission, and
wherein the first communication unit and/or the second communication unit do not transmit a part or all of the first identification information and the first associated information, in a case in which the transmission number of times included in the transmission number-of-times information is no more than the restricted number of times of transmission included in the restricted number-of-times information.

Appendix 17

A communication system, comprising:
a first communication terminal that can transmit predetermined decryption key information;
a main communication terminal that can transmit first identification information and first associated information associated with the first communication terminal, or encryption information encrypted from the first associated information, to a second communication terminal different from the first communication terminal; and
the second communication terminal that can receive the first identification information and the first associated information or the encryption information transmitted from the main communication terminal,
wherein the main communication terminal includes:
a first communication unit that performs communication by way of a first communication method;
a second communication unit that performs communication by way of a second communication method different from the first communication method;
a first storage unit that stores the first identification information corresponding to the first communication terminal, and the first associated information associated with the first identification information;
a second storage unit that stores second identification information corresponding to the second communication terminal, and second associated information associated with the second identification information;
a selection unit that selects information to be transmitted to the second communication terminal via the first communication unit;
a reply request unit that causes the second communication unit to transmit information for requesting a reply regarding whether transmission of a part or all of the first identification information and the first associated information is permitted, to the first communication terminal identified by way of the first identification information, in a case in which the information selected by the selection unit is the part or all of the first identification information and the first associated information;
a timing unit that measures a period of time since the second communication unit transmitted the information for requesting a reply;
a first communication permission unit that does not permit the first communication unit to transmit a part or all of the first identification information and the first associated information to the second communication terminal in a case in which the period of time measured by the timing unit exceeds the predetermined period of time, and permits the first communication unit to transmit the part or all of the first identification information and the first associated information to the second communication terminal in a case in which the second communication unit receives a permission reply for permitting transmission of the part or all of the first identification information and the first associated information from the first communication terminal before the period of time measured by the timing unit exceeds the predetermined period of time;
an encryption processing unit that encrypts a part or all of the first identification information and the first associated information to generate encryption information, in a case in which the first communication permission unit does not permit transmission of the part or all of the first identification information and the first associated information; and
a second communication permission unit that permits the first communication unit to transmit the encryption information generated by the encryption processing unit to the second communication terminal identified by way of the second identification information.

Appendix 18

The communication system according to appendix 17, further comprising:
wherein the second communication terminal includes:
a second communication terminal side first communication unit that can perform communication by way of the first communication method;
a second communication terminal side second communication unit that can communicate by way of the second communication method; and
a decryption key request unit that causes the second communication terminal side second communication unit to transmit request information for requesting transmission of decryption key information including a decryption key for decrypting the encryption information to the first communication terminal, in a case in which the second communication terminal side first communication unit receives the encryption information transmitted from the main communication terminal,
wherein the first communication terminal includes:
a first communication terminal side second communication unit that can communicate by way of the second communication method;
a decryption key information storage unit that stores the decryption key information including the decryption key for decrypting the encryption information; and
a first communication terminal side third communication permission unit that can permit the first communication terminal side second communication unit to transmit the decryption key information stored in the decryption key information storage unit to the second communication terminal, in a case in which the first communication terminal side second communication unit receives the information for requesting transmission of the decryption key information transmitted from the second communication terminal.

Appendix 19

The communication system according to appendix 18, wherein the first communication terminal includes a first communication terminal side notification unit that causes the first communication terminal side second communication unit to transmit, to the main communication terminal, information for notifying of the fact that the decryption key information has been transmitted to the second communication terminal, in a case in which the first communication terminal side third communication permission unit transmits the decryption key information to the second communication terminal.

Appendix 20

The communication system according to appendix 18 or 19,
wherein the second communication terminal includes:
a second communication terminal side timing unit that measures a period of time since the second communication terminal side first communication unit received the encryption information transmitted from the main communication terminal; and
an erasing unit that erases the encryption information in a case in which the period of time measured by the second communication terminal side timing unit has passed a predetermined period of time.

Appendix 21

A communication system, comprising:
a first communication terminal;
a main communication terminal that can transmit first identification information and first associated information associated with the first communication terminal to a second communication terminal different from the first communication terminal; and
a second communication terminal that can receive the first identification information and the first associated information transmitted from the main communication terminal,
wherein the main communication terminal includes:
a communication unit,
a first storage unit that stores the first identification information corresponding to the first communication terminal, and the first associated information associated with the first identification information;
a second storage unit that stores second identification information corresponding to the second communication terminal, and second associated information associated with the second identification information;
a selection unit that selects information to be transmitted to the second communication terminal via the communication unit;
a reply request unit that causes the communication unit to transmit information for requesting a reply regarding whether transmission of a part or all of the first identification information and the first associated information is permitted, to the first communication terminal identified by way of the first identification information, in a case in which the information selected by the selection unit is a part or all of the first identification information and the first associated information;
a timing unit that measures a period of time since the communication unit transmitted the information for requesting a reply;
a first communication permission unit that permits the communication unit to transmit a part or all of the first identification information and the first associated information selected by the selection unit, in a case in which the communication unit receives a permission reply from the first communication terminal for permitting transmission of the part or all of the first identification information and the first associated information; and
a fourth communication permission unit that permits the communication unit to transmit a part or all of the first identification information and the first associated information to the second communication terminal, and permits the communication unit to transmit the part or all of the second identification information and the second associated information to the first communication terminal identified by way of the first identification information, in a case in which the period of time measured by the timing unit exceeds the predetermined period of time.

Appendix 22

A communication system, comprising:
a first communication terminal;
a main communication terminal that can transmit first identification information and first associated information associated with the first communication terminal to a second communication terminal different from the first communication terminal; and
a second communication terminal that can receive the first identification information and the first associated information transmitted from the main communication terminal,
wherein the main communication terminal includes:
a first communication unit that performs communication by way of a first communication method;
a second communication unit that performs communication by way of a second communication method different from the first communication method;
a first storage unit that stores the first identification information corresponding to the first communication terminal, and the first associated information associated with the first identification information;
a second storage unit that stores second identification information corresponding to the second communication terminal, and second associated information associated with the second identification information;
a selection unit that selects information to be transmitted to the second communication terminal via the first communication unit;
a reply request unit that causes the second communication unit to transmit information for requesting a reply regarding whether transmission of a part or all of the first identification information and the first associated information is permitted, to the first communication terminal identified by way of the first identification information, in a case in which the information selected by the selection unit is a part or all of the first identification information and the first associated information;
a timing unit that measures a period of time since the second communication unit transmitted the information for requesting a reply;

a first communication permission unit that permits the first communication unit to transmit a part or all of the first identification information and the first associated information selected by the selection unit, in a case in which the second communication unit receives a permission reply from the first communication terminal for permitting transmission of the part or all of the first identification information and the first associated information; and a fourth communication permission unit that permits the first communication unit to transmit a part or all of the first identification information and the first associated information to the second communication terminal, and permits the second communication unit to transmit the part or all of the second identification information and the second associated information to the first communication terminal identified by way of the first identification information, in a case in which the period of time measured by the timing unit exceeds the predetermined period of time.

Appendix 23

A communication system, comprising:

a first communication terminal;

a main communication terminal that can transmit first identification information and first associated information associated with the first communication terminal to a second communication terminal different from the first communication terminal; and a second communication terminal that can receive the first identification information and the first associated information transmitted from the main communication terminal, wherein the main communication terminal includes:

a communication unit, a first storage unit that stores the first identification information corresponding to the first communication terminal, and the first associated information associated with the first identification information;

a second storage unit that stores second identification information corresponding to the second communication terminal, and second associated information associated with the second identification information;

a selection unit that selects information to be transmitted to the second communication terminal via the communication unit;

a reply request unit that causes the communication unit to transmit information for requesting a reply regarding whether transmission of a part or all of the first identification information and the first associated information is permitted, to the first communication terminal identified by way of the first identification information, in a case in which the information selected by the selection unit is a part or all of the first identification information and the first associated information;

a timing unit that measures a period of time since the communication unit transmitted the information for requesting a reply;

a first communication permission unit that permits the communication unit to transmit a part or all of the first identification information and the first associated information selected by the selection unit, in a case in which the communication unit receives a permission reply from the first communication terminal for permitting transmission of the part or all of the first identification information and the first associated information; and a fifth communication permission unit that permits the communication unit to transmit a part or all of the second identification information and the second associated information to the first communication terminal identified by way of the first identification information, in a case in which the period of time measured by the timing unit exceeds the predetermined period of time.

Appendix 24

A communication system, comprising:

a first communication terminal;

a main communication terminal that can transmit first identification information and first associated information associated with the first communication terminal to a second communication terminal different from the first communication terminal; and a second communication terminal that can receive the first identification information and the first associated information transmitted from the main communication terminal, wherein the main communication terminal includes:

a first communication unit that performs communication by way of a first communication method;

a second communication unit that performs communication by way of a second communication method different from the first communication method;

a first storage unit that stores the first identification information corresponding to the first communication terminal, and the first associated information associated with the first identification information;

a second storage unit that stores second identification information corresponding to the second communication terminal, and second associated information associated with the second identification information;

a selection unit that selects information to be transmitted to the second communication terminal via the first communication unit;

a reply request unit that causes the second communication unit to transmit information for requesting a reply regarding whether transmission of a part or all of the first identification information and the first associated information is permitted, to the first communication terminal identified by way of the first identification information, in a case in which the information selected by the selection unit is a part or all of the first identification information and the first associated information;

a timing unit that measures a period of time since the second communication unit transmitted the information for requesting a reply;

a first communication permission unit that permits the first communication unit to transmit a part or all of the first identification information and the first associated information selected by the selection unit, in a case in which the second communication unit receives a permission reply from the first communication terminal for permitting transmission of the part or all of the first identification information and the first associated information; and a fifth communication permission unit that permits the second communication unit to transmit a part or all of the second identification information and the second associated information to the first communication terminal identified by way of the first identification information, in a case in which the period of time measured by the timing unit exceeds the predetermined period of time.

Appendix 25

The communication system according to appendix 22 or 24, wherein the first communication terminal includes:

a display unit that can display predetermined information;

a first communication terminal side second communication unit that performs communication by way of the second communication method;

a third storage unit that stores a plurality of pieces of third identification information corresponding to a plurality of communication terminals, respectively, and a plurality of pieces of third associated information that are associated with the plurality of pieces of third identification information, respectively;

a comparing unit that compares a part or all of the second identification information and the second associated information with the third identification information and the third associated information stored in the third storage unit, in a case in which the first communication terminal side second communication unit receives the part or all of the second identification information and the second associated information;

an extracting unit that extracts a predetermined portion of the third identification information and the third associated information, which is determined by the comparing unit to include common contents with a part or all of the second identification information and the second associated information, from among the plurality of pieces of third identification information and the plurality of pieces of third associated information stored in the third storage unit; and a display control unit that causes the display unit to display the predetermined portion of the third identification information and the third associated information extracted by the extracting unit.

Appendix 26

A communication system, comprising:

a first communication terminal that can transmit decryption key information;

a main communication terminal that can transmit encryption information encrypted from a part or all of first identification information and first associated information associated with the first communication terminal to a second communication terminal different from the first communication terminal;

the second communication terminal that can receive the encryption information transmitted from the main communication terminal; and a server that can receive the decryption key information transmitted from the first communication terminal, and can transmit the decryption key information to the second communication terminal, wherein the main communication terminal includes:

a first communication unit that performs communication by way of a first communication method;

a second communication unit that performs communication by way of a second communication method different from the first communication method;

a first storage unit that stores first identification information corresponding to the first communication terminal, and first associated information associated with the first identification information;

a second storage unit that stores second identification information corresponding to the second communication terminal, and second associated information associated with the second identification information;

a selection unit that selects information to be transmitted to the second communication terminal via the first communication unit;

an encryption processing unit that encrypts a part or all of the first identification information and the first associated information to generate encryption information, in a case in which the selection unit selects the part or all of the first identification information and the first associated information;

an encryption information transmission permission unit that permits the first communication unit to transmit the encryption information to the second communication terminal; and a first notification information transmission unit that causes the second communication unit to transmit first notification information to the server, the first notification information including notification information for notifying of the fact that a part or all of the first identification information and the first associated information has been transmitted to the second communication terminal, the first identification information, and the second identification information, wherein the server includes:

a server side second communication unit that can communicate by way of the second communication method;

a server side first storage unit that stores the first identification information and the second identification information included in the first notification information received by the server side second communication unit;

a server side decryption key information storage unit that can store the decryption key information transmitted from the first communication terminal; and a second notification information transmission unit that causes the server side second communication unit to transmit second notification information, which includes notification information for notifying of the fact that a part or all of the first identification information and the first associated information has been transmitted from the main communication terminal to the second communication terminal, and the second identification information stored in the server side first storage unit, to the first communication terminal identified by way of the first identification information stored in the server side first storage unit, in a case in which the server side second communication unit receives the first notification information, wherein the first communication terminal includes:

a first communication terminal side second communication unit that can communicate by way of the second communication method; and a first communication terminal side first storage unit that stores the first identification information;

a first communication terminal side second storage unit that stores the second identification information included in the second notification information received by the first communication terminal side second communication unit; and a first communication terminal side decryption key information storage unit that stores the decryption key information.

Appendix 27

The communication system according to appendix 26, wherein the first communication terminal includes:

a first communication terminal side decryption key information transmission unit that causes the first communication terminal side second communication unit to transmit the decryption key information stored in the first communication terminal side decryption key information storage unit to the server, in a case in which the first communication terminal side second communication unit receives the second notification information, wherein the second communication terminal includes:
a second communication terminal side first communication unit that performs communication by way of the first communication method;
a second communication terminal side second communication unit that performs communication by way of the second communication method different from the first communication method;
a second communication terminal side encryption information storage unit that stores the encryption information received by the second communication terminal side first communication unit;
a second communication terminal side decryption key information request unit that causes the second communication terminal side second communication unit to transmit first request information for requesting the decryption key information to the server; and
a decryption processing unit that decrypts the encryption information stored in the second communication terminal side encryption information storage unit, based on a decryption key included in the decryption key information transmitted from the server, and
wherein the server includes a server side decryption key information transmission unit that causes the server side second communication unit to transmit the decryption key information stored in the server side decryption key information storage unit to the second communication terminal identified by way of the second identification information stored in the server side first storage unit, in a case in which the server side second communication unit receives the first request information.

Appendix 28

The communication system according to appendix 27,
wherein the server includes:
a server side determination unit that determines whether the decryption key information is stored in the server side decryption key information storage unit, in a case in which the server side second communication unit receives the first request information; and
a server side decryption key information request unit that causes the server side second communication unit to transmit second request information for requesting transmission of the encryption information to the first communication terminal, in a case in which the server side determination unit determines that the encryption information is not stored in the server side decryption key information storage unit.

Appendix 29

The communication system according to appendix 28,
wherein the server includes a third notification information transmission unit that causes the server side second communication unit to transmit third notification information for notifying of the fact that the decryption key information is stored in the server side decryption key information storage unit, to the second communication terminal identified by way of the second identification information stored in the server side first storage unit, in a case in which the server side communication unit receives the decryption key information.

Appendix 30

The communication system according to appendix 28 or 29,
wherein the server includes a fourth notification information transmission unit that causes the server side second communication unit to transmit fourth notification information for notifying of the fact that the decryption key information is not stored in the server side decryption key information storage unit, to the second communication terminal identified by way of the second identification information stored in the server side first storage unit, in a case in which the server side determination unit determines that the decryption key information is not stored in the server side decryption key information storage unit.

The invention claimed is:

1. A communication terminal, comprising at least: a storage unit; a control unit; and a communication unit,
wherein the storage unit stores first information including: first identification information corresponding to a first communication terminal; and first associated information associated with the first identification information,
wherein the communication unit includes: a first communication unit that performs communication by way of a first communication method for communicating with communication terminals without a communication network; and a second communication unit that performs communication by way of a second communication method for communicating with the communication terminals via the communication network,
wherein, in a case in which the first information is selected to be transmitted by way of the first communication method to a second communication terminal different from the first communication terminal, the control unit transmits a request for transmission permission to the first communication terminal by way of the second communication method different from the first communication method, and
wherein, in a case in which a response to the request for transmission permission is obtained by way of the first communication method, the control unit transmits the first information to the second communication terminal by way of the second communication method.

2. A communication terminal, comprising at least: a storage unit; a control unit; and a communication unit,
wherein the storage unit stores first information including: first identification information; and first associated information associated with the first identification information,
wherein, in a case in which the first information is selected as information to be transmitted to a second communication terminal, the control unit transmits a request for transmission permission to a first communication terminal via the communication unit,
wherein the control unit measures a period of time until obtaining a response to the request for transmission permission,
wherein, in a case in which the period of time until obtaining the response exceeds the predetermined period of time, the control unit determines that the transmission permission has not been obtained,
wherein, in a case in which the transmission permission is obtained before the period of time until obtaining the response exceeds the predetermined period of time, the control unit transmits the first information via the communication unit, and
wherein, after determining that the transmission permission has not been obtained, the control unit transmits first encryption information encrypted from the first information to the second communication terminal via the communication unit.

3. A communication system, comprising:
a first communication terminal;
a main communication terminal that can transmit first identification information and first associated information associated with the first communication terminal to a communication terminal different from the first communication terminal; and a second communication terminal that can receive the first identification information and the first associated information transmitted from the main communication terminal, wherein the main communication terminal includes at least a storage unit, a control unit and a communication unit, wherein the storage unit stores first information including: the first identification information corresponding to the first communication terminal; and the first associated information associated with the first identification information, wherein, in a case in which the first information is selected as information to be transmitted to the second communication terminal, the control unit transmits a request for transmission permission of the first information to the first communication terminal via the communication unit, and wherein, in a case in which a response to the request for transmission permission is obtained, the control unit transmits the first information to the second communication terminal via the communication unit.

4. A communication system, comprising:

a first communication terminal;

a main communication terminal that can transmit first identification information and first associated information associated with the first communication terminal to a communication terminal different from the first communication terminal; and a second communication terminal that can receive the first identification information and the first associated information transmitted from the main communication terminal, wherein the main communication terminal includes at least a storage unit, a control unit and a communication unit, wherein the storage unit stores first information including the first identification information and the first associated information associated with the first identification information, wherein the communication unit includes: a first communication unit that performs communication by way of a first communication method for communicating with communication terminals without a communication network; and a second communication unit that performs communication by way of a second communication method for communicating with the communication terminals via the communication network, wherein, in a case in which the first information is selected to be transmitted to the second communication terminal by way of the first communication method, the control unit transmits a request for transmission permission of the first information to the first communication terminal via the communication unit, and wherein, in a case in which a response to the request for transmission permission is obtained by way of the second communication method, the control unit transmits the first information to the second communication terminal by way of the first communication method.

5. A communication system, comprising:

a first communication terminal that can transmit predetermined decryption key information;

a main communication terminal that can transmit first identification information and first associated information associated with the first communication terminal, or encryption information encrypted from the first associated information, to a second communication terminal different from the first communication terminal; and the second communication terminal that can receive the first identification information and the first associated information or the encryption information transmitted from the main communication terminal, wherein the main communication terminal includes at least a storage unit, a control unit and a communication unit, wherein the storage unit stores first information including the first identification information and the first associated information associated with the first identification information, wherein, in a case in which the first information is selected as information to be transmitted to the second communication terminal, the control unit transmits a request for transmission permission to the first communication terminal via the communication unit, wherein the control unit measures a period of time until obtaining a response to the request for transmission permission from the first communication terminal, wherein, in a case in which the period of time until obtaining the response to the request for transmission permission from the first communication terminal exceeds the predetermined period of time, the control unit determines that the transmission permission has not been obtained, wherein, in a case in which the transmission permission is obtained before the period of time until obtaining the response exceeds the predetermined period of time, the control unit transmits the first information via the communication unit, and wherein, after determining that the transmission permission has not been obtained, the control unit transmits first encryption information encrypted from the first information to the second communication terminal via the communication unit.

6. A communication system, comprising:

a first communication terminal that can transmit decryption key information;

a main communication terminal that can transmit encryption information encrypted from a part or all of first identification information and first associated information associated with the first communication terminal to a second communication terminal different from the first communication terminal;

the second communication terminal that can receive the encryption information transmitted from the main communication terminal; and a server that can receive the decryption key information transmitted from the first communication terminal, and can transmit the decryption key information to the second communication terminal, wherein the main communication terminal includes at least a main communication terminal side storage unit, a main communication terminal side control unit and a main communication unit, wherein the main communication terminal side storage unit stores: first information, which includes first identification information corresponding to the first communication terminal, and first associated information associated with the first identification information; and second information, which includes second identification information corresponding to the second communication terminal, and second associated information associated with the second identification information, wherein, in a case in which the first information is selected as information to be transmitted to the second communication terminal, the main communication terminal side control unit encrypts the first information to generate encryption information, wherein the main communication terminal side control unit transmits a request for transmission permission of the encryption information to the second communication terminal via the main communication unit, wherein the main communication terminal side control unit transmits first notification information, which includes notification information for notifying of the fact that the first information has been transmitted to the second communication terminal, the first identification information and the second identification information, to the server via the main communication unit, wherein the server includes at least a server side storage unit, a server side control unit and a server communication unit, wherein the server side storage unit can store the first identification information and the second identification information included in the first notification information thus received, and the decryption key information transmitted from the first communication terminal, wherein, in a case in which the first notification information is received, the server side control unit transmits second notification information, which includes notification information for notifying of the fact that the first information has been transmitted from the main communication terminal to the second communication terminal, and the second identification information stored in the server side storage unit, to the first communication terminal identified by way of the first identification information stored in the server side storage unit, via the server communication unit, wherein the first communication terminal includes at least a first communication terminal side storage unit, a first communication terminal side control unit and a first communication terminal side communication unit, and wherein the first communication terminal side storage unit stores: the first identification information; the second identification information included in the second notification information received by the first communication terminal side communication unit; and the decryption key information.

7. A communication system, comprising:

a first communication terminal that can transmit decryption key information;

a main communication terminal that can transmit encryption information, which is encrypted from first information including first identification information corresponding to the first communication terminal and first associated information associated with the first identification information, to a second communication terminal different from the first communication terminal;

the second communication terminal that can receive the encryption information transmitted from the main communication terminal; and a server that can receive the decryption key information transmitted from the first communication terminal, and can transmit the decryption key information to the second communication terminal, wherein the main communication terminal includes at least a storage unit, a control unit and a communication unit, wherein the storage unit stores the first information, and second information that includes second identification information corresponding to the second communication terminal and second associated information associated with the second identification information, wherein, in a case in which the first information is selected as information to be transmitted to the second communication terminal, the control unit generates encryption information, wherein the control unit transmits a request for transmission permission of the encryption information to the second communication terminal via the communication unit by way of a first communication method, wherein the control unit transmits first notification information, which includes notification information for notifying of the fact that the first information has been transmitted to the second communication terminal, the first identification information and the second identification information, to the server by way of a second communication method different from the first communication method, wherein the server includes at least a server side storage unit, a server side control unit and a server communication unit, wherein the server side storage unit can store the first identification information and the second identification information included in the first notification information received by way of the second communication method, and the decryption key information transmitted from the first communication terminal, wherein, in a case in which the first notification information is received by way of the second communication method, the server side control unit transmits second notification information, which includes notification information for notifying of the fact that a part or all of the first identification information and the first associated information has been transmitted from the main communication terminal to the second communication terminal, and the second identification information stored in the server side storage unit, to the first communication terminal identified by way of the first identification information stored in the server side storage unit, by way of the second communication method, wherein the first communication terminal includes at least a first communication terminal side storage unit, and wherein the first communication terminal side storage unit stores: the first identification information; the second identification information included in the second notification information received by way of the second communication method; and the decryption key information.

8. The communication system according to claim 7, wherein the first communication terminal includes:

a first communication terminal side second communication unit that can communicate by way of the second communication method; and a first communication terminal side decryption key information transmission unit that causes the first communication terminal side second communication unit to transmit the decryption key information stored in the first communication terminal side storage unit to the server, in a case in which the first communication terminal side second communication unit receives the second notification information, wherein the second communication terminal includes:

a second communication terminal side first communication unit that performs communication by way of the first communication method;

a second communication terminal side second communication unit that performs communication by way of the second communication method different from the first communication method;

a second communication terminal side storage unit that stores the encryption information received by the second communication terminal side first communication unit;

a second communication terminal side decryption key information request unit that causes the second communication terminal side second communication unit to transmit first request information for requesting the decryption key information to the server; and a decryption processing unit that decrypts the encryption information stored in the second communication terminal side storage unit, based on a decryption key included in the decryption key information transmitted from the server, and wherein the server includes:

a server side second communication unit that can communicate by way of the second communication method; and a server side decryption key information transmission unit that causes the server side second communication unit to transmit the decryption key information stored in the server side storage unit to the second communication terminal identified by way of the second identification information stored in the server side storage unit, in a case in which the server side second communication unit receives the first request information.

9. The communication system according to claim 8, wherein the server includes:

a server side determination unit that determines whether the decryption key information is stored in the server side storage unit, in a case in which the server side second communication unit receives the first request information; and a server side decryption key information request unit that causes the server side second communication unit to transmit second request information for requesting transmission of the encryption information to the first communication terminal, in a case in which the server side determination unit determines that the encryption information is not stored in the server side storage unit.

10. The communication system according to claim 8, wherein the first communication terminal includes a non-permission information transmission unit that causes the first communication terminal side second communication unit to transmit, to the server, non-permission information for not permitting transmission of the decryption key information stored in the first communication terminal side storage unit to the second communication terminal, wherein the server includes a first erasing instruction information transmission unit that causes the server side second communication unit to transmit first erasing instruction information, which includes an instruction to erase the encryption information stored in the second communication terminal side storage unit, to the second communication terminal, in a case in which the server side second communication unit receives the non-permission information, and wherein the second communication terminal includes a second communication terminal side erasing unit that erases the encryption information stored in the second communication terminal side storage unit, in a case in which the second communication terminal side second communication unit receives the first erasing instruction information.

11. The communication system according to claim 10, wherein the server includes a server side erasing unit that erases the decryption key information stored in the server side storage unit, in a case in which the server side second communication unit receives the non-permission information.

12. The communication system according to claim 11, wherein the second communication terminal includes a second communication terminal side timing unit that measures a period of time since the second communication terminal side first communication unit received the encryption information, and wherein, in a case in which the period of time measured by the second communication terminal side timing unit has passed a predetermined period of time, the second communication terminal side erasing unit erases the encryption information stored in the second communication terminal side storage unit.

13. The communication system according to claim 11, wherein the main communication terminal includes:

a reply request unit that causes the communication unit to transmit reply request information for requesting a reply regarding whether transmission of the first information is permitted, to the first communication terminal identified by way of the first identification information, in a case in which the selected information is the first information;

a timing unit that measures a period of time since the communication unit transmitted the reply request information;

a first transmission permission unit that does not permit the communication unit to transmit the first information to the second communication terminal in a case in which the period of time measured by the timing unit exceeds the predetermined period of time, and permits the communication unit to transmit the first information to the second communication terminal in a case in which the communication unit receives a permission reply for permitting transmission of the first information from the first communication terminal before the period of time measured by the timing unit exceeds the predetermined period of time; and an encryption processing unit that encrypts the first information to generate the encryption information, and wherein, in a case in which the first transmission permission unit does not permit the communication unit to transmit the first information to the second communication terminal, the encryption processing unit performs encryption processing on the first information.

14. A communication system, comprising:

a first communication terminal that can be identified by way of first identification information, and can transmit first decryption key information for enabling decryption of first encryption information that is generated by encrypting the first identification information;

a second communication terminal that can be identified by way of second identification information, and can transmit second decryption key information for enabling decryption of second encryption information that is generated by encrypting second associated information associated with the second identification information;

a main communication terminal that can transmit the first encryption information to the second communication terminal, and can transmit the second encryption information to the first communication terminal, wherein the main communication terminal includes at least a main communication terminal side storage unit and a main communication terminal side control unit, wherein the main communication terminal side storage unit stores the first identification information and the second associated information, wherein, in a case in which the first identification information is selected as information to be transmitted to the second communication terminal, the main communication terminal side control unit performs control such that the first encryption information generated by encrypting the first identification information is transmitted to the second communication terminal, and performs control such that the second encryption information generated by encrypting the second associated information is transmitted to the first communication terminal, wherein the first communication terminal includes at least a first communication terminal side storage unit and a first communication terminal side control unit, wherein the first communication terminal side storage unit stores the first decryption key information, wherein, in a case in which the second encryption information is received from the main communication terminal, the first communication terminal side control unit performs control such that the first decryption key information stored in the first communication terminal side storage unit can be transmitted to the second communication terminal, wherein the second communication terminal includes at least a second communication terminal side storage unit and a second communication terminal side control unit, wherein the second communication terminal side storage unit stores the second decryption key information, and wherein, in a case in which the second communication terminal side control unit has performed control such that the first encryption information received from the main communication terminal is decrypted with the first decryption key information received from the first communication terminal, the second communication terminal side control unit performs control such that the second decryption key information stored in the second communication terminal side storage unit is transmitted to the first communication terminal.

15. A communication system, comprising:

a first communication terminal that can be identified by way of first identification information;

a second communication terminal that can be identified by way of second identification information;

a main communication terminal that can transmit first encryption information to the second communication terminal, and can transmit second encryption information to the first communication terminal; and a server that can transmit first decryption key information for enabling decryption of the first encryption information generated by encrypting the first identification information, and can transmit second decryption key information for enabling decryption of the second encryption information generated by encrypting second associated information associated with the second identification information, wherein the main communication terminal includes at least a main communication terminal side storage unit, a main communication terminal side control unit and a communication unit, wherein the main communication terminal side storage unit stores the first identification information and the second associated information, wherein, in a case in which the first identification information is selected as information to be transmitted to the second communication terminal, the main communication terminal side control unit transmits the first encryption information generated by encrypting the first identification information to the second communication terminal via the communication unit, and transmits the second encryption information generated by encrypting the second associated information to the first communication terminal via the communication unit, wherein the first communication terminal includes at least a first communication terminal side storage unit and a first communication terminal side control unit, wherein the first communication terminal side storage unit stores the first decryption key information, wherein, in a case in which the second encryption information is received from the main communication terminal, the first communication terminal side control unit performs control such that the first decryption key information stored in the first communication terminal side storage unit can be transmitted to the server, wherein the second communication terminal includes at least a second communication terminal side storage unit, a second communication terminal side control unit and a second communication unit, wherein the second communication terminal side storage unit stores the second decryption key information, wherein, in a case in which the first encryption information is received from the main communication terminal, the second communication terminal side control unit transmits the second decryption key information stored in the second communication terminal side storage unit to the server via the second communication unit;

wherein the server includes at least a server side control unit and a server communication unit, and wherein, in a case in which the first decryption key information is received from the first communication terminal, and the second decryption key information is received from the second communication terminal, the server side control unit transmits the second decryption key information to the first communication terminal via the server communication unit, and transmits the first decryption key information to the second communication terminal via the server communication unit.

* * * * *